(12) United States Patent
Huang et al.

(10) Patent No.: US 8,456,758 B1
(45) Date of Patent: Jun. 4, 2013

(54) IMAGE CAPTURING LENS SYSTEM

(75) Inventors: Hsin-Hsuan Huang, Taichung (TW); Chih-Wen Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/422,479

(22) Filed: Mar. 16, 2012

(30) Foreign Application Priority Data

Dec. 28, 2011 (TW) .............................. 100149117 A

(51) Int. Cl.
*G02B 13/18* (2006.01)
*G02B 9/60* (2006.01)

(52) U.S. Cl.
USPC ........... 359/714; 359/739; 359/763; 359/764; 359/765; 359/766

(58) Field of Classification Search
USPC .................................. 359/714, 739, 763–766
See application file for complete search history.

(56) References Cited

U.S. PATENT DOCUMENTS

| | | | |
|---|---|---|---|
| 7,365,920 B2 | 4/2008 | Noda | |
| 7,826,151 B2* | 11/2010 | Tsai | 359/764 |
| 2011/0115965 A1* | 5/2011 | Engelhardt et al. | 348/345 |
| 2011/0310287 A1* | 12/2011 | Ohtsu | 359/764 |

* cited by examiner

*Primary Examiner* — Evelyn A. Lester
(74) *Attorney, Agent, or Firm* — Morris Manning & Martin LLP; Tim Tingkang Xia, Esq.

(57) ABSTRACT

This invention provides an image capturing lens system in order from an object side to an image side comprising five lens elements with refractive power: a first lens element with positive refractive power having a convex object-side surface; a second lens element with negative refractive power; a third lens element with both the object-side and image-side surfaces thereof being aspheric; a plastic fourth lens element with both the object-side and image-side surfaces thereof being aspheric; and a plastic fifth lens element having a concave image-side surface, both the object-side and image-side surfaces thereof being aspheric, and at least one inflection point is formed on at least one of the object-side and image-side surfaces thereof. By such arrangement, the lens system of the invention has larger chief ray angle, and thereby not only the total track length of the system can be reduced, but also better image quality can be obtained.

25 Claims, 36 Drawing Sheets

IMAGE CAPTURING LENS SYSTEM

CROSS-REFERENCE TO RELATED APPLICATIONS

This non-provisional application claims priority under 35 U.S.C. §119(a) on Patent Application No. 100149117 filed in Taiwan, R.O.C. on Dec. 28, 2011, the entire contents of which are hereby incorporated by reference.

BACKGROUND OF THE INVENTION

1. Field of the Invention

The present invention relates to an Image capturing lens system, and more particularly, to a compact Image capturing lens system used in electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Along with the advances in semiconductor manufacturing technology, the pixel size of sensors is reduced leading compact imaging lens systems to higher resolution. In the meantime, the demand for better image quality is also increased.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, the popularity of high-class portable devices such as Smart Phone and PDA (Personal Digital Assistant) drives the rapid improvements in high resolution and image quality of the current compact imaging lens systems, conventional four lens elements systems no longer satisfy the higher level camera modules.

On the other hand, it is thought to be inevitable to increase the back focal length of the system if one more lens element is added for satisfying the demand for higher picture quality. Consequently, a conventional image capturing lens system with five lens elements usually has the disadvantage of excessively long total track length, and thereby is not suitable for compact electronic devices.

It could be favorable for shortening the back focal length of the optical system and thereby decrease the total track length thereof while the optical system has larger CRA. Especially for effectively improving the image quality, five lens elements are configured with the property of larger CRA for high-level compact electronic products. As a result, an image capturing lens system with improved image quality and decreased total track length can be obtained.

SUMMARY OF THE INVENTION

By the following disclosed arrangement, the lens system of the invention has larger chief ray angle, and thereby not only the total track length of the system can be reduced, but also better image quality can be obtained.

The present invention provides an image capturing lens system, in order from an object side to an image side comprising five lens elements with refractive power: a first lens element with positive refractive power having a convex object-side surface; a second lens element with negative refractive power; a third lens element with both the object-side and image-side surfaces thereof being aspheric; a plastic fourth lens element with both the object-side and image-side surfaces thereof being aspheric; and a plastic fifth lens element having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 35 deg<CRA1.0Y<48 deg; and −3.5<f1/f5<1.5.

On the other hand, the present invention provides an image capturing lens system, in order from an object side to an image side comprising five lens elements with refractive power: a first lens element with positive refractive power having a convex object-side surface; a second lens element with negative refractive power having a concave image-side surface; a third lens element with both the object-side and image-side surfaces thereof being aspheric; a plastic fourth lens element with negative refractive power having both the object-side and image-side surfaces thereof being aspheric; and a plastic fifth lens element having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 33 deg<CRA1.0Y<50 deg; and −3.5<f1/f5<1.5.

Furthermore, the present invention provides an image capturing lens system, in order from an object side to an image side comprising five lens elements with refractive power: a first lens element with positive refractive power having a convex object-side surface; a second lens element having a concave object-side surface and a convex image-side surface; a third lens element with both the object-side and image-side surfaces thereof being aspheric; a plastic fourth lens element having a concave object-side surface and a convex image-side surface, both the object-side and image-side surfaces thereof being aspheric; and a plastic fifth lens element with negative refractive power having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 33 deg<CRA1.0Y<50 deg; and −3.5<f1/f5<1.5.

In the aforementioned Image capturing lens system, the first lens element has positive refractive power and thereby can provide significant refractive power needed for the system, which is favorable for reducing the total track length thereof. When the second lens element has negative refractive power, the aberration produced by the first lens element with positive refractive power can be effectively corrected. When the fourth lens element has positive refractive power, the refractive power of the first lens element can be effectively distributed for reducing the sensitivity of the system. When the fourth lens element has negative refractive power, the high order aberration of the system can be corrected. Moreover, when the fourth lens element has positive refractive power and the fifth lens element has negative refractive power, a positive-negative telephoto structure is formed so that the back focal length of the system is favorably reduced as well as the total track length of the system is reduced.

In the aforementioned Image capturing lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. The second lens element can be a concave-convex meniscus lens element or a lens element with a concave image-side surface. When the second lens element is a concave-convex meniscus lens element, the astigmatism of the system can be favorably corrected. When the second lens element is a lens element with a concave image-side surface, the back focal length can be favorably enlarged for ensuring that the system has enough back focal length for placing other optical elements. When the third lens element is a bi-convex lens element, the refractive power of the third lens element can be effectively strengthened, and thereby the object of reducing total track length of the system can be achieved while reducing sensitivity thereof. When the fourth lens element has a concave object-side surface and a convex image-side surface, the astigmatism can be effectively corrected; meanwhile, the refractive power of the fourth lens element can be effectively adjusted for reducing the sensitivity of the refractive power allocation within the system. When the fifth lens element has a concave image-side surface, the principal point of the system can be positioned away from the image plane, and the back focal length of the system is favorably reduced as well as the total track length of the system; therefore the system is kept compact. When the fifth lens element has a convex object-side surface and a concave image-side surface, the astigmatism and the high order aberration of the system can be favorably corrected. Furthermore, when at least one inflection is formed on the fifth lens element, the incident angle on the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
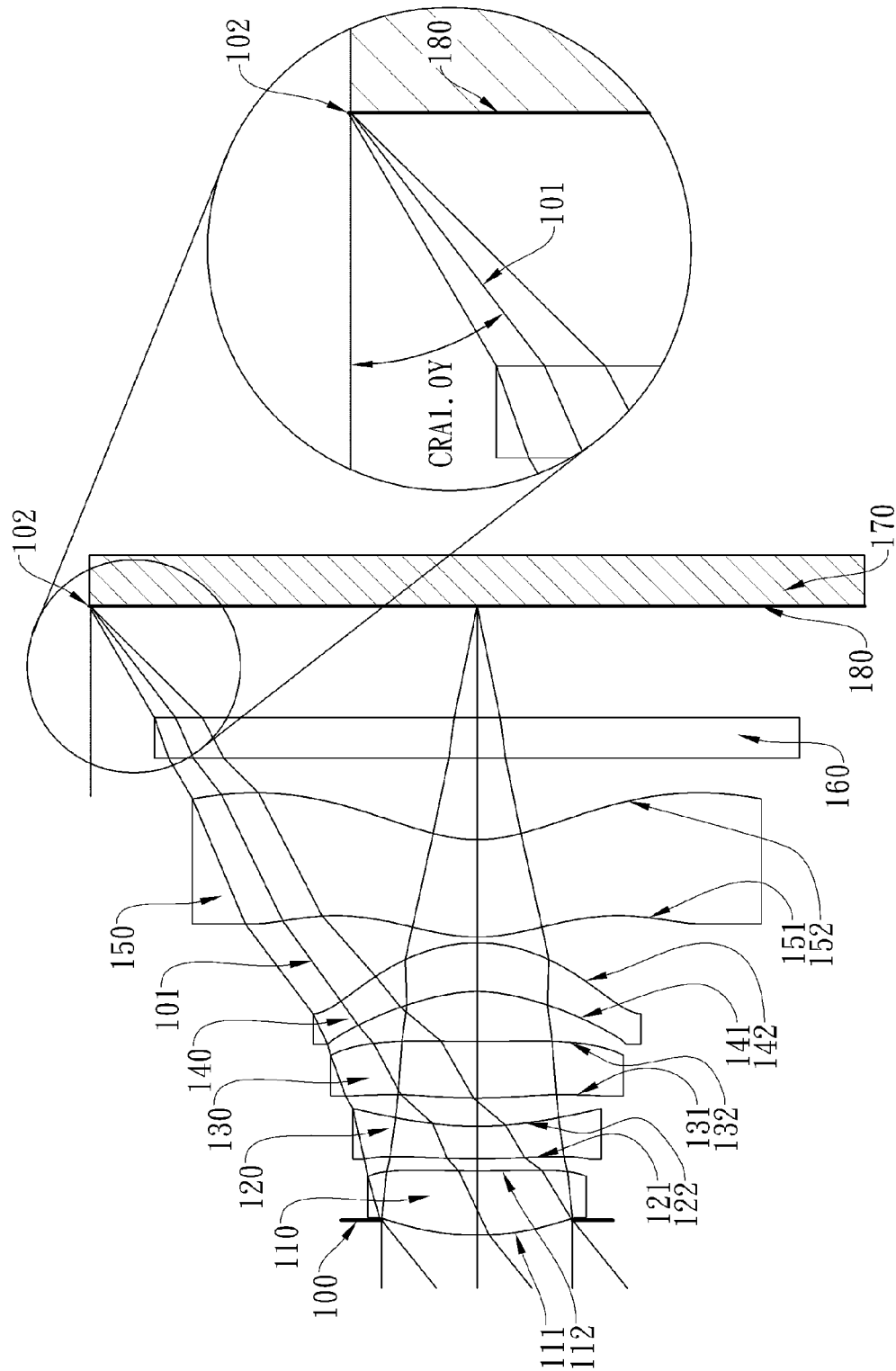
FIG. 1A shows an Image capturing lens system in accordance with a first embodiment of the present invention and also shows the angle represented by CRA1.0Y.

The present invention provides an image capturing lens system, in order from an object side to an image side comprising five lens elements with refractive power: a first lens element with positive refractive power having a convex object-side surface; a second lens element with negative refractive power; a third lens element with both the object-side and image-side surfaces thereof being aspheric; a plastic fourth lens element with both the object-side and image-side surfaces thereof being aspheric; and a plastic fifth lens element having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 35 deg<CRA1.0Y<48 deg; and −3.5<f1/f5<1.5.

When the relation of 35 deg<CRA1.0Y<48 deg is satisfied, the back focal length of the system can be favorably reduced for achieving the object of reducing the total track length of the system; preferably, the following relation is satisfied: 37 deg<CRA1.0Y<43 deg.

When the relation of −3.5<f1/f5<1.5 deg is satisfied, the positive refractive power of the first lens element is more suitable, and the refractive power of the fifth lens element can complement with the fourth lens element; therefore the total track length of the system can be favorably reduced and meanwhile the advantage of correcting the aberration of the system can be obtained.

In the aforementioned Image capturing lens system, the chief ray angle at one full length of the image height from the optical axis on the image plane is CRA1.0Y, a chief ray angle at 80% length of the image height on the image plane from the optical axis is CRA0.8Y, and they preferably satisfy the following relation: −1 deg<CRA1.0Y−CRA0.8Y<5 deg. When the above relation is satisfied, the variation of CRA is kept from being excessively large, which results in poor response of the image sensor, and thereby the good image quality and illumination distribution of the system are ensured.

In the aforementioned Image capturing lens system, half of the maximal field of view of the system is HFOV, and they preferably satisfy the following relation: 36 deg<HFOV<45 deg. When the above relation is satisfied, appropriate view of field can be provided for the system.

In the aforementioned Image capturing lens system, preferably, when the five lens elements with refractive power are all non-cemented lens elements, the difficulty in manufacturing lens elements can be avoided and thereby the cost is saved.

In the aforementioned Image capturing lens system, an Abbe number of the first lens element is V1, an Abbe number of the second lens element is V2, and they preferably satisfy the following relation: 20<V1−V2<40. When the above relation is satisfied, the chromatic aberration of the system can be favorably corrected.

In the aforementioned Image capturing lens system, an axial distance between the first lens element and the second lens element is T12, an axial distance between the fourth lens element and the fifth lens element is T45, an axial distance between the second lens element and the third lens element is T23, an axial distance between the third lens element and the fourth lens element is T34, and they preferably satisfy the following relation: 0.1<(T12+T45)/(T23+T34)<1.0. When the above relation is satisfied, the configuration of each lens element is more suitable, and thereby the lens can be favorably manufactured and a proper total optical track length can be maintained.

On the other hand, the present invention provides an image capturing lens system, in order from an object side to an image side comprising five lens elements with refractive power: a first lens element with positive refractive power having a convex object-side surface; a second lens element with negative refractive power having a concave image-side surface; a third lens element with both the object-side and image-side surfaces thereof being aspheric; a plastic fourth lens element with negative refractive power having both the object-side and image-side surfaces thereof being aspheric; and a plastic fifth lens element having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 33 deg<CRA1.0Y<50 deg; and −3.5<f1/f5<1.5.

When the relation of 33 deg<CRA1.0Y<50 deg is satisfied, the back focal length of the system can be favorably reduced for achieving the object of reducing the total track length of the system.

When the relation of −3.5<f1/f5<1.5 deg is satisfied, the positive refractive power of the first lens element is more suitable, and the refractive power of the fifth lens element can complement with the fourth lens element; therefore the total track length of the system can be favorably reduced and meanwhile the advantage of correcting the aberration of the system can be obtained.

In the aforementioned Image capturing lens system, the chief ray angle at one full length of the image height from the optical axis on the image plane is CRA1.0Y, a chief ray angle at 80% length of the image height on the image plane from the optical axis is CRA0.8Y, and they preferably satisfy the following relation: −1 deg<CRA1.0Y−CRA0.8Y<5 deg. When the above relation is satisfied, the variation of CRA is kept from being excessively large, which results in poor response of the image sensor, and thereby the good image quality and illumination distribution of the system are ensured.

In the aforementioned Image capturing lens system, the system further comprises an image sensor provided on an image plane, an axial distance between the object-side surface of the first lens element and the image plane is TTL, the maximum image height on the image plane of the system is ImgH, which is half of the diagonal length of the photosensitive area of the image sensor here, and they preferably satisfy the following relation: TTL/ImgH<1.7. When the above relation is satisfied, it is favorable for keeping the system compact in order to be equipped on portable electronic products.

In the aforementioned Image capturing lens system, half of the maximal field of view of the system is HFOV, and they preferably satisfy the following relation: 36 deg<HFOV<45 deg. When the above relation is satisfied, a desirable field of view can be provided for the system.

In the aforementioned Image capturing lens system, preferably, when the five lens elements with refractive power are all non-cemented lens elements, the difficulty in manufacturing lens elements can be avoided and thereby the cost is saved.

Furthermore, the present invention provides an image capturing lens system, in order from an object side to an image side comprising five lens elements with refractive power: a first lens element with positive refractive power having a convex object-side surface; a second lens element having a concave object-side surface and a convex image-side surface; a third lens element with both the object-side and image-side surfaces thereof being aspheric; a plastic fourth lens element having a concave object-side surface and a convex image-side surface, both the object-side and image-side surfaces thereof being aspheric; and a plastic fifth lens element with negative refractive power having a concave image-side surface, both the object-side and image-side surfaces thereof being aspheric, and at least one inflection point is formed on at least one of the object-side and image-side surfaces thereof; wherein a chief ray angle at one full length of an image height from an optical axis on an image plane is CRA1.0Y, a focal length of the first lens element is f1, a focal length of the fifth lens element is f5, and they satisfy the following relations: 33 deg<CRA1.0Y<50 deg; and −3.5<f1/f5<1.5.

When the relation of 33 deg<CRA1.0Y<50 deg is satisfied, the back focal length of the system can be favorably reduced for achieving the object of reducing the total track length of the system; preferably, the following relation is satisfied: 35 deg<CRA1.0Y<48 deg.

When the relation of −3.5<f1/f5<1.5 deg is satisfied, the positive refractive power of the first lens element is more suitable, and the refractive power of the fifth lens element can complement with the fourth lens element; therefore the total track length of the system can be favorably reduced and meanwhile the advantage of correcting the aberration of the system can be obtained.

In the aforementioned Image capturing lens system, half of the maximal field of view of the system is HFOV, and they preferably satisfy the following relation: 36 deg<HFOV<45 deg. When the above relation is satisfied, a desirable field of view can be provided for the system.

In the aforementioned Image capturing lens system, preferably, when the five lens elements with refractive power are all non-cemented lens elements, the difficulty in manufacturing lens elements can be avoided and thereby the cost is saved.

In the aforementioned Image capturing lens system, the chief ray angle at one full length of the image height from the optical axis on the image plane is CRA1.0Y, a chief ray angle at 80% length of the image height on the image plane from the optical axis is CRA0.8Y, and they preferably satisfy the following relation: −1 deg<CRA1.0Y−CRA0.8Y<2 deg. When the above relation is satisfied, the variation of CRA is kept from being excessively large, which results in poor response of the image sensor, and thereby the good image quality and illumination distribution of the system are ensured.

In the aforementioned Image capturing lens system, the system further comprises an image sensor provided on an image plane, an axial distance between the object-side surface of the first lens element and the image plane is TTL, the maximum image height on the image plane of the system is ImgH, and they preferably satisfy the following relation: TTL/ImgH<1.7. When the above relation is satisfied, it is favorable for keeping the system compact in order to be equipped on portable electronic products.

In the aforementioned Image capturing lens system, the lens elements can be made of glass or plastic material. If the lens elements are made of glass, the freedom for distributing the refractive power of the Image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the Image capturing lens system can be effectively reduced.

In the present Image capturing lens system, if a lens element has a convex surface, it means the portion of the surface in proximity to the optical axis is convex; if a lens element has a concave surface, it means the portion of the surface in proximity to the optical axis is concave.

The present Image capturing lens system may comprise at least one stop, such as a glare stop or a field stop for reducing stray light resulting in improved image quality.

In the present Image capturing lens system, the stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

Please refer to FIG. 1. The term of "Chief Ray Angle (CRA)" used in the present invention is referred to as an angle between a normal line and an incident light passing through the central part of an aperture stop 100 and projecting onto an image plane 180; and the term of "chief ray 101" is referred to an incident light which passes through the central part of an aperture stop 100. Accordingly, as shown in the figure, an angle at which a chief ray 101 projects onto a position of one full length of an image height 102 of the image plane 180 from the optical axis is CRA1.0Y. Likewise, an angle at which a chief ray 101 projects onto a position of 80% length of the image height (figure not shown) of the image plane 180 from the optical axis is CRA0.8Y.

Preferred embodiments of the present invention will be described in the following paragraphs by referring to the accompanying drawings.

Embodiment 1

Figure 1B:
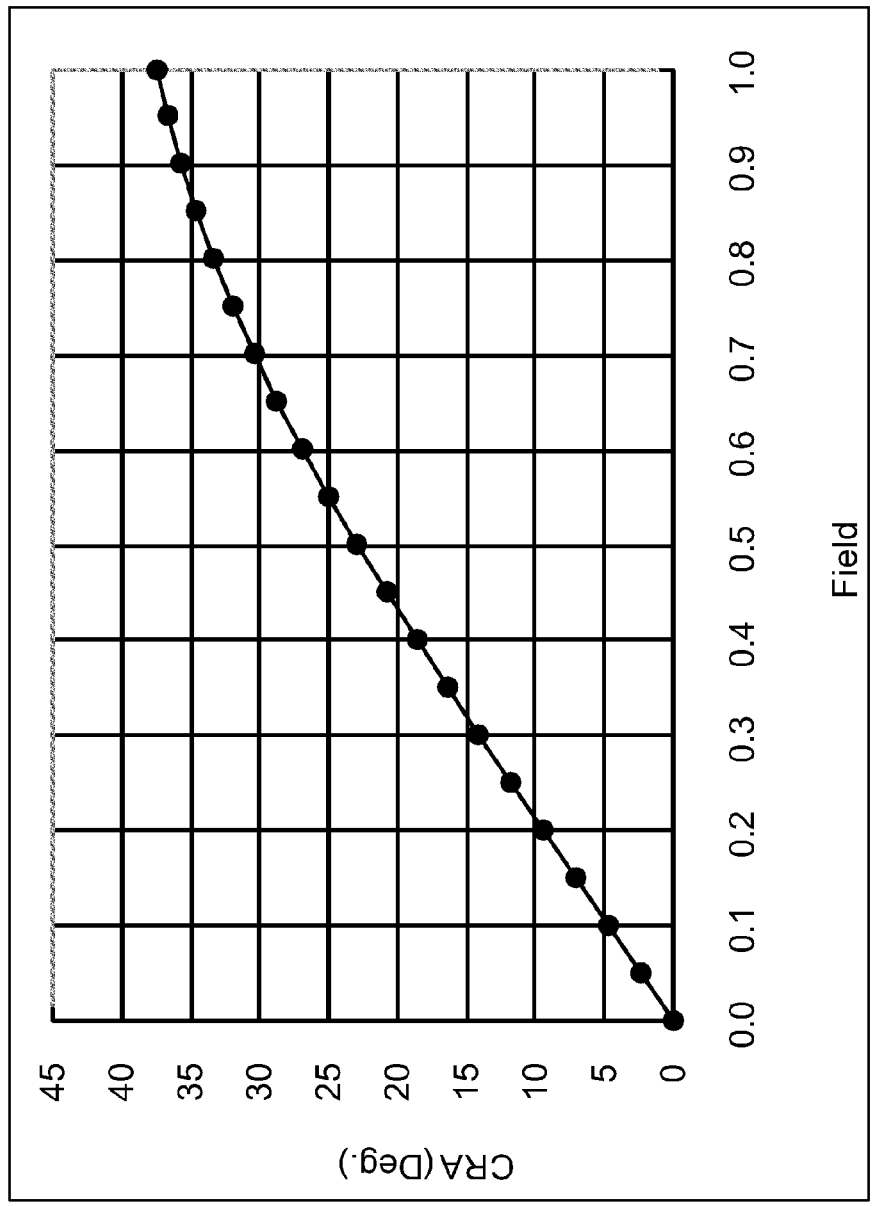
FIG. 1B shows the relation between CRA and field of view of the first embodiment of the present invention.
Figure 1C:
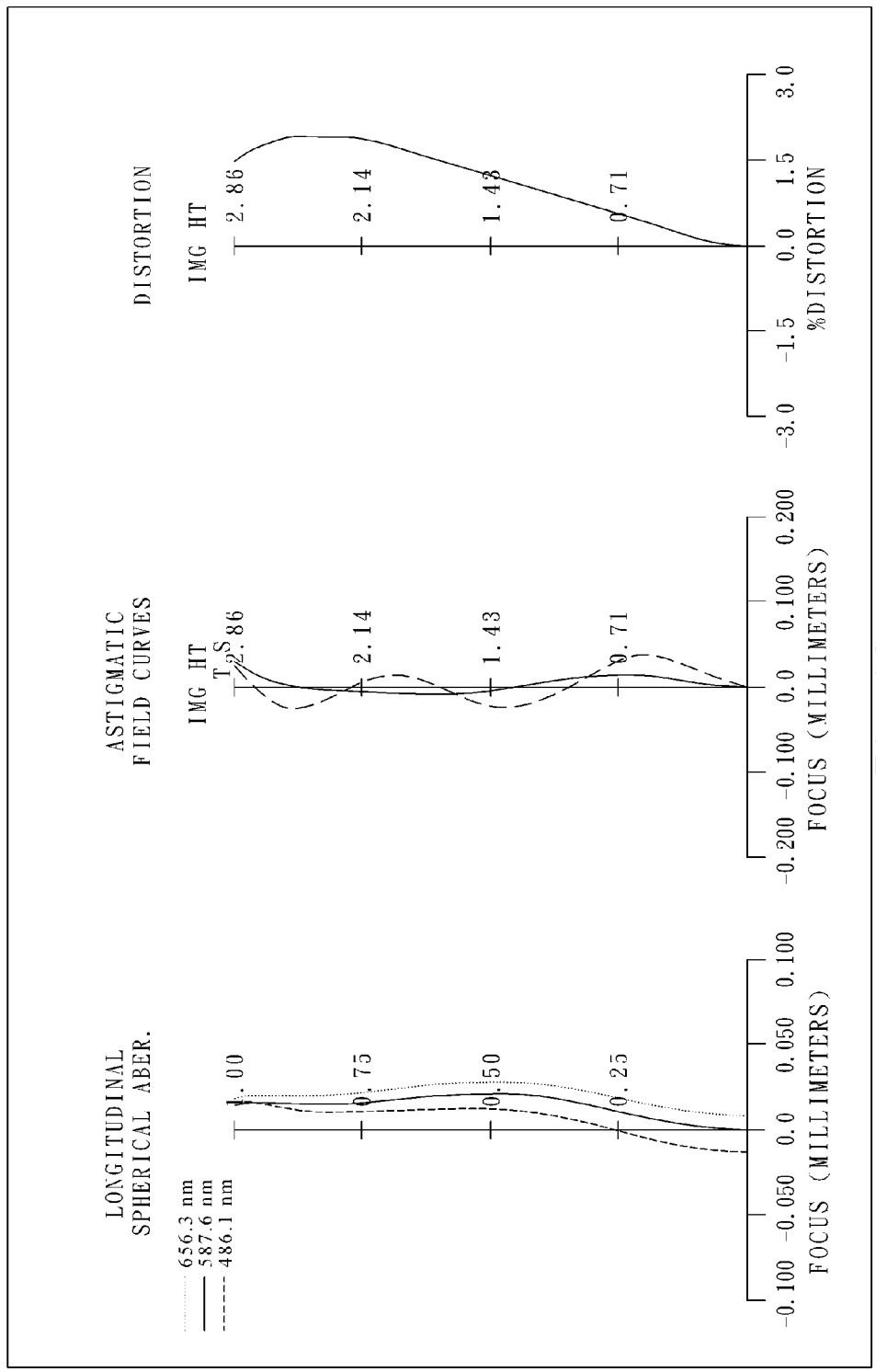
FIG. 1C shows the aberration curves of the first embodiment of the present invention.

FIG. 1A shows an Image capturing lens system in accordance with the first embodiment of the present invention, and FIG. 1C shows the aberration curves of the first embodiment of the present invention. The Image capturing lens system of the first embodiment of the present invention mainly comprises five non-cemented lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a convex object-side surface 121 and a concave image-side surface 122, the object-side and image-side surfaces 121 and 122 thereof being aspheric;

a plastic third lens element 130 with positive refractive power having a convex object-side surface 131 and a concave image-side surface 132, the object-side and image-side surfaces 131 and 132 thereof being aspheric;

a plastic fourth lens element 140 with positive refractive power having a concave object-side surface 141 and a convex image-side surface 142, the object-side and image-side surfaces 141 and 142 thereof being aspheric; and a plastic fifth lens element 150 with positive refractive power having a convex object-side surface 151 and a concave image-side surface 152, the object-side and image-side surfaces 151 and 152 thereof being aspheric, and at least one inflection point is formed on both the object-side surface 151 and the image-side surface 152 thereof;

wherein an aperture stop 100 is disposed between an imaged object and the first lens element 110;

the Image capturing lens system further comprises an IR filter 160 disposed between the image-side surface 152 of the fifth lens element 150 and an image plane 180, and the IR filter 160 is made of glass and has no influence on the focal length of the Image capturing lens system; the Image capturing lens system further comprises an image sensor 170 provided on the image plane 180.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

R: radius of curvature;
k: the conic coefficient;
Ai: the aspheric coefficient of order i.

TABLE 1

(Embodiment 1)
f = 3.47 mm, Fno = 2.46, HFOV = 39.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.110 | | | | |
| 2 | Lens 1 | 1.910300 (ASP) | 0.474 | Plastic | 1.535 | 56.3 | 4.33 |
| 3 | | 10.006000 (ASP) | 0.090 | | | | |
| 4 | Lens 2 | 4.581300 (ASP) | 0.240 | Plastic | 1.650 | 21.4 | −6.38 |
| 5 | | 2.130720 (ASP) | 0.209 | | | | |
| 6 | Lens 3 | 3.571300 (ASP) | 0.419 | Plastic | 1.535 | 56.3 | 8.07 |
| 7 | | 19.939800 (ASP) | 0.369 | | | | |
| 8 | Lens 4 | −1.044560 (ASP) | 0.361 | Plastic | 1.535 | 56.3 | 28.47 |
| 9 | | −1.095150 (ASP) | 0.042 | | | | |
| 10 | Lens 5 | 1.194660 (ASP) | 0.721 | Plastic | 1.535 | 56.3 | 19.74 |
| 11 | | 1.063910 (ASP) | 0.600 | | | | |
| 12 | IR-filter | Plano | 0.300 | Glass | 1.517 | 64.2 | — |
| 13 | | Plano | 0.825 | | | | |
| 14 | Image | Plano | — | | | | |

* Reference wavelength is 587.6 nm (d-line)

TABLE 2

Aspheric Coefficients

| | Surface # | | | | |
|---|---|---|---|---|---|
| | 2 | 3 | 4 | 5 | 6 |
| k = | −4.26527E−01 | 1.43813E+01 | −2.09746E+01 | −1.29414E+01 | −3.15158E+01 |
| A4 = | −8.57719E−03 | −1.35316E−01 | −2.44794E−01 | −1.26425E−01 | −1.14787E−01 |
| A6 = | −4.94448E−03 | 8.70080E−02 | 4.43805E−01 | 3.19112E−01 | −9.34186E−02 |
| A8 = | −1.02706E−01 | −1.63315E−01 | −4.98963E−01 | −3.05388E−01 | 1.55311E−01 |
| A10 = | 1.50728E−01 | −6.22715E−02 | 8.90988E−02 | 1.13319E−01 | 6.31904E−02 |
| A12 = | −1.80996E−01 | −2.63369E−02 | 2.18251E−02 | 1.53085E−02 | −2.78326E−01 |
| A14 = | −2.10085E−02 | 6.91512E−03 | 1.65083E−03 | −3.67513E−02 | 3.43775E−01 |
| A16 = | | | | | −1.61568E−01 |

| | Surface # | | | | |
|---|---|---|---|---|---|
| | 7 | 8 | 9 | 10 | 11 |
| k = | −5.45984E+01 | −6.63394E+00 | −4.99651E−01 | −6.23315E+00 | −4.28872E+00 |
| A4 = | −3.38463E−02 | 1.09953E−01 | 1.26772E−01 | −1.50207E−01 | −8.28257E−02 |
| A6 = | −1.49161E−01 | −4.43842E−01 | −1.28514E−01 | 5.35421E−02 | 2.92006E−02 |
| A8 = | 1.37974E−01 | 4.44819E−01 | 4.91833E−02 | −1.25285E−02 | −7.98614E−03 |
| A10 = | −3.69767E−02 | −1.51132E−01 | 6.28592E−03 | 1.65473E−03 | 1.52709E−03 |
| A12 = | −4.38131E−03 | 1.37147E−02 | −7.14832E−03 | 5.12935E−04 | −1.77843E−04 |
| A14 = | −4.26376E−03 | −1.11709E−02 | −1.98079E−02 | −1.84644E−04 | 9.56474E−06 |
| A16 = | | −2.06352E−03 | 6.40886E−03 | 1.25590E−05 | |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

In the first embodiment of the present Image capturing lens system, the focal length of the Image capturing lens system is f, and it satisfies the following relation: f=3.47 (mm).

In the first embodiment of the present Image capturing lens system, the f-number of the Image capturing lens system is Fno, and it satisfies the relation: Fno=2.46.

In the first embodiment of the present Image capturing lens system, half of the maximal field of view of the Image capturing lens system is HFOV, and it satisfies the relation: HFOV=39.0 deg.

In the first embodiment of the present Image capturing lens system, an Abbe number of the first lens element 110 is V1, an Abbe number of the second lens element 120 is V2, and they satisfy the following relation: V1−V2=34.9.

In the first embodiment of the present Image capturing lens system, an angle at which a chief ray projects onto a position of 1-fold image height of an image plane 180 is CRA1.0Y, and it satisfies the following relation: CRA1.0Y=37.4 deg.

In the first embodiment of the present Image capturing lens system, the chief ray angle at one full length of the image height from the optical axis on the image plane 180 is CRA1.0Y, a chief ray angle at 80% length of the image height from the optical axis on the image plane 180 is CRA0.8Y, and they satisfy the following relation: CRA1.0Y−CRA0.8Y=4.0 deg.

In the first embodiment of the present Image capturing lens system, an axial distance between the first lens element 110 and the second lens element 120 is T12, an axial distance between the fourth lens element 140 and the fifth lens element 150 is T45, an axial distance between the second lens element 120 and the third lens element 130 is T23, an axial distance between the third lens element 130 and the fourth lens element 140 is T34, and they satisfy the following relation: (T12+T45)/(T23+T34)=0.23.

In the first embodiment of the present Image capturing lens system, a focal length of the first lens element 110 is f1, a focal length of the fifth lens element 150 is f5, and they satisfy the following relation: f1/f5=0.22.

In the first embodiment of the present Image capturing lens system, an axial distance between the object-side surface 111 of the first lens element 110 and the image plane 180 is TTL, a maximum image height on the image plane 180 of the system is ImgH, and they satisfy the following relation: TTL/ImgH=1.59.

Please refer to FIG. 1B and the following table 3, which show the CRA of the first embodiment of the present Image capturing lens system; wherein one full image height of the image plane 180 is 2.856 mm, thus CRA0.8Y=33.4 deg, CRA1.0Y=37.4 deg.

TABLE 3

| Field | Image Height (mm) | CRA (Deg.) |
|---|---|---|
| 0.00 | 0.000 | 0.0 |
| 0.05 | 0.143 | 2.4 |
| 0.10 | 0.286 | 4.7 |
| 0.15 | 0.428 | 7.1 |
| 0.20 | 0.571 | 9.5 |
| 0.25 | 0.714 | 11.8 |
| 0.30 | 0.857 | 14.1 |
| 0.35 | 1.000 | 16.4 |
| 0.40 | 1.142 | 18.7 |
| 0.45 | 1.285 | 20.9 |
| 0.50 | 1.428 | 23.0 |
| 0.55 | 1.571 | 25.0 |
| 0.60 | 1.714 | 27.0 |
| 0.65 | 1.856 | 28.8 |
| 0.70 | 1.999 | 30.5 |
| 0.75 | 2.142 | 32.0 |

TABLE 3-continued

| Field | Image Height (mm) | CRA (Deg.) |
|---|---|---|
| 0.80 | 2.285 | 33.4 |
| 0.85 | 2.428 | 34.7 |
| 0.90 | 2.570 | 35.8 |
| 0.95 | 2.713 | 36.7 |
| 1.00 | 2.856 | 37.4 |

Embodiment 2

Figure 2A:
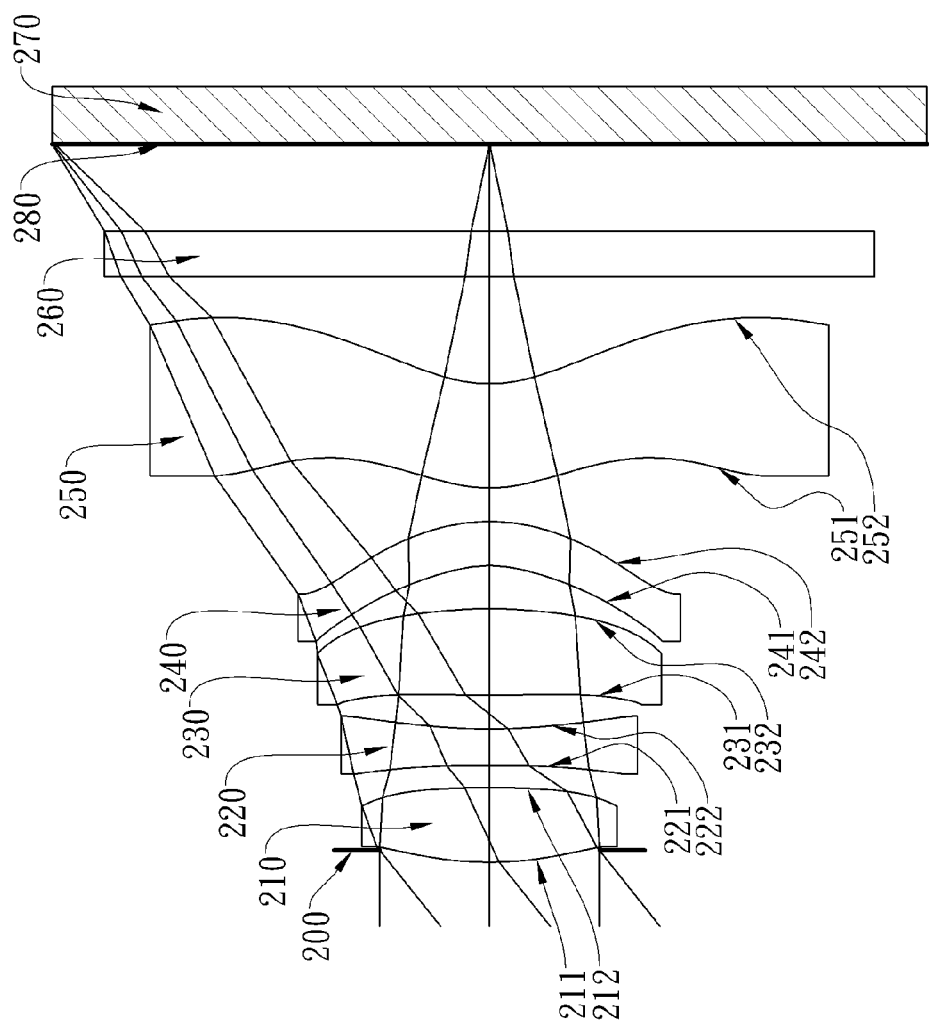
FIG. 2A shows an Image capturing lens system in accordance with a second embodiment of the present invention.
Figure 2B:
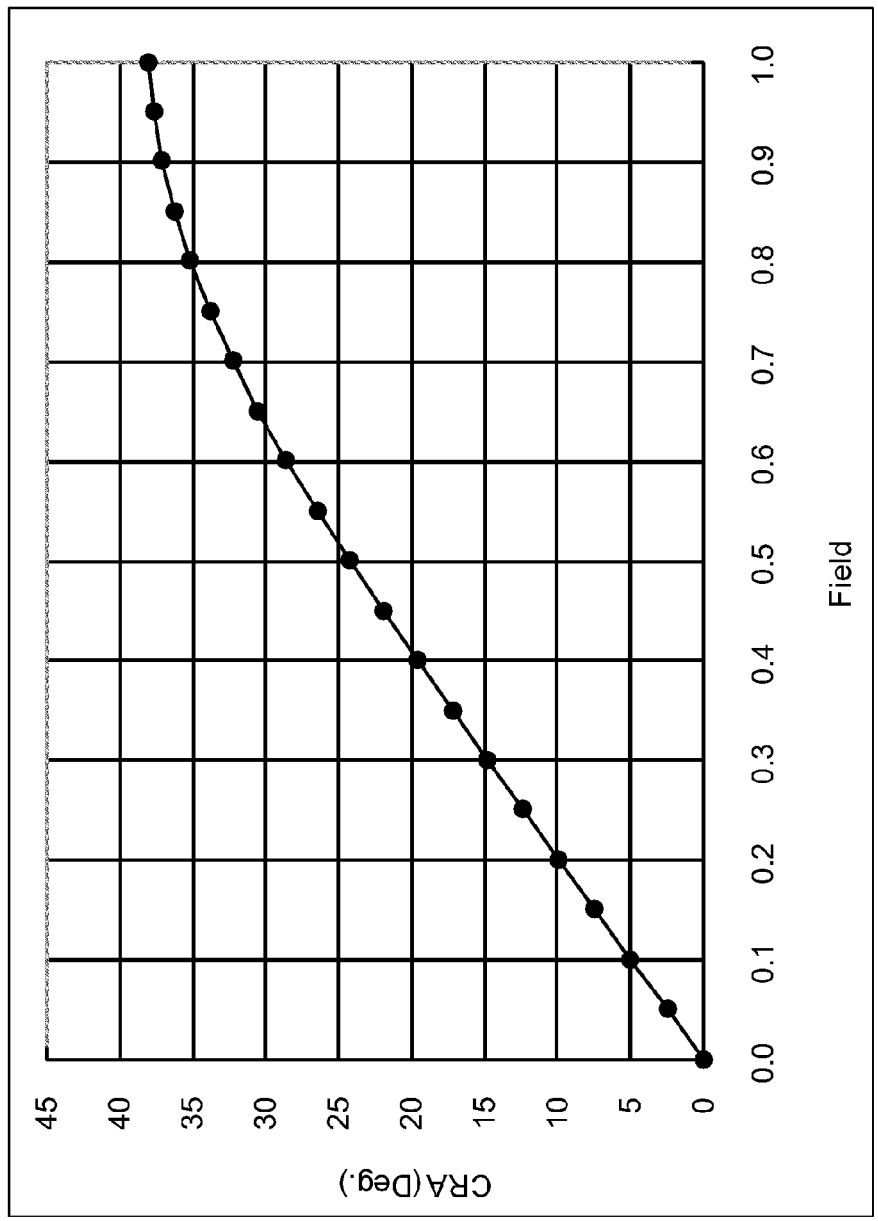
FIG. 2B shows the relation between CRA and field of view of the second embodiment of the present invention.
Figure 2C:
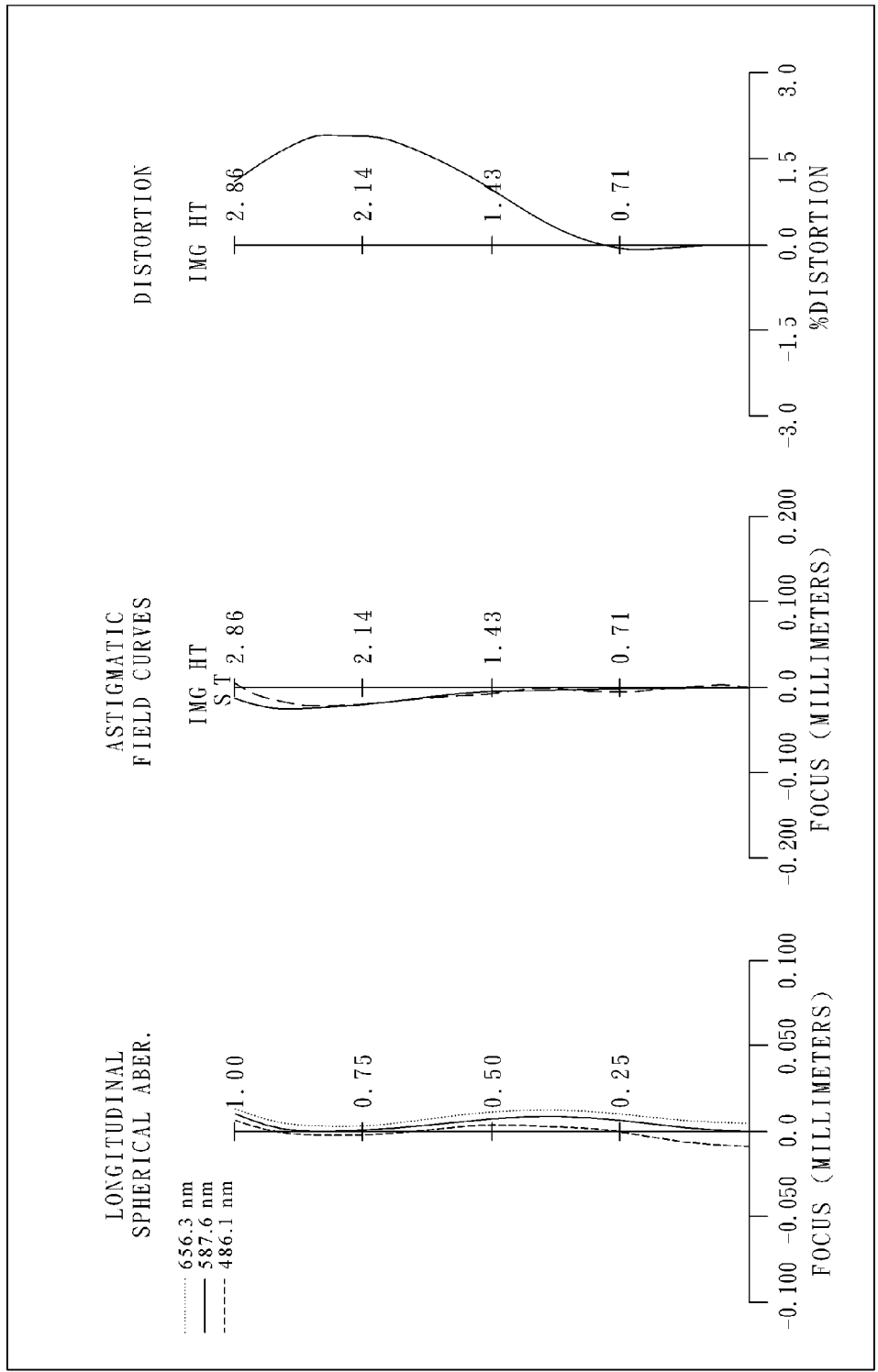
FIG. 2C shows the aberration curves of the second embodiment of the present invention.

FIG. 2A shows an Image capturing lens system in accordance with the second embodiment of the present invention, and FIG. 2C shows the aberration curves of the second embodiment of the present invention. The Image capturing lens system of the second embodiment of the present invention mainly comprises five non-cemented lens elements, in order from an object side to an image side:

a plastic first lens element 210 with positive refractive power having a convex object-side surface 211 and a convex image-side surface 212, the object-side and image-side surfaces 211 and 212 thereof being aspheric;

a plastic second lens element 220 with negative refractive power having a concave object-side surface 221 and a concave image-side surface 222, the object-side and image-side surfaces 221 and 222 thereof being aspheric;

a plastic third lens element 230 with positive refractive power having a convex object-side surface 231 and a convex image-side surface 232, the object-side and image-side surfaces 231 and 232 thereof being aspheric;

a plastic fourth lens element 240 with negative refractive power having a concave object-side surface 241 and a convex image-side surface 242, the object-side and image-side surfaces 241 and 242 thereof being aspheric; and a plastic fifth lens element 250 with positive refractive power having a convex object-side surface 251 and a concave image-side surface 252, the object-side and image-side surfaces 251 and 252 thereof being aspheric, and at least one inflection point is formed on both the object-side surface 251 and the image-side surface 252 thereof;

wherein an aperture stop 200 is disposed between an imaged object and the first lens element 210;

the Image capturing lens system further comprises an IR filter 260 disposed between the image-side surface 252 of the fifth lens element 250 and an image plane 280, and the IR filter 260 is made of glass and has no influence on the focal length of the Image capturing lens system; the Image capturing lens system further comprises an image sensor 270 provided on the image plane 280.

The detailed optical data of the second embodiment is shown in TABLE 4, and the aspheric surface data is shown in TABLE 5, wherein the units of the radius of curvature, the thickness and the focal length are expressed in mm, and HFOV is half of the maximal field of view.

TABLE 4

(Embodiment 2)
f = 3.53 mm, Fno = 2.46, HFOV = 38.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.079 | | | | |
| 2 | Lens 1 | 2.173410 (ASP) | 0.488 | Plastic | 1.535 | 56.3 | 3.27 |
| 3 | | −8.264500 (ASP) | 0.144 | | | | |
| 4 | Lens 2 | −49.765900 (ASP) | 0.240 | Plastic | 1.634 | 23.8 | −4.58 |
| 5 | | 3.085900 (ASP) | 0.222 | | | | |

TABLE 4-continued (Embodiment 2)
f = 3.53 mm, Fno = 2.46, HFOV = 38.6 deg.

| Surface # | | Curvature Radius | | Thickness | Material | Index | Abbe # | Focal length |
|---|---|---|---|---|---|---|---|---|
| 6 | Lens 3 | 10.942500 | (ASP) | 0.567 | Plastic | 1.535 | 56.3 | 4.32 |
| 7 | | −2.876180 | (ASP) | 0.281 | | | | |
| 8 | Lens 4 | −0.801830 | (ASP) | 0.290 | Plastic | 1.535 | 56.3 | −5.87 |
| 9 | | −1.212520 | (ASP) | 0.220 | | | | |
| 10 | Lens 5 | 0.935780 | (ASP) | 0.682 | Plastic | 1.535 | 56.3 | 8.68 |
| 11 | | 0.874600 | (ASP) | 0.700 | | | | |
| 12 | IR-filter | Plano | | 0.300 | Glass | 1.517 | 64.2 | — |
| 13 | | Plano | | 0.571 | | | | |
| 14 | Image | Plano | | — | | | | |

* Reference wavelength is 587.6 nm (d-line)

TABLE 5

Aspheric Coefficients

| | Surface # | | | | |
|---|---|---|---|---|---|
| | 2 | 3 | 4 | 5 | 6 |
| k = | −1.66123E+00 | 1.43813E+01 | 2.00000E+01 | −2.15151E+01 | 3.51112E+01 |
| A4 = | −2.73318E−02 | −1.42297E−01 | −2.43416E−01 | −1.37105E−01 | −9.69559E−02 |
| A6 = | −2.45328E−02 | 7.13400E−02 | 4.56479E−01 | 3.17429E−01 | −8.81104E−02 |
| A8 = | −1.26022E−01 | −1.38075E−01 | −4.42867E−01 | −2.98057E−01 | 1.39598E−01 |
| A10 = | 1.37152E−01 | 9.40797E−03 | 1.49910E−01 | 1.05315E−01 | 2.91333E−02 |
| A12 = | −1.80996E−01 | −2.63369E−02 | 2.18251E−02 | 1.53085E−02 | −2.78326E−01 |
| A14 = | −2.10085E−02 | 6.91512E−03 | 1.65083E−03 | −3.67513E−02 | 3.43775E−01 |
| A16 = | | | | | −1.61568E−01 |

| | Surface # | | | | |
|---|---|---|---|---|---|
| | 7 | 8 | 9 | 10 | 11 |
| k = | −5.00000E+01 | −6.13574E+00 | −4.70796E−01 | −5.29221E+00 | −3.79578E+00 |
| A4 = | −2.34781E−02 | 7.40164E−02 | 1.19198E−01 | −1.57147E−01 | −8.19015E−02 |
| A6 = | −1.61659E−01 | −4.47148E−01 | −1.33369E−01 | 5.23109E−02 | 2.95870E−02 |
| A8 = | 1.33306E−01 | 4.44522E−01 | 4.67754E−02 | −1.26638E−02 | −8.17949E−03 |
| A10 = | −3.97206E−02 | −1.51419E−01 | 6.23436E−02 | 1.64198E−03 | 1.53418E−03 |
| A12 = | −5.13183E−03 | 1.47426E−02 | −6.84953E−03 | 5.11461E−04 | −1.74879E−04 |
| A14 = | −1.68104E−03 | −8.35964E−03 | −2.00804E−02 | −1.83918E−04 | 9.22891E−06 |
| A16 = | | 1.91229E−04 | 6.07389E−03 | 1.46899E−05 | |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 6; wherein the units of HFOV, CRA1.0Y and CRA0.8Y are expressed in degree (deg.).

TABLE 6

(Embodiment 2)

| | |
|---|---|
| f | 3.53 |
| Fno | 2.46 |
| HFOV | 38.6 |
| V1-V2 | 32.5 |
| CRA1.0Y | 38.1 |
| CRA1.0Y-CRA0.8Y | 2.9 |
| (T12 + T45)/(T23 + T34) | 0.72 |
| f1/f5 | 0.38 |
| TTL/ImgH | 1.61 |

Please refer to FIG. 2B and the following table 7, which show the CRA of the second embodiment of the present Image capturing lens system; wherein one full image height of the image plane 280 is 2.856 mm, thus CRA0.8Y=35.2 deg, CRA1.0Y=38.1 deg.

TABLE 7

| Field | Image Height (mm) | CRA (Deg.) |
|---|---|---|
| 0.00 | 0.000 | 0.0 |
| 0.05 | 0.143 | 2.5 |
| 0.10 | 0.286 | 5.0 |
| 0.15 | 0.428 | 7.5 |
| 0.20 | 0.571 | 9.9 |
| 0.25 | 0.714 | 12.4 |
| 0.30 | 0.857 | 14.8 |
| 0.35 | 1.000 | 17.2 |
| 0.40 | 1.142 | 19.6 |
| 0.45 | 1.285 | 22.0 |
| 0.50 | 1.428 | 24.3 |
| 0.55 | 1.571 | 26.5 |
| 0.60 | 1.714 | 28.6 |
| 0.65 | 1.856 | 30.5 |
| 0.70 | 1.999 | 32.3 |
| 0.75 | 2.142 | 33.8 |
| 0.80 | 2.285 | 35.2 |

TABLE 7-continued

| Field | Image Height (mm) | CRA (Deg.) |
|---|---|---|
| 0.85 | 2.428 | 36.3 |
| 0.90 | 2.570 | 37.1 |
| 0.95 | 2.713 | 37.7 |
| 1.00 | 2.856 | 38.1 |

Embodiment 3

Figure 3A:
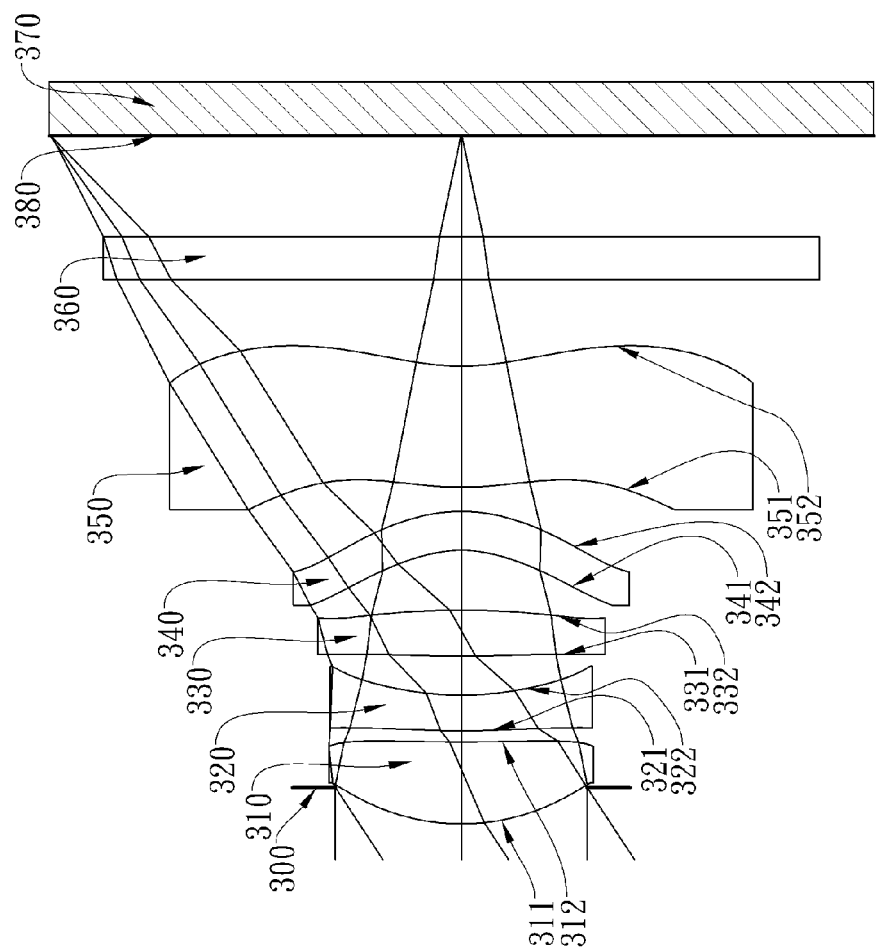
FIG. 3A shows an Image capturing lens system in accordance with a third embodiment of the present invention.
Figure 3B:
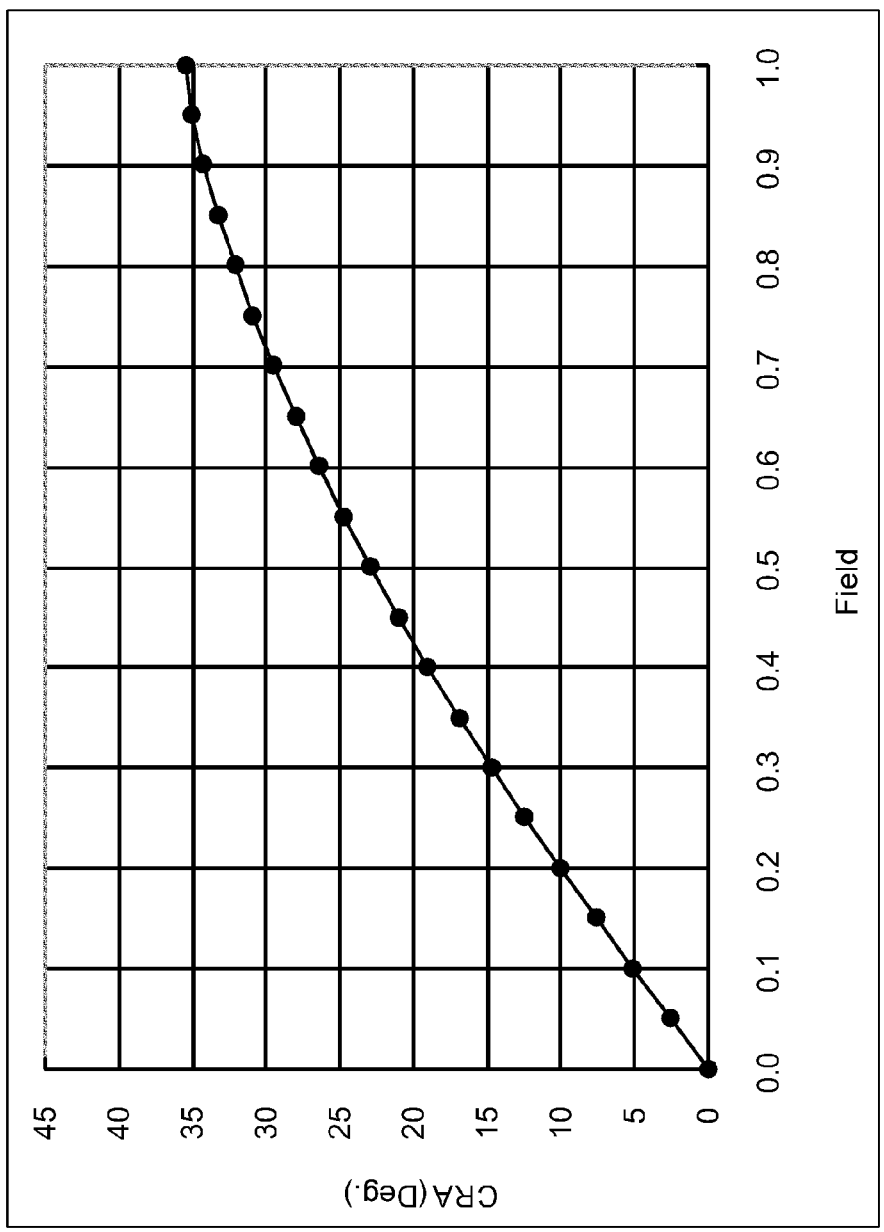
FIG. 3B shows the relation between CRA and field of view of the third embodiment of the present invention.
Figure 3C:
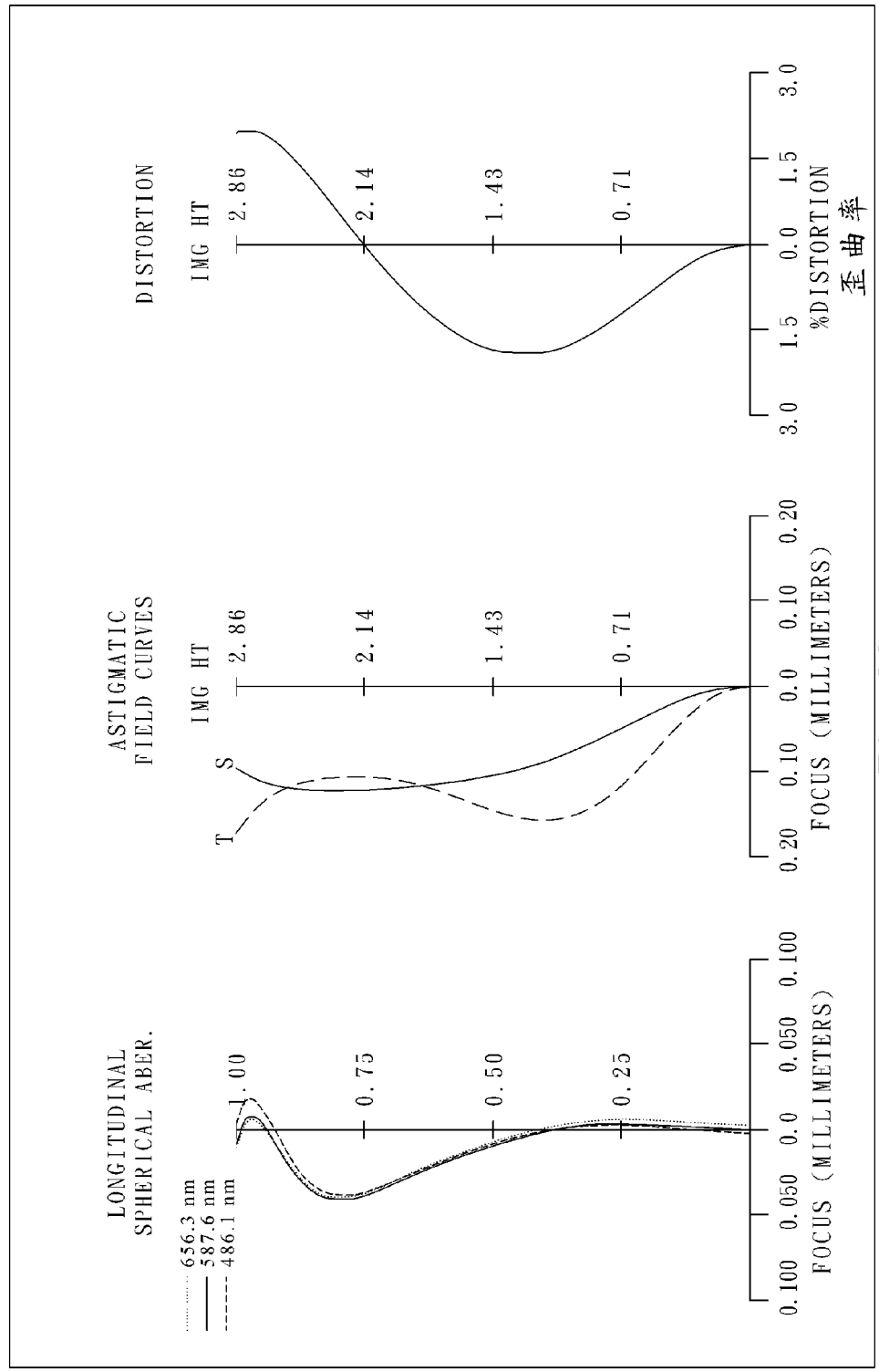
FIG. 3C shows the aberration curves of the third embodiment of the present invention.

FIG. 3A shows an Image capturing lens system in accordance with the third embodiment of the present invention, and FIG. 3C shows the aberration curves of the third embodiment of the present invention. The Image capturing lens system of the third embodiment of the present invention mainly comprises five non-cemented lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a convex object-side surface 321 and a concave image-side surface 322, the object-side and image-side surfaces 321 and 322 thereof being aspheric;

a plastic third lens element 330 with positive refractive power having a convex object-side surface 331 and a convex image-side surface 332, the object-side and image-side surfaces 331 and 332 thereof being aspheric;

a plastic fourth lens element 340 with negative refractive power having a concave object-side surface 341 and a convex image-side surface 342, the object-side and image-side surfaces 341 and 342 thereof being aspheric; and a plastic fifth lens element 350 with negative refractive power having a convex object-side surface 351 and a concave image-side surface 352, the object-side and image-side surfaces 351 and 352 thereof being aspheric, and at least one inflection point is formed on both the object-side surface 351 and the image-side surface 352 thereof;

wherein an aperture stop 300 is disposed between an imaged object and the first lens element 310;

the Image capturing lens system further comprises an IR filter 360 disposed between the image-side surface 352 of the fifth lens element 350 and an image plane 380, and the IR filter 360 is made of glass and has no influence on the focal length of the Image capturing lens system; the Image capturing lens system further comprises an image sensor 370 provided on the image plane 380.

The detailed optical data of the third embodiment is shown in TABLE 8, and the aspheric surface data is shown in TABLE 9, wherein the units of the radius of curvature, the thickness and the focal length are expressed in mm, and HFOV is half of the maximal field of view.

TABLE 8

(Embodiment 3)
f = 4.30 mm, Fno = 2.46, HFOV = 33.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.253 | | | | |
| 2 | Lens 1 | 1.489490 | (ASP) | 0.569 | Plastic | 1.544 | 55.9 | 3.09 |
| 3 | | 11.240100 | (ASP) | 0.077 | | | | |
| 4 | Lens 2 | 4.815100 | (ASP) | 0.248 | Plastic | 1.640 | 23.3 | −4.95 |
| 5 | | 1.872130 | (ASP) | 0.272 | | | | |
| 6 | Lens 3 | 7.977900 | (ASP) | 0.320 | Plastic | 1.544 | 55.9 | 5.88 |
| 7 | | −5.268100 | (ASP) | 0.416 | | | | |
| 8 | Lens 4 | −0.863850 | (ASP) | 0.271 | Plastic | 1.640 | 23.3 | −10.78 |
| 9 | | −1.108480 | (ASP) | 0.168 | | | | |
| 10 | Lens 5 | 2.078780 | (ASP) | 0.841 | Plastic | 1.544 | 55.9 | −31.49 |
| 11 | | 1.589580 | (ASP) | 0.600 | | | | |
| 12 | IR-filter | Plano | | 0.300 | Glass | 1.517 | 64.2 | — |
| 13 | | Plano | | 0.701 | | | | |
| 14 | Image | Plano | | — | | | | |

* Reference wavelength is 587.6 nm (d-line)

TABLE 9

Aspheric Coefficients

| | Surface # | | | | |
|---|---|---|---|---|---|
| | 2 | 3 | 4 | 5 | 6 |
| k = | −6.61957E−02 | 1.43813E+01 | −2.75884E+01 | −9.42344E+00 | 1.37553E+01 |
| A4 = | 1.20139E−03 | −9.04028E−02 | −2.37046E−01 | −8.79515E−02 | −7.21557E−02 |
| A6 = | 1.62367E−02 | 1.10983E−01 | 4.70672E−01 | 3.63708E−01 | −1.18544E−01 |
| A8 = | −9.75371E−02 | −1.26997E−01 | −4.85834E−01 | −3.49852E−01 | 2.31766E−01 |
| A10 = | 1.89099E−01 | −7.39570E−03 | 1.84921E−01 | 1.84294E−01 | −1.44510E−02 |
| A12 = | −1.78283E−01 | 4.98353E−03 | −7.23794E−03 | −1.95664E−03 | −2.77393E−01 |
| A14 = | 1.95720E−02 | −1.24324E−02 | 1.55376E−02 | −1.19316E−02 | 3.46270E−01 |
| A16 = | | | | | −1.54658E−01 |

TABLE 9-continued

Aspheric Coefficients

| Surface # | 7 | 8 | 9 | 10 | 11 |
|---|---|---|---|---|---|
| k = | −1.00000E+02 | −3.27343E+00 | −6.11864E−01 | −2.05626E+01 | −1.08918E+01 |
| A4 = | −1.08250E−02 | 1.29543E−01 | 1.80987E−01 | −1.64719E−01 | −8.17154E−02 |
| A6 = | −1.20923E−01 | −4.14515E−01 | −1.28450E−01 | 5.33108E−02 | 2.83519E−02 |
| A8 = | 1.74457E−01 | 4.56314E−01 | 4.26930E−02 | −1.18615E−02 | −8.09382E−03 |
| A10 = | −3.35362E−02 | −1.53044E−01 | 6.04710E−02 | 1.63236E−03 | 1.55298E−03 |
| A12 = | 8.49447E−04 | 1.04449E−02 | −7.77789E−03 | 5.37038E−04 | −1.78897E−04 |
| A14 = | 2.25726E−05 | −8.72405E−03 | −2.04224E−02 | −1.67792E−04 | 7.07618E−06 |
| A16 = | | 1.02847E−03 | 5.33899E−03 | 3.15230E−06 | |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 10; wherein the units of HFOV, CRA1.0Y and CRA0.8Y are expressed in degree (deg.).

TABLE 10

(Embodiment 3)

| | |
|---|---|
| f | 4.30 |
| Fno | 2.46 |
| HFOV | 33.3 |
| V1-V2 | 32.6 |
| CRA1.0Y | 35.5 |
| CRA1.0Y-CRA0.8Y | 3.3 |
| (T12 + T45)/(T23 + T34) | 0.36 |
| f1/f5 | −0.10 |
| TTL/ImgH | 1.64 |

Please refer to FIG. 3B and the following table 11, which show the CRA of the third embodiment of the present Image capturing lens system; wherein one full image height of the image plane 380 is 2.856 mm, thus CRA0.8Y=32.2 deg, CRA1.0Y=35.5 deg.

TABLE 11

| Field | Image Height (mm) | CRA (Deg.) |
|---|---|---|
| 0.00 | 0.000 | 0.0 |
| 0.05 | 0.143 | 2.6 |
| 0.10 | 0.286 | 5.1 |
| 0.15 | 0.428 | 7.7 |
| 0.20 | 0.571 | 10.1 |
| 0.25 | 0.714 | 12.5 |
| 0.30 | 0.857 | 14.8 |
| 0.35 | 1.000 | 17.0 |
| 0.40 | 1.142 | 19.1 |
| 0.45 | 1.285 | 21.1 |
| 0.50 | 1.428 | 23.0 |
| 0.55 | 1.571 | 24.8 |
| 0.60 | 1.714 | 26.5 |
| 0.65 | 1.856 | 28.0 |
| 0.70 | 1.999 | 29.5 |
| 0.75 | 2.142 | 30.9 |
| 0.80 | 2.285 | 32.2 |
| 0.85 | 2.428 | 33.3 |
| 0.90 | 2.570 | 34.3 |
| 0.95 | 2.713 | 35.1 |
| 1.00 | 2.856 | 35.5 |

Embodiment 4

Figure 4A:
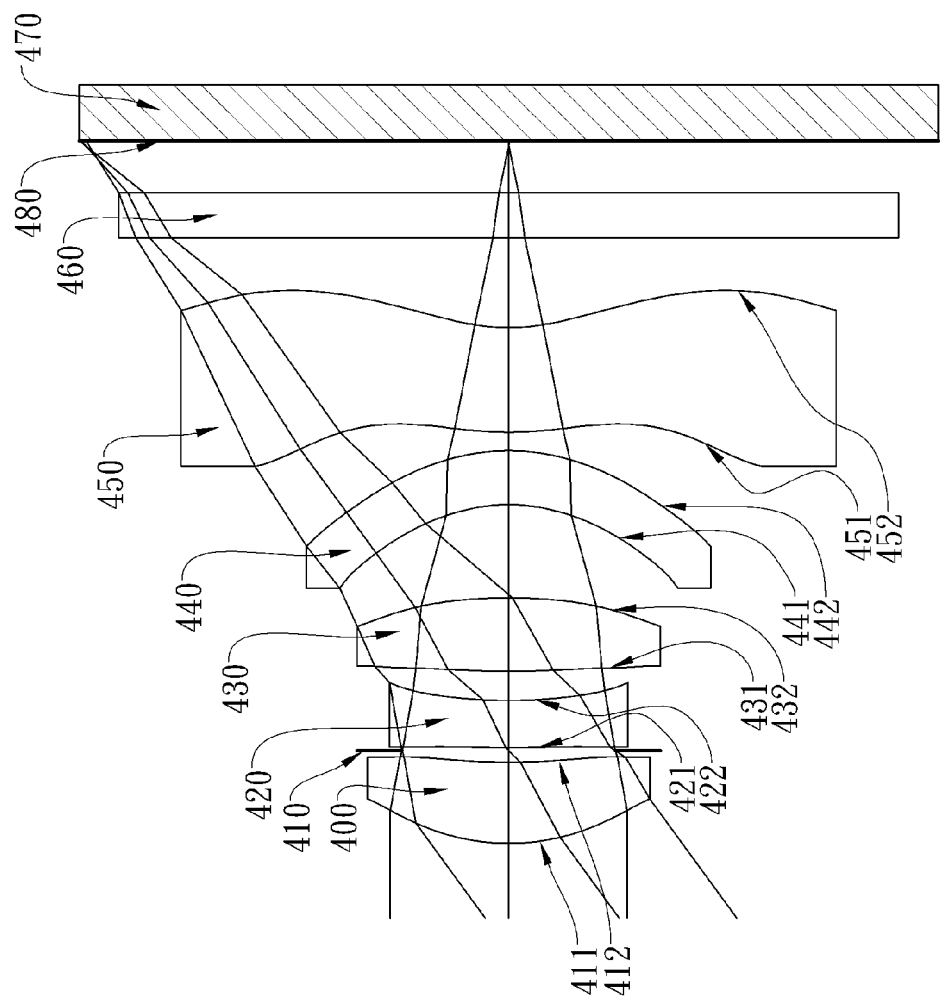
FIG. 4A shows an Image capturing lens system in accordance with a fourth embodiment of the present invention.
Figure 4B:
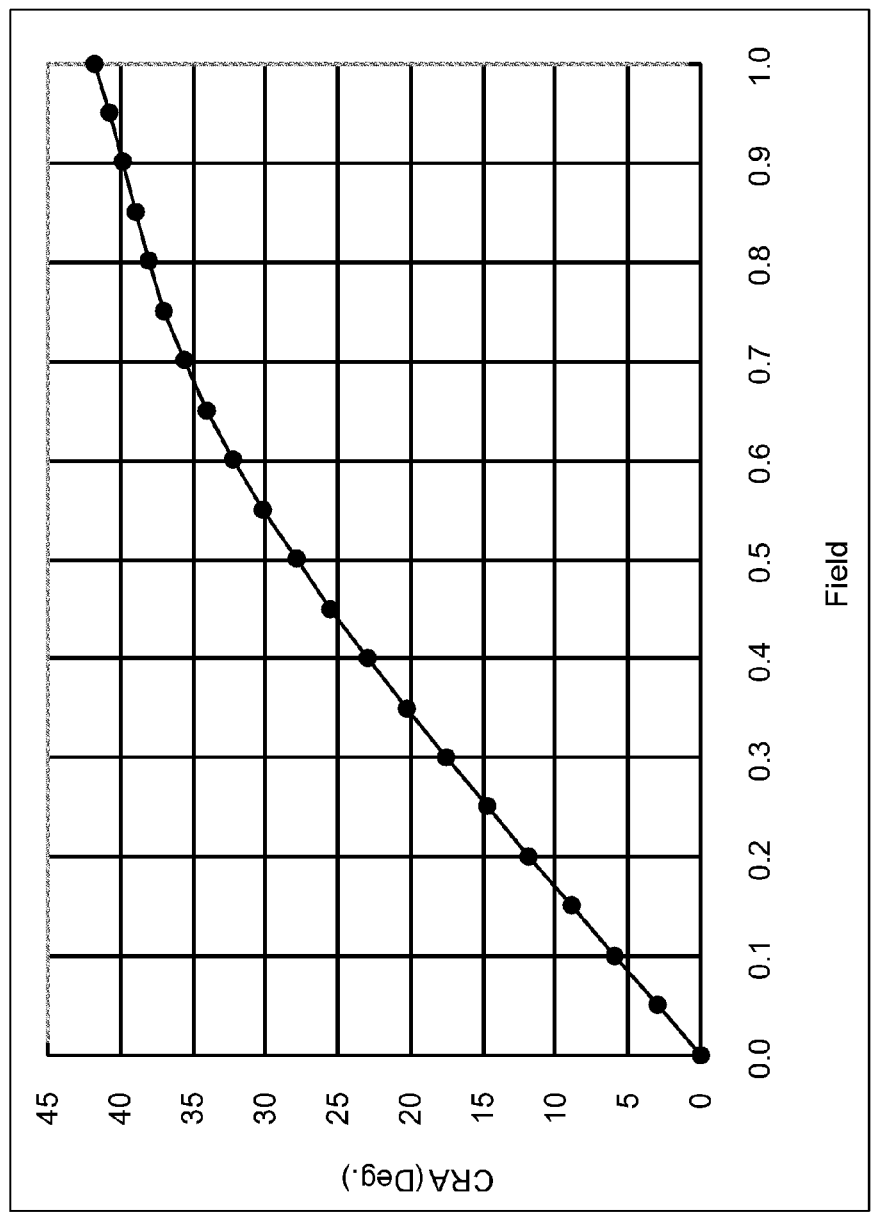
FIG. 4B shows the relation between CRA and field of view of the fourth embodiment of the present invention.
Figure 4C:
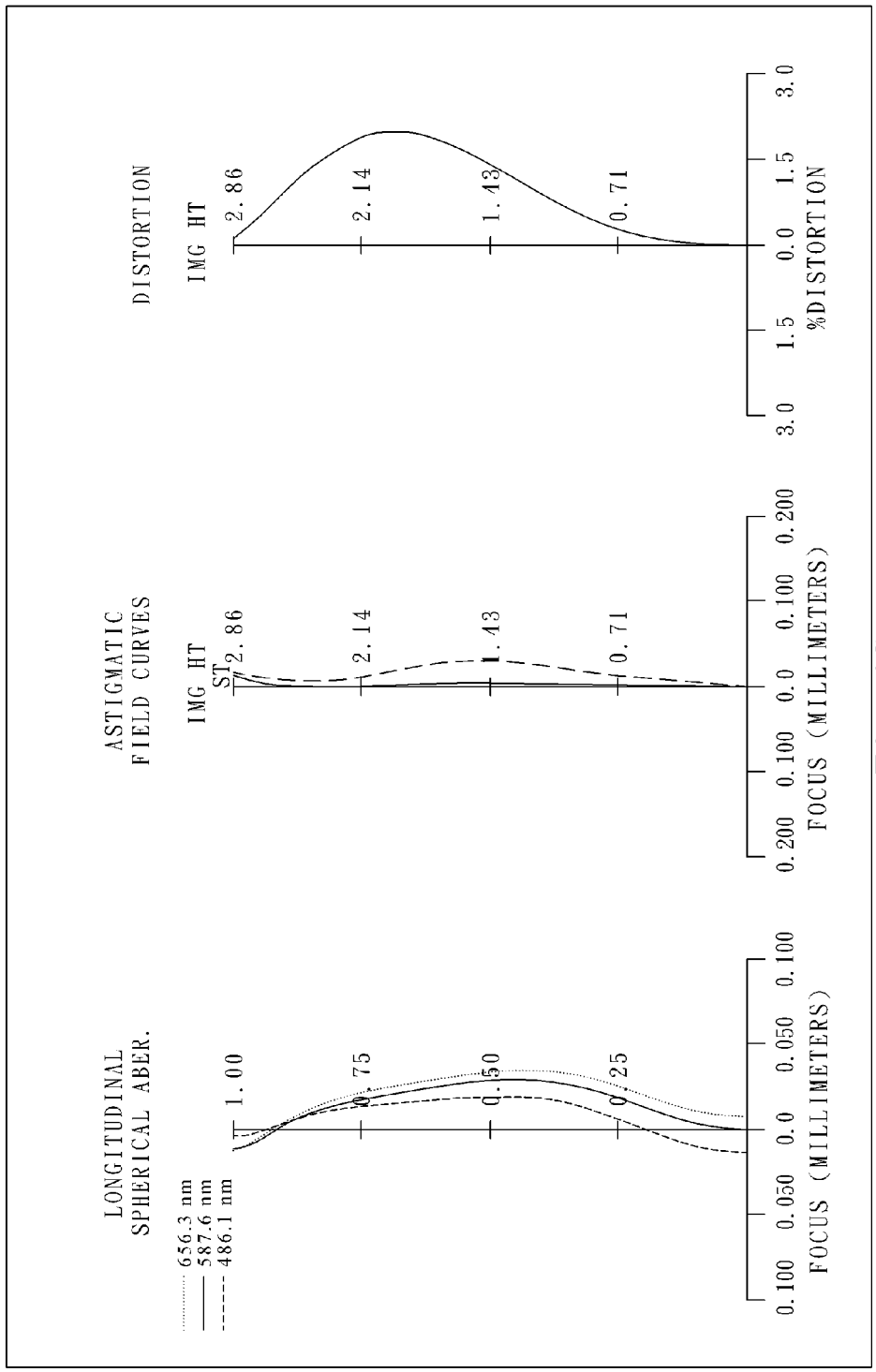
FIG. 4C shows the aberration curves of the fourth embodiment of the present invention.

FIG. 4A shows an Image capturing lens system in accordance with the fourth embodiment of the present invention, and FIG. 4C shows the aberration curves of the fourth embodiment of the present invention. The Image capturing lens system of the fourth embodiment of the present invention mainly comprises five non-cemented lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a convex object-side surface 421 and a concave image-side surface 422, the object-side and image-side surfaces 421 and 422 thereof being aspheric;

a plastic third lens element 430 with positive refractive power having a convex object-side surface 431 and a convex image-side surface 432, the object-side and image-side surfaces 431 and 432 thereof being aspheric;

a plastic fourth lens element 440 with negative refractive power having a concave object-side surface 441 and a convex image-side surface 442, the object-side and image-side surfaces 441 and 442 thereof being aspheric; and a plastic fifth lens element 450 with negative refractive power having a convex object-side surface 451 and a concave image-side surface 452, the object-side and image-side surfaces 451 and 452 thereof being aspheric, and at least one inflection point is formed on both the object-side surface 451 and the image-side surface 452 thereof;

wherein an aperture stop 400 is disposed between the first lens element 410 and the second lens element 420;

the Image capturing lens system further comprises an IR filter 460 disposed between the image-side surface 452 of the fifth lens element 450 and an image plane 480, and the IR filter 460 is made of glass and has no influence on the focal length of the Image capturing lens system; the Image capturing lens system further comprises an image sensor 470 provided on the image plane 480.

The detailed optical data of the fourth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 4)
f = 3.89 mm, Fno = 2.46, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.461550 (ASP) | 0.541 | Plastic | 1.544 | 55.9 | 4.15 |
| 2 | | 3.608000 (ASP) | 0.079 | | | | |
| 3 | Ape. Stop | Plano | 0.020 | | | | |
| 4 | Lens 2 | 8.905600 (ASP) | 0.314 | Plastic | 1.634 | 23.8 | −6.57 |
| 5 | | 2.798890 (ASP) | 0.195 | | | | |
| 6 | Lens 3 | 4.713500 (ASP) | 0.492 | Plastic | 1.544 | 55.9 | 3.87 |
| 7 | | −3.663200 (ASP) | 0.624 | | | | |
| 8 | Lens 4 | −1.104830 (ASP) | 0.360 | Plastic | 1.634 | 23.8 | −22.80 |
| 9 | | −1.347500 (ASP) | 0.123 | | | | |
| 10 | Lens 5 | 2.080080 (ASP) | 0.700 | Plastic | 1.544 | 55.9 | −8.64 |
| 11 | | 1.271110 (ASP) | 0.600 | | | | |
| 12 | IR-filter | Plano | 0.300 | Glass | 1.517 | 64.2 | — |
| 13 | | Plano | 0.349 | | | | |
| 14 | Image | Plano | — | | | | |

* Reference wavelength is 587.6 nm (d-line)

TABLE 13

Aspheric Coefficients

| | Surface # | | | | |
|---|---|---|---|---|---|
| | 1 | 2 | 4 | 5 | 6 |
| k = | −2.14944E−01 | 1.43813E+01 | −8.44882E+01 | −1.20099E+01 | −2.03037E+01 |
| A4 = | −1.41695E−02 | −1.97189E−01 | −2.37809E−01 | −1.24569E−01 | −1.31422E−01 |
| A6 = | 5.94592E−02 | 9.98624E−02 | 4.75319E−01 | 4.07448E−01 | 7.81618E−03 |
| A8 = | −2.06559E−01 | −9.66015E−02 | −3.85618E−01 | −1.83820E−01 | 1.55346E−01 |
| A10 = | 2.65459E−01 | −1.12920E−01 | 5.91359E−02 | 1.41802E−02 | 1.91765E−02 |
| A12 = | −1.73009E−01 | −3.51899E−02 | 1.70813E−02 | 1.54530E−02 | −2.79591E−01 |
| A14 = | −3.62292E−03 | 6.93643E−03 | −7.61153E−03 | −4.03665E−02 | 3.41477E−01 |
| A16 = | | | | | −1.62513E−01 |

| | Surface # | | | | |
|---|---|---|---|---|---|
| | 7 | 8 | 9 | 10 | 11 |
| k = | −1.78786E+01 | −3.46677E+00 | −3.52703E−01 | −1.56169E+01 | −6.29881E+00 |
| A4 = | −9.34072E−02 | 4.72951E−02 | 1.27249E−01 | −1.66653E−01 | −7.49457E−02 |
| A6 = | −8.80933E−02 | −4.34127E−01 | −1.38734E−01 | 5.05339E−02 | 2.75418E−02 |
| A8 = | 1.39578E−01 | 4.51366E−01 | 3.73655E−02 | −1.18038E−02 | −8.23131E−03 |
| A10 = | −1.20164E−02 | −1.47457E−01 | 5.56825E−02 | 1.93497E−03 | 1.57091E−03 |
| A12 = | −2.13617E−02 | 1.47690E−02 | −9.97086E−03 | 5.48904E−04 | −1.73186E−04 |
| A14 = | −2.56032E−03 | −1.38318E−02 | −2.06141E−02 | −1.83349E−04 | 9.19346E−06 |
| A16 = | | −2.96287E−03 | 6.87663E−03 | 8.45456E−06 | |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 14; wherein the units of HFOV, CRA1.0Y and CRA0.8Y are expressed in degree (deg.).

TABLE 14

(Embodiment 4)

| | |
|---|---|
| f | 3.89 |
| Fno | 2.46 |
| HFOV | 36.1 |
| V1−V2 | 32.1 |
| CRA1.0Y | 41.7 |

TABLE 14-continued (Embodiment 4)

| | |
|---|---|
| CRA1.0Y−CRA0.8Y | 3.7 |
| (T12 + T45)/(T23 + T34) | 0.27 |
| f1/f5 | −0.48 |
| TTL/ImgH | 1.61 |

Please refer to FIG. 4B and the following table 15, which show the CRA of the fourth embodiment of the present Image capturing lens system; wherein one full image height of the image plane 480 is 2.856 mm, thus CRA0.8Y=38.1 deg, CRA1.0Y=41.7 deg.

TABLE 15

| Field | Image Height (mm) | CRA (Deg.) |
|---|---|---|
| 0.00 | 0.000 | 0.0 |
| 0.05 | 0.143 | 3.0 |
| 0.10 | 0.286 | 6.0 |
| 0.15 | 0.428 | 8.9 |
| 0.20 | 0.571 | 11.9 |
| 0.25 | 0.714 | 14.7 |
| 0.30 | 0.857 | 17.6 |
| 0.35 | 1.000 | 20.3 |
| 0.40 | 1.142 | 23.0 |
| 0.45 | 1.285 | 25.5 |
| 0.50 | 1.428 | 27.9 |
| 0.55 | 1.571 | 30.2 |
| 0.60 | 1.714 | 32.2 |
| 0.65 | 1.856 | 34.1 |
| 0.70 | 1.999 | 35.6 |
| 0.75 | 2.142 | 37.0 |
| 0.80 | 2.285 | 38.1 |
| 0.85 | 2.428 | 39.0 |
| 0.90 | 2.570 | 39.8 |
| 0.95 | 2.713 | 40.7 |
| 1.00 | 2.856 | 41.7 |

Embodiment 5

Figure 5A:
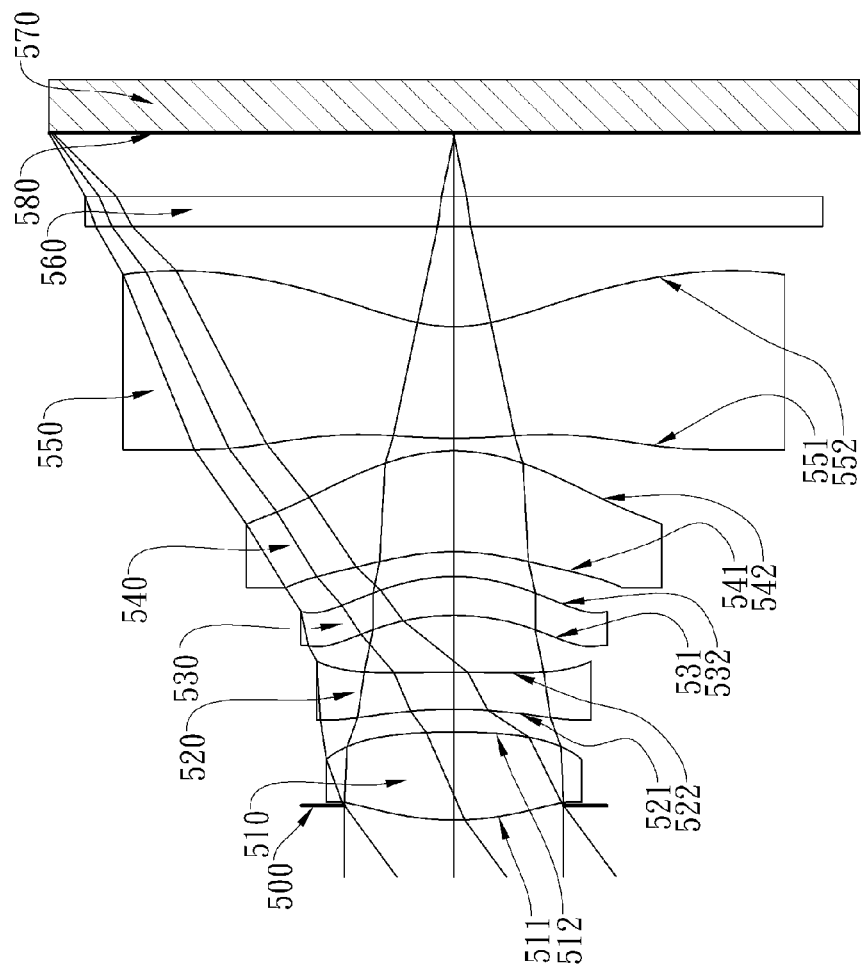
FIG. 5A shows an Image capturing lens system in accordance with a fifth embodiment of the present invention.
Figure 5B:
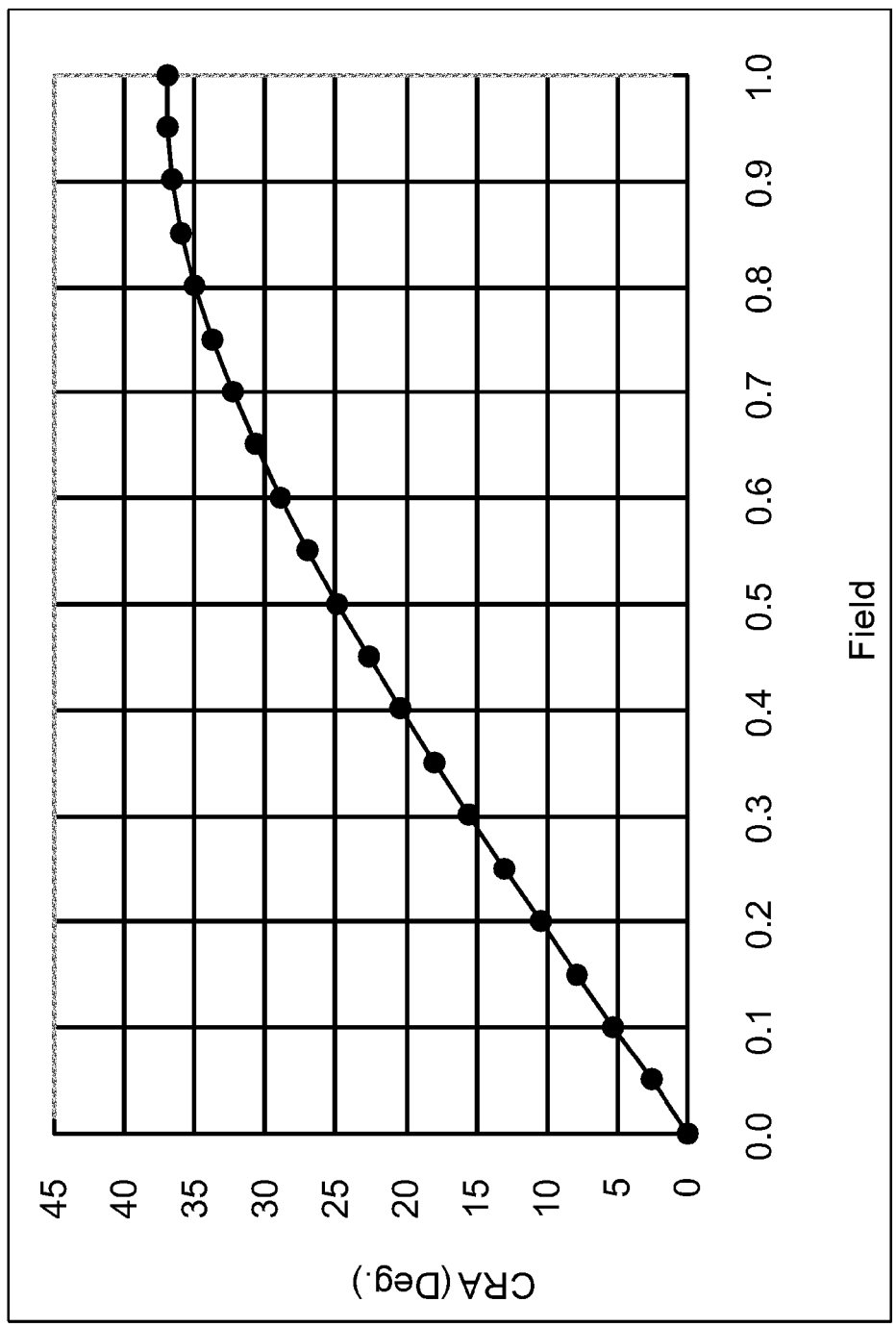
FIG. 5B shows the relation between CRA and field of view of the fifth embodiment of the present invention.
Figure 5C:
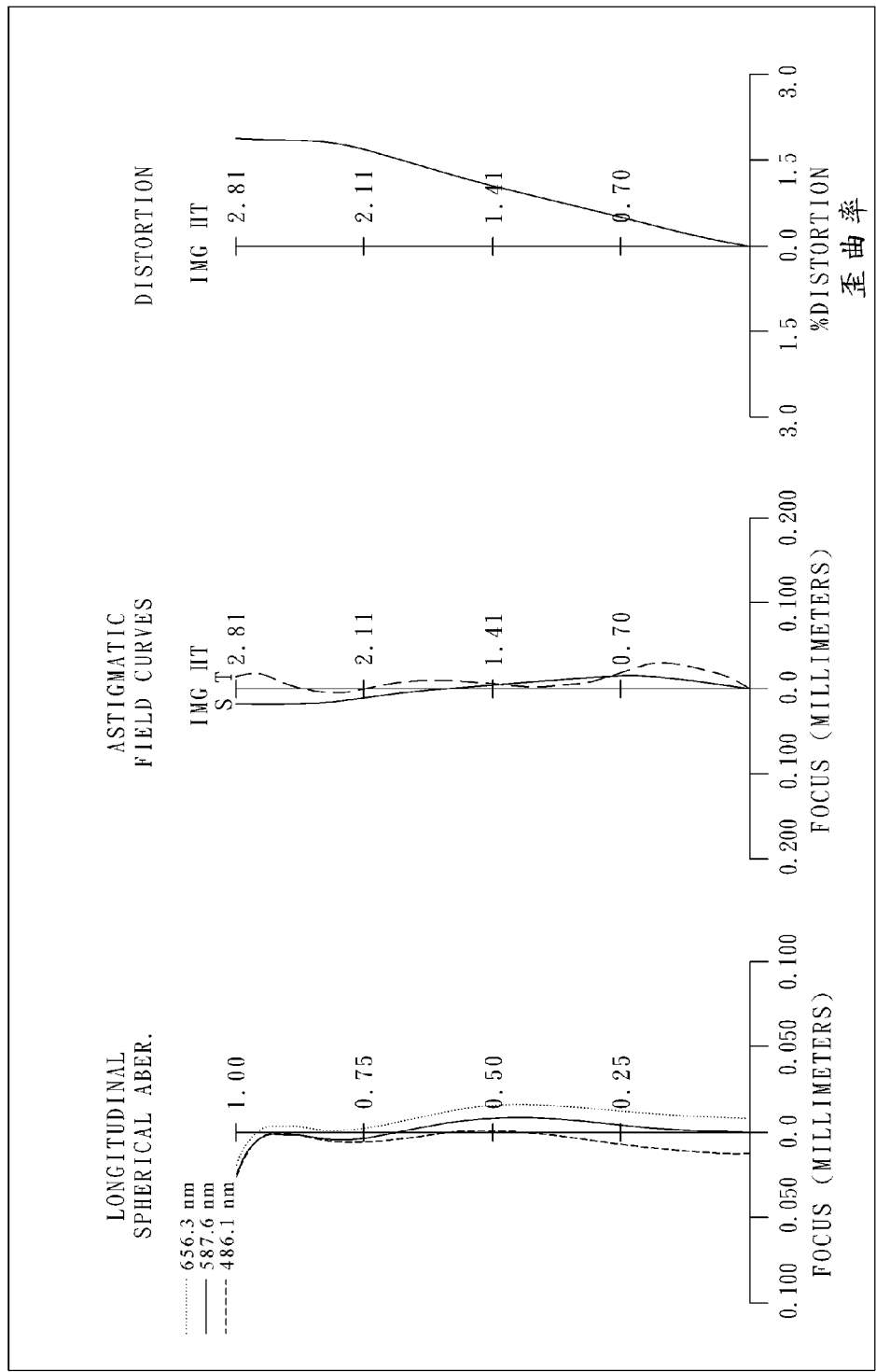
FIG. 5C shows the aberration curves of the fifth embodiment of the present invention.

FIG. 5A shows an Image capturing lens system in accordance with the fifth embodiment of the present invention, and FIG. 5C shows the aberration curves of the fifth embodiment of the present invention. The Image capturing lens system of the fifth embodiment of the present invention mainly comprises five non-cemented lens elements, in order from an object side to an image side:

a plastic first lens element 510 with positive refractive power having a convex object-side surface 511 and a convex image-side surface 512, the object-side and image-side surfaces 511 and 512 thereof being aspheric;

a plastic second lens element 520 with negative refractive power having a concave object-side surface 521 and a convex image-side surface 522, the object-side and image-side surfaces 521 and 522 thereof being aspheric;

a plastic third lens element 530 with positive refractive power having a concave object-side surface 531 and a convex image-side surface 532, the object-side and image-side surfaces 531 and 532 thereof being aspheric;

a plastic fourth lens element 540 with positive refractive power having a concave object-side surface 541 and a convex image-side surface 542, the object-side and image-side surfaces 541 and 542 thereof being aspheric; and a plastic fifth lens element 550 with negative refractive power having a convex object-side surface 551 and a concave image-side surface 552, the object-side and image-side surfaces 551 and 552 thereof being aspheric, and at least one inflection point is formed on both the object-side surface 551 and the image-side surface 552 thereof;

wherein an aperture stop 500 is disposed between an imaged object and the first lens element 510;

the Image capturing lens system further comprises an IR filter 560 disposed between the image-side surface 552 of the fifth lens element 550 and an image plane 580, and the IR filter 560 is made of glass and has no influence on the focal length of the Image capturing lens system; the Image capturing lens system further comprises an image sensor 570 provided on the image plane 580.

The detailed optical data of the fifth embodiment is shown in TABLE 16, and the aspheric surface data is shown in TABLE 17, wherein the units of the radius of curvature, the thickness and the focal length are expressed in mm, and HFOV is half of the maximal field of view.

TABLE 16

(Embodiment 5)
f = 3.75 mm, Fno = 2.45, HFOV = 36.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.102 | | | | |
| 2 | Lens 1 | 1.932010 | (ASP) | 0.615 | Plastic | 1.535 | 56.3 | 2.72 |
| 3 | | −5.242700 | (ASP) | 0.159 | | | | |
| 4 | Lens 2 | −3.455700 | (ASP) | 0.258 | Plastic | 1.650 | 21.4 | −6.97 |
| 5 | | −14.992500 | (ASP) | 0.399 | | | | |
| 6 | Lens 3 | −1.740070 | (ASP) | 0.271 | Plastic | 1.535 | 56.3 | 8.35 |
| 7 | | −1.320160 | (ASP) | 0.174 | | | | |
| 8 | Lens 4 | −1.600030 | (ASP) | 0.706 | Plastic | 1.535 | 56.3 | 6.44 |
| 9 | | −1.260090 | (ASP) | 0.087 | | | | |
| 10 | Lens 5 | 3.402200 | (ASP) | 0.780 | Plastic | 1.530 | 55.8 | −3.24 |
| 11 | | 1.051180 | (ASP) | 0.700 | | | | |
| 12 | IR-filter | Plano | | 0.210 | Glass | 1.517 | 64.2 | — |
| 13 | | Plano | | 0.443 | | | | |
| 14 | Image | Plano | | — | | | | |

* Reference wavelength is 587.6 nm (d-line)

TABLE 17

Aspheric Coefficients

| Surface # | | | | |
|---|---|---|---|---|
| 2 | 3 | 4 | 5 | 6 |
| k = −2.39094E+00 | −3.75042E+01 | −6.89186E+00 | −3.17808E+01 | 9.61018E−01 |
| A4 = 1.34523E−03 | −1.48379E−01 | 2.07830E−03 | 7.88374E−02 | −7.55694E−02 |
| A6 = −7.57016E−02 | −7.33273E−02 | 3.20407E−02 | 5.56152E−02 | 1.06426E−01 |
| A8 = 3.87888E−02 | 7.93494E−02 | 3.11904E−02 | −9.34118E−04 | 1.72349E−01 |

TABLE 17-continued

| Aspheric Coefficients | | | | |
|---|---|---|---|---|
| A10 = | −1.64485E−01 | −8.93457E−02 | | −5.75340E−02 |

| | Surface # | | | | |
|---|---|---|---|---|---|
| | 7 | 8 | 9 | 10 | 11 |
| k = | −1.57721E+00 | 5.60463E−01 | −1.09862E+00 | −6.31444E+01 | −5.35693E+00 |
| A4 = | 1.25435E−02 | 3.02684E−01 | 7.28420E−02 | −1.28932E−01 | −6.17981E−02 |
| A6 = | 5.43574E−02 | −1.83743E−01 | −3.22849E−03 | 6.30537E−02 | 2.21665E−02 |
| A8 = | 1.07427E−02 | 1.14429E−01 | 5.65453E−03 | −1.38153E−02 | −5.15511E−03 |
| A10 = | 2.05248E−02 | −5.20961E−02 | −9.67698E−03 | 1.63678E−03 | 6.94174E−04 |
| A12 = | | 1.69204E−02 | 8.07600E−03 | −1.00315E−04 | −4.85476E−05 |
| A14 = | | | −2.73625E−03 | 5.96721E−07 | 1.31354E−06 |
| A16 = | | | 2.35647E−04 | | |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 18; wherein the units of HFOV, CRA1.0Y and CRA0.8Y are expressed in degree (deg.).

TABLE 18

| (Embodiment 5) | |
|---|---|
| f | 3.75 |
| Fno | 2.45 |
| HFOV | 36.3 |
| V1-V2 | 34.9 |
| CRA1.0Y | 37.0 |
| CRA1.0Y-CRA0.8Y | 2.0 |
| (T12 + T45)/(T23 + T34) | 0.43 |
| f1/f5 | −0.84 |
| TTL/ImgH | 1.68 |

Please refer to FIG. 5B and the following table 19, which show the CRA of the fifth embodiment of the present Image capturing lens system; wherein one full image height of the image plane 580 is 2.8125 mm, thus CRA0.8Y=35.0 deg, CRA1.0Y=37.0 deg.

TABLE 19

| Field | Image Height (mm) | CRA (Deg.) |
|---|---|---|
| 0.00 | 0.000 | 0.0 |
| 0.05 | 0.141 | 2.6 |
| 0.10 | 0.281 | 5.3 |
| 0.15 | 0.422 | 7.9 |
| 0.20 | 0.563 | 10.5 |
| 0.25 | 0.703 | 13.0 |
| 0.30 | 0.844 | 15.5 |
| 0.35 | 0.984 | 18.0 |
| 0.40 | 1.125 | 20.4 |
| 0.45 | 1.266 | 22.7 |
| 0.50 | 1.406 | 24.9 |
| 0.55 | 1.547 | 27.0 |
| 0.60 | 1.688 | 28.9 |
| 0.65 | 1.828 | 30.7 |
| 0.70 | 1.969 | 32.3 |
| 0.75 | 2.109 | 33.8 |
| 0.80 | 2.250 | 35.0 |
| 0.85 | 2.391 | 36.0 |
| 0.90 | 2.531 | 36.6 |
| 0.95 | 2.672 | 36.9 |
| 1.00 | 2.813 | 37.0 |

Embodiment 6

Figure 6A:
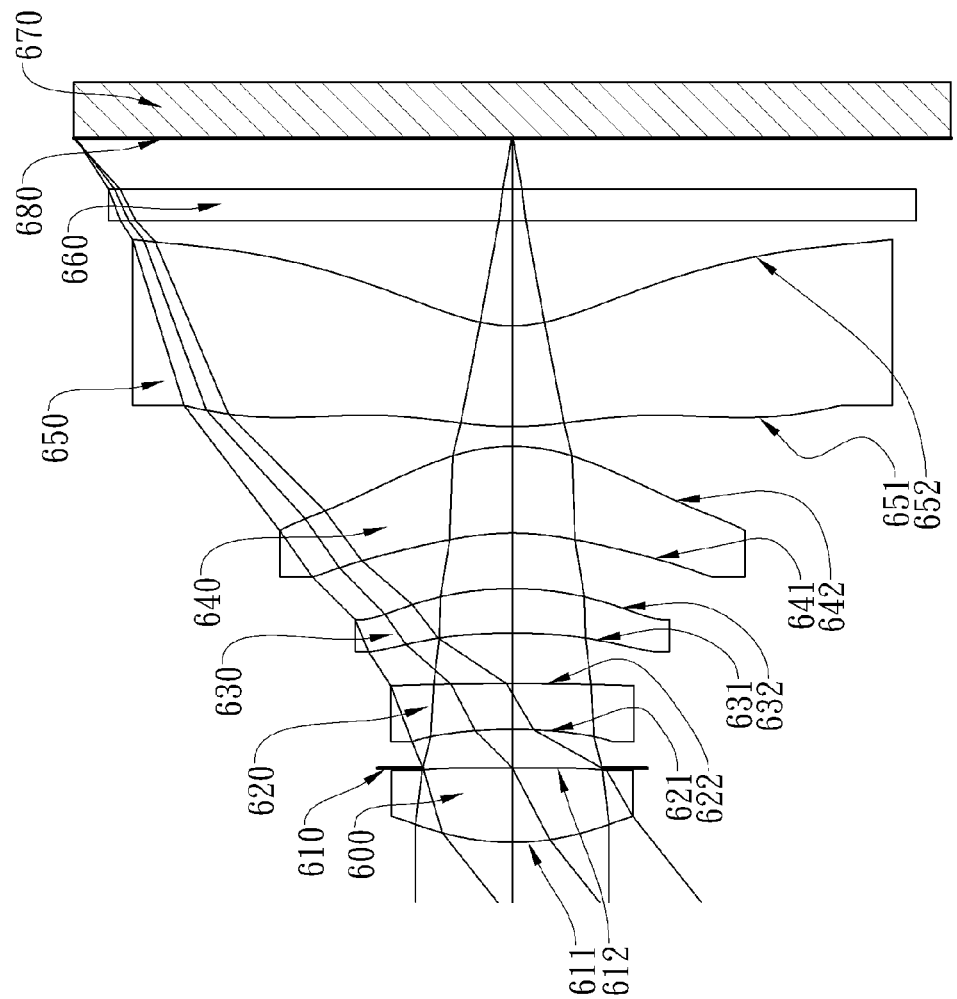
FIG. 6A shows an Image capturing lens system in accordance with a sixth embodiment of the present invention.
Figure 6B:
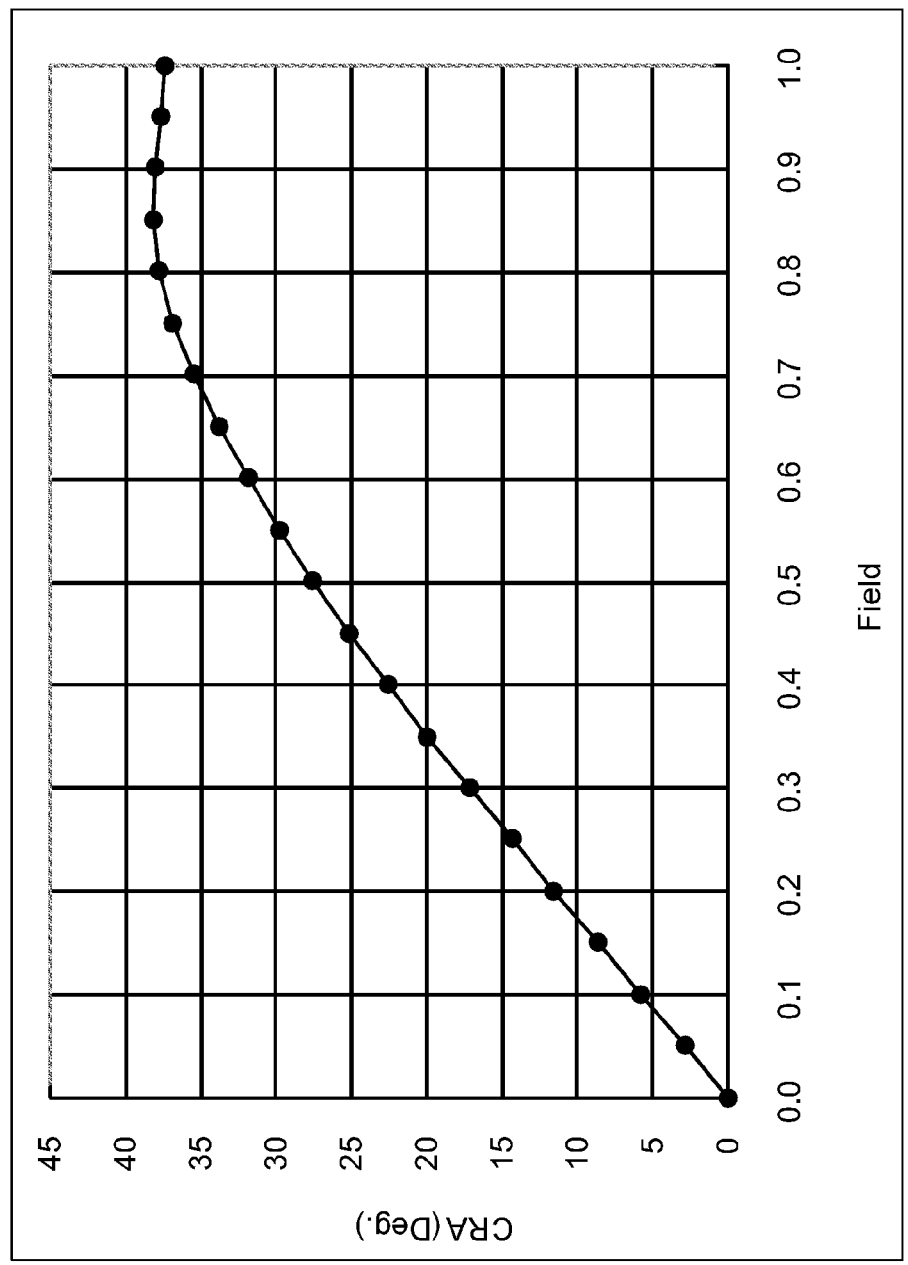
FIG. 6B shows the relation between CRA and field of view of the sixth embodiment of the present invention.
Figure 6C:
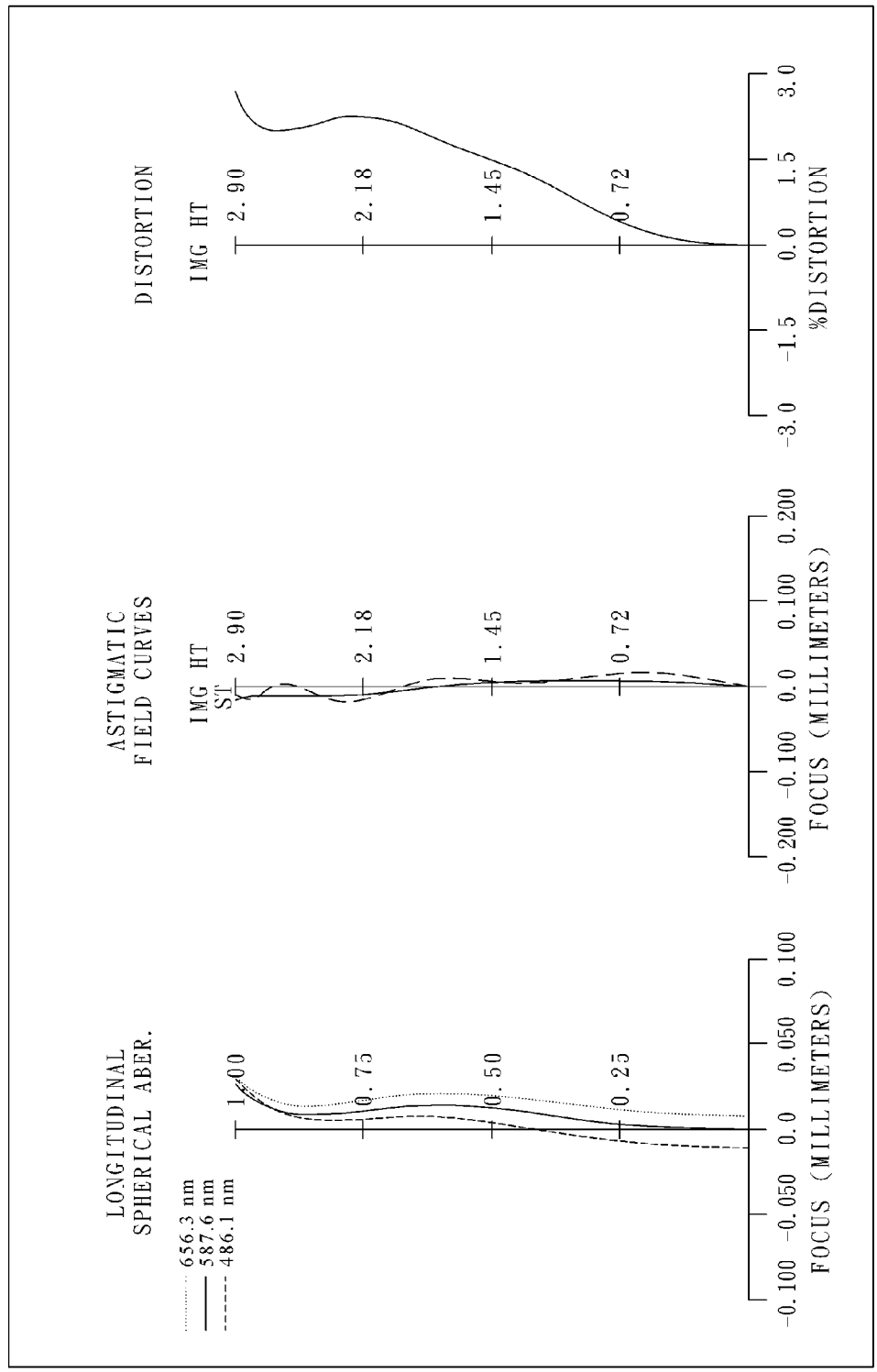
FIG. 6C shows the aberration curves of the sixth embodiment of the present invention.

FIG. 6A shows an Image capturing lens system in accordance with the sixth embodiment of the present invention, and FIG. 6C shows the aberration curves of the sixth embodiment of the present invention. The Image capturing lens system of the sixth embodiment of the present invention mainly comprises five non-cemented lens elements, in order from an object side to an image side:

a plastic first lens element 610 with positive refractive power having a convex object-side surface 611 and a convex image-side surface 612, the object-side and image-side surfaces 611 and 612 thereof being aspheric;

a plastic second lens element 620 with negative refractive power having a concave object-side surface 621 and a convex image-side surface 622, the object-side and image-side surfaces 621 and 622 thereof being aspheric;

a plastic third lens element 630 with positive refractive power having a concave object-side surface 631 and a convex image-side surface 632, the object-side and image-side surfaces 631 and 632 thereof being aspheric;

a plastic fourth lens element 640 with positive refractive power having a concave object-side surface 641 and a convex image-side surface 642, the object-side and image-side surfaces 641 and 642 thereof being aspheric; and a plastic fifth lens element 650 with negative refractive power having a convex object-side surface 651 and a concave image-side surface 652, the object-side and image-side surfaces 651 and 652 thereof being aspheric, and at least one inflection point is formed on both the object-side surface 651 and the image-side surface 652 thereof;

wherein an aperture stop 600 is disposed between the first lens element 610 and the second lens element 620;

the Image capturing lens system further comprises an IR filter 660 disposed between the image-side surface 652 of the fifth lens element 650 and an image plane 680, and the IR filter 660 is made of glass and has no influence on the focal length of the Image capturing lens system; the Image capturing lens system further comprises an image sensor 670 provided on the image plane 680.

The detailed optical data of the sixth embodiment is shown in TABLE 20, and the aspheric surface data is shown in TABLE 21, wherein the units of the radius of curvature, the thickness and the focal length are expressed in mm, and HFOV is half of the maximal field of view.

TABLE 20

(Embodiment 6)
f = 3.53 mm, Fno = 2.75, HFOV = 38.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.728850 | (ASP) | 0.495 | Plastic | 1.530 | 55.8 | 3.22 |
| 2 | | −121.118400 | (ASP) | 0.000 | | | | |
| 3 | Ape. Stop | Plano | | 0.256 | | | | |
| 4 | Lens 2 | −3.538500 | (ASP) | 0.304 | Plastic | 1.650 | 21.4 | −6.44 |
| 5 | | −23.809500 | (ASP) | 0.336 | | | | |
| 6 | Lens 3 | −4.330600 | (ASP) | 0.296 | Plastic | 1.530 | 55.8 | 7.70 |
| 7 | | −2.150860 | (ASP) | 0.370 | | | | |
| 8 | Lens 4 | −1.743420 | (ASP) | 0.577 | Plastic | 1.544 | 55.9 | 4.91 |
| 9 | | −1.178090 | (ASP) | 0.131 | | | | |
| 10 | Lens 5 | 2.103750 | (ASP) | 0.669 | Plastic | 1.544 | 55.9 | −3.46 |
| 11 | | 0.882840 | (ASP) | 0.700 | | | | |
| 12 | IR-filter | Plano | | 0.210 | Glass | 1.517 | 64.2 | — |
| 13 | | Plano | | 0.337 | | | | |
| 14 | Image | Plano | | — | | | | |

* Reference wavelength is 587.6 nm (d-line)

TABLE 21

Aspheric Coefficients

| | Surface # | | | | |
|---|---|---|---|---|---|
| | 1 | 2 | 4 | 5 | 6 |
| k = | −1.14787E+00 | −9.00000E+01 | −2.61638E+01 | −9.00000E+01 | −2.31860E+00 |
| A4 = | 2.41666E−02 | −4.80522E−02 | −1.26742E−01 | −9.86815E−03 | −1.01332E−01 |
| A6 = | −7.61230E−02 | −1.60052E−01 | 1.33457E−02 | 3.98519E−02 | 2.43875E−02 |
| A8 = | 1.86955E−01 | 1.47319E−01 | −1.06051E−01 | −4.79704E−02 | 7.96562E−02 |
| A10 = | −3.16234E−01 | −2.54435E−01 | | | −1.42463E−02 |

| | Surface # | | | | |
|---|---|---|---|---|---|
| | 7 | 8 | 9 | 10 | 11 |
| k = | −1.02210E+00 | 1.80595E−01 | −1.55862E+00 | −1.69503E+01 | −4.40788E+00 |
| A4 = | −1.66005E−02 | 2.33234E−01 | 7.19218E−02 | −1.23481E−01 | −6.44247E−02 |
| A6 = | −2.37179E−02 | −1.70606E−01 | −5.09643E−03 | 5.99210E−02 | 2.36153E−02 |
| A8 = | 1.92866E−02 | 1.16136E−01 | 4.59311E−03 | −1.35426E−02 | −5.15596E−03 |
| A10 = | 4.69984E−02 | −5.28968E−02 | −1.04609E−02 | 1.67049E−03 | 6.31833E−04 |
| A12 = | | 1.14457E−02 | 7.84549E−03 | −1.00866E−04 | −3.76220E−05 |
| A14 = | | | −2.66431E−03 | 1.59975E−06 | 7.75331E−07 |
| A16 = | | | 3.12531E−04 | | |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 22; wherein the units of HFOV, CRA1.0Y and CRA0.8Y are expressed in degree (deg.).

Please refer to FIG. 6B and the following table 23, which show the CRA of the sixth embodiment of the present Image capturing lens system; wherein one full image height of the image plane 680 is 2.9 mm, thus CRA0.8Y=37.8 deg, CRA1.0Y=37.5 deg.

TABLE 22

(Embodiment 6)

| | |
|---|---|
| f | 3.53 |
| Fno | 2.75 |
| HFOV | 38.6 |
| V1-V2 | 34.4 |
| CRA1.0Y | 37.5 |
| CRA1.0Y-CRA0.8Y | −0.3 |
| (T12 + T45)/(T23 + T34) | 0.55 |
| f1/f5 | −0.93 |
| TTL/ImgH | 1.59 |

TABLE 23

| Field | Image Height (mm) | CRA (Deg.) |
|---|---|---|
| 0.00 | 0.000 | 0.0 |
| 0.05 | 0.145 | 2.9 |
| 0.10 | 0.290 | 5.8 |
| 0.15 | 0.435 | 8.7 |
| 0.20 | 0.580 | 11.6 |
| 0.25 | 0.725 | 14.4 |
| 0.30 | 0.870 | 17.2 |
| 0.35 | 1.015 | 20.0 |
| 0.40 | 1.160 | 22.6 |
| 0.45 | 1.305 | 25.2 |
| 0.50 | 1.450 | 27.6 |
| 0.55 | 1.595 | 29.8 |

TABLE 23-continued

| Field | Image Height (mm) | CRA (Deg.) |
|---|---|---|
| 0.60 | 1.740 | 31.9 |
| 0.65 | 1.885 | 33.8 |
| 0.70 | 2.030 | 35.5 |
| 0.75 | 2.175 | 36.9 |
| 0.80 | 2.320 | 37.8 |
| 0.85 | 2.465 | 38.2 |
| 0.90 | 2.610 | 38.1 |
| 0.95 | 2.755 | 37.7 |
| 1.00 | 2.900 | 37.5 |

Embodiment 7

Figure 7A:
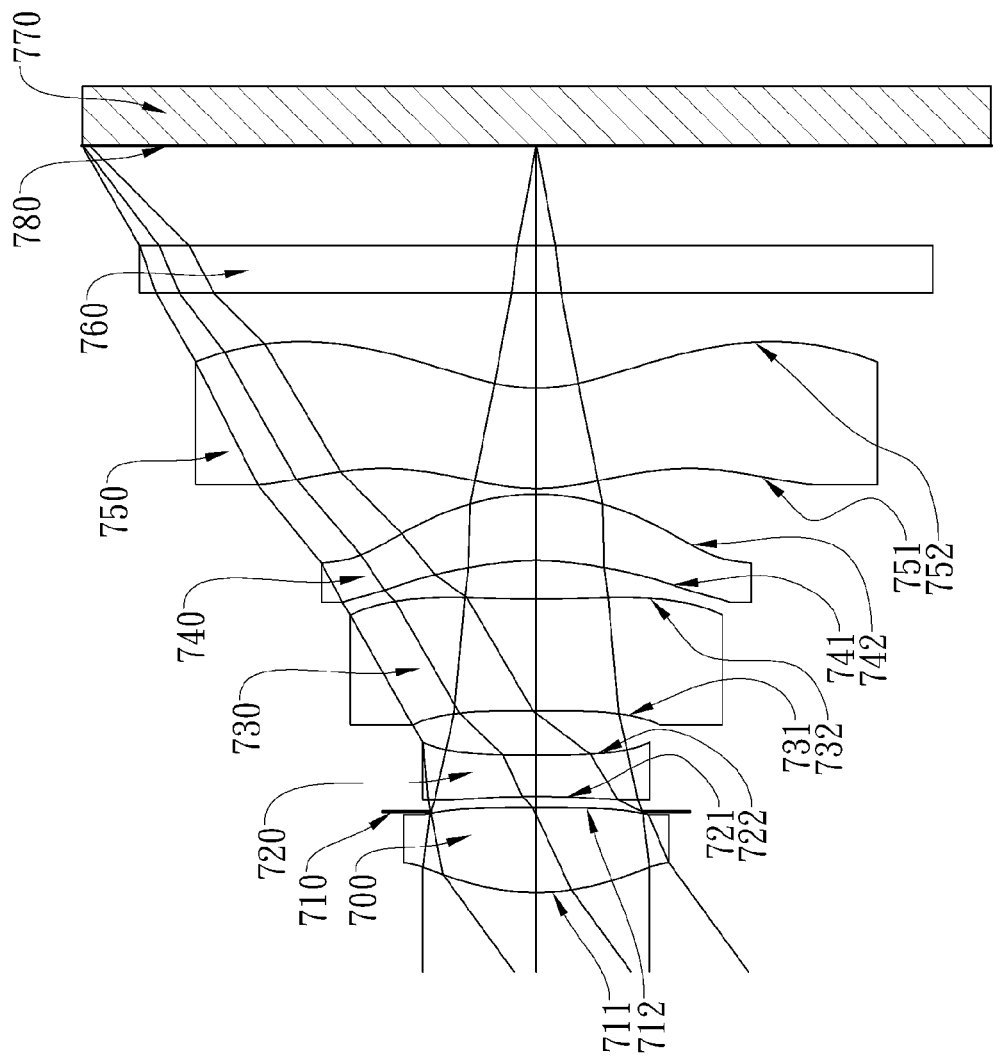
FIG. 7A shows an Image capturing lens system in accordance with a seventh embodiment of the present invention.
Figure 7B:
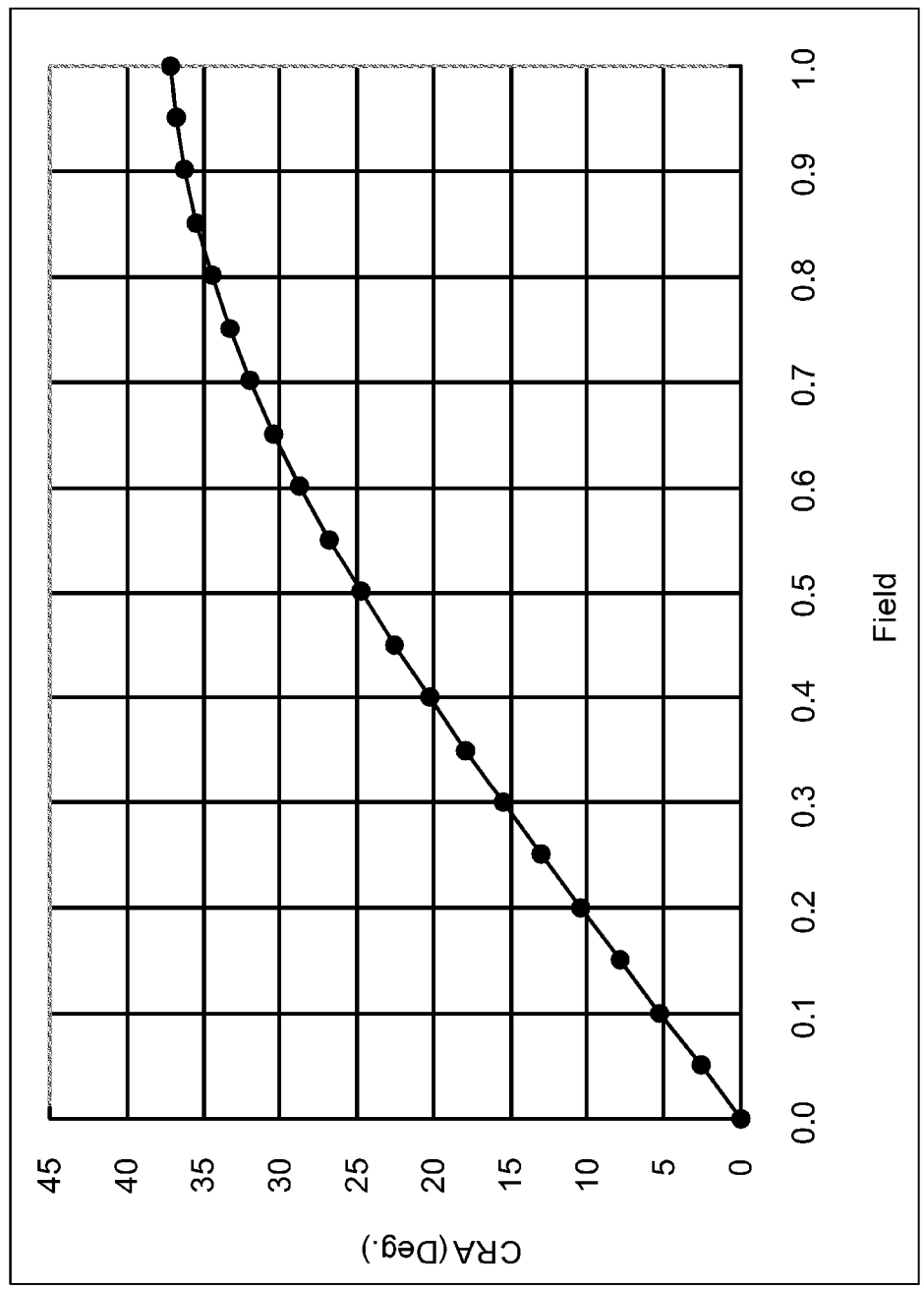
FIG. 7B shows the relation between CRA and field of view of the seventh embodiment of the present invention.
Figure 7C:
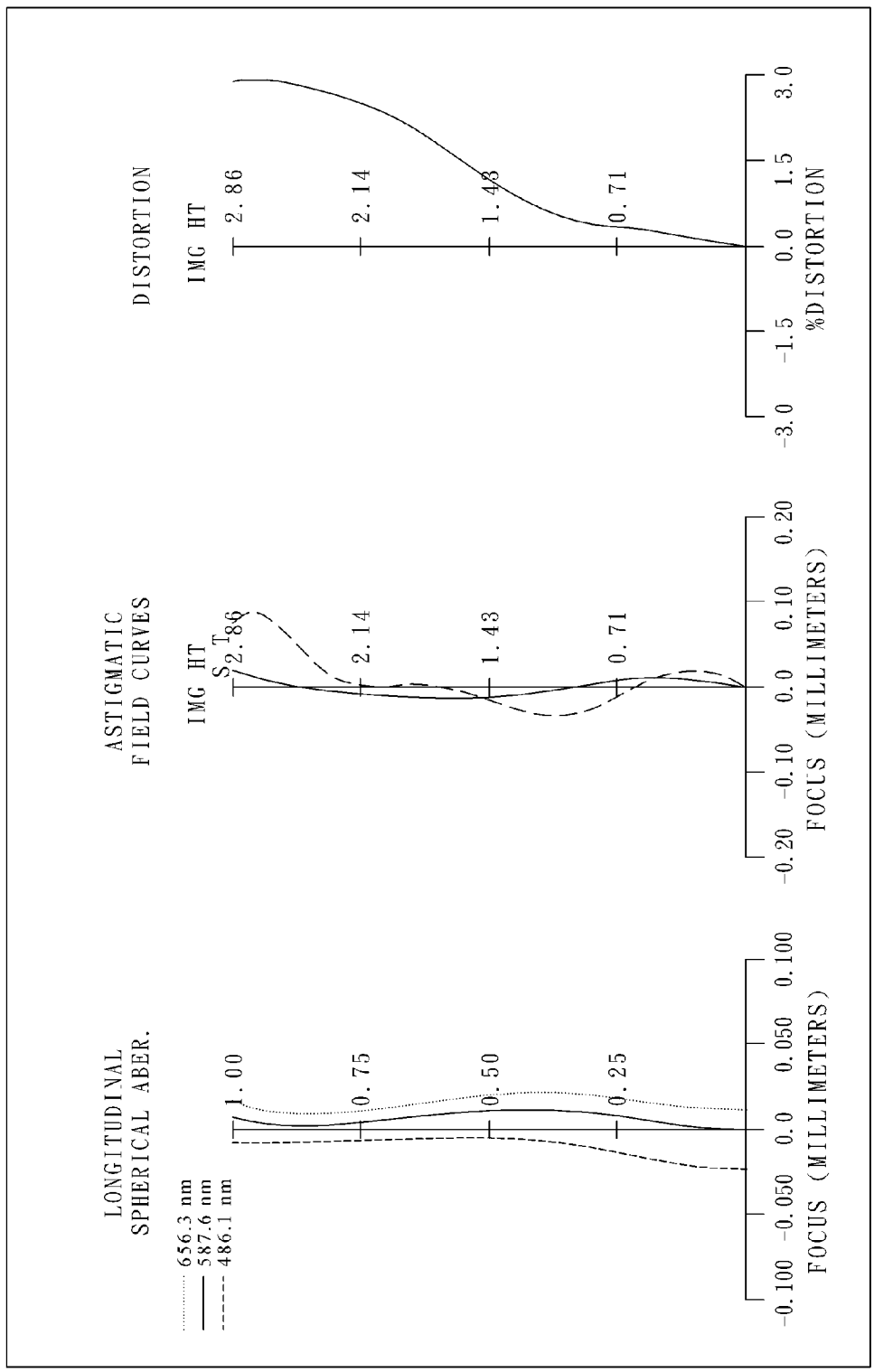
FIG. 7C shows the aberration curves of the seventh embodiment of the present invention.

FIG. 7A shows an Image capturing lens system in accordance with the seventh embodiment of the present invention, and FIG. 7C shows the aberration curves of the seventh embodiment of the present invention. The Image capturing lens system of the seventh embodiment of the present invention mainly comprises five non-cemented lens elements, in order from an object side to an image side:

a glass first lens element 710 with positive refractive power having a convex object-side surface 711 and a concave image-side surface 712, the object-side and image-side surfaces 711 and 712 thereof being aspheric;

a plastic second lens element 720 with negative refractive power having a concave object-side surface 721 and a concave image-side surface 722, the object-side and image-side surfaces 721 and 722 thereof being aspheric;

a plastic third lens element 730 with negative refractive power having a concave object-side surface 731 and a concave image-side surface 732, the object-side and image-side surfaces 731 and 732 thereof being aspheric;

a plastic fourth lens element 740 with positive refractive power having a concave object-side surface 741 and a convex image-side surface 742, the object-side and image-side surfaces 741 and 742 thereof being aspheric; and a plastic fifth lens element 750 with negative refractive power having a convex object-side surface 751 and a concave image-side surface 752, the object-side and image-side surfaces 751 and 752 thereof being aspheric, and at least one inflection point is formed on both the object-side surface 751 and the image-side surface 752 thereof;

wherein an aperture stop 700 is disposed between the first lens element 710 and the second lens element 720; the Image capturing lens system further comprises an IR filter 760 disposed between the image-side surface 752 of the fifth lens element 750 and an image plane 780, and the IR filter 760 is made of glass and has no influence on the focal length of the Image capturing lens system; the Image capturing lens system further comprises an image sensor 770 provided on the image plane 780.

The detailed optical data of the seventh embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 7)
f = 3.80 mm, Fno = 2.66, HFOV = 36.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.518910 | (ASP) | 0.534 | Glass | 1.606 | 43.9 | 2.55 |
| 2 | | 84.297100 | (ASP) | −0.025 | | | | |
| 3 | Ape. Stop | Plano | | 0.095 | | | | |
| 4 | Lens 2 | −6.762400 | (ASP) | 0.259 | Plastic | 1.633 | 23.4 | −5.42 |
| 5 | | 7.053000 | (ASP) | 0.282 | | | | |
| 6 | Lens 3 | −45.045000 | (ASP) | 0.706 | Plastic | 1.583 | 30.2 | −12.25 |
| 7 | | 8.539400 | (ASP) | 0.243 | | | | |
| 8 | Lens 4 | −1.510400 | (ASP) | 0.419 | Plastic | 1.535 | 56.3 | 12.20 |
| 9 | | −1.344950 | (ASP) | 0.035 | | | | |
| 10 | Lens 5 | 1.222520 | (ASP) | 0.632 | Plastic | 1.535 | 56.3 | −220.60 |
| 11 | | 0.992070 | (ASP) | 0.600 | | | | |
| 12 | IR-filter | Plano | | 0.300 | Glass | 1.517 | 64.2 | — |
| 13 | | Plano | | 0.630 | | | | |
| 14 | Image | Plano | | — | | | | |

* Reference wavelength is 587.6 nm (d-line)

TABLE 25

Aspheric Coefficients

| | Surface # | | | | |
|---|---|---|---|---|---|
| | 1 | 2 | 4 | 5 | 6 |
| k = | −5.48572E−01 | 1.43813E+01 | −1.11861E+01 | 2.00000E+01 | 2.00000E+01 |
| A4 = | −8.77589E−03 | −2.19496E−01 | −1.29774E−01 | 1.51549E−02 | −2.12647E−01 |
| A6 = | 9.29972E−03 | 1.20687E−01 | 5.54426E−01 | 4.27206E−01 | −1.83439E−02 |
| A8 = | −2.15965E−01 | −1.21064E−01 | −4.89781E−01 | −3.90354E−01 | 1.26217E−01 |
| A10 = | 1.34891E−01 | 1.13708E−02 | 2.82006E−01 | 3.24196E−01 | −1.30879E−01 |
| A12 = | −1.70676E−01 | −2.63380E−02 | 2.18240E−02 | 1.53074E−02 | −2.78326E−01 |

TABLE 25-continued

| Aspheric Coefficients | | | | | |
|---|---|---|---|---|---|
| A14 = | −2.10083E−02 | 6.91449E−03 | 1.65020E−03 | −3.67519E−02 | 3.43775E−01 |
| A16 = | | | | | −1.61568E−01 |

| | Surface # | | | | |
|---|---|---|---|---|---|
| | 7 | 8 | 9 | 10 | 11 |
| k = | 1.26596E+01 | −2.10744E+01 | −4.16059E−01 | −9.95724E+00 | −5.97800E+00 |
| A4 = | −6.87614E−02 | 9.04644E−02 | 1.30928E−01 | −1.42413E−01 | −7.40276E−02 |
| A6 = | −1.16761E−01 | −4.31735E−01 | −1.40910E−01 | 5.39194E−02 | 2.65036E−02 |
| A8 = | 1.41938E−01 | 4.43891E−01 | 4.47950E−02 | −1.25394E−02 | −8.06968E−03 |
| A10 = | −5.37972E−02 | −1.51897E−01 | 6.12950E−02 | 1.53572E−03 | 1.59930E−03 |
| A12 = | −1.00481E−02 | 1.34896E−02 | −6.87483E−03 | 4.69226E−04 | −1.73863E−04 |
| A14 = | 7.62729E−03 | −6.69945E−03 | −2.02387E−02 | −1.89450E−04 | 7.79377E−06 |
| A16 = | | 2.48163E−03 | 5.61894E−03 | 1.64383E−05 | |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 26; wherein the units of HFOV, CRA1.0Y and CRA0.8Y are expressed in degree (deg.).

TABLE 26

| (Embodiment 7) | |
|---|---|
| f | 3.80 |
| Fno | 2.66 |
| HFOV | 36.1 |
| V1-V2 | 20.5 |
| CRA1.0Y | 37.2 |
| CRA1.0Y-CRA0.8Y | 2.7 |
| (T12 + T45)/(T23 + T34) | 0.20 |
| f1/f5 | −0.01 |
| TTL/ImgH | 1.61 |

Please refer to FIG. 7B and the following table 27, which show the CRA of the seventh embodiment of the present Image capturing lens system; wherein one full image height of the image plane 780 is 2.856 mm, thus CRA0.8Y=34.5 deg, CRA1.0Y=37.2 deg.

TABLE 27

| Field | Image Height (mm) | CRA (Deg.) |
|---|---|---|
| 0.00 | 0.000 | 0.0 |
| 0.05 | 0.143 | 2.7 |
| 0.10 | 0.286 | 5.3 |
| 0.15 | 0.428 | 7.9 |
| 0.20 | 0.571 | 10.5 |
| 0.25 | 0.714 | 13.0 |
| 0.30 | 0.857 | 15.5 |
| 0.35 | 1.000 | 17.9 |
| 0.40 | 1.142 | 20.3 |
| 0.45 | 1.285 | 22.6 |
| 0.50 | 1.428 | 24.8 |
| 0.55 | 1.571 | 26.8 |
| 0.60 | 1.714 | 28.7 |
| 0.65 | 1.856 | 30.5 |
| 0.70 | 1.999 | 32.0 |
| 0.75 | 2.142 | 33.3 |
| 0.80 | 2.285 | 34.5 |
| 0.85 | 2.428 | 35.4 |
| 0.90 | 2.570 | 36.2 |
| 0.95 | 2.713 | 36.8 |
| 1.00 | 2.856 | 37.2 |

Embodiment 8

Figure 8A:
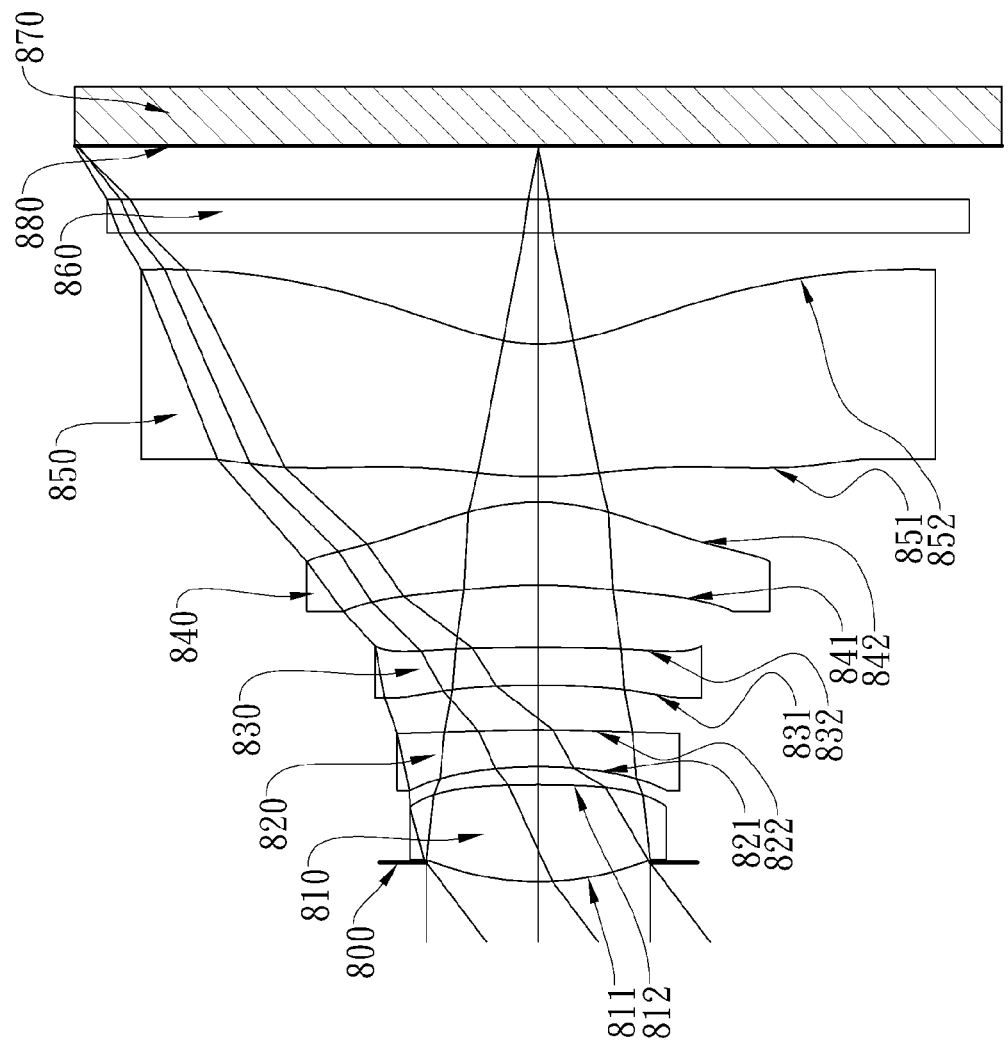
FIG. 8A shows an Image capturing lens system in accordance with an eighth embodiment of the present invention.
Figure 8B:
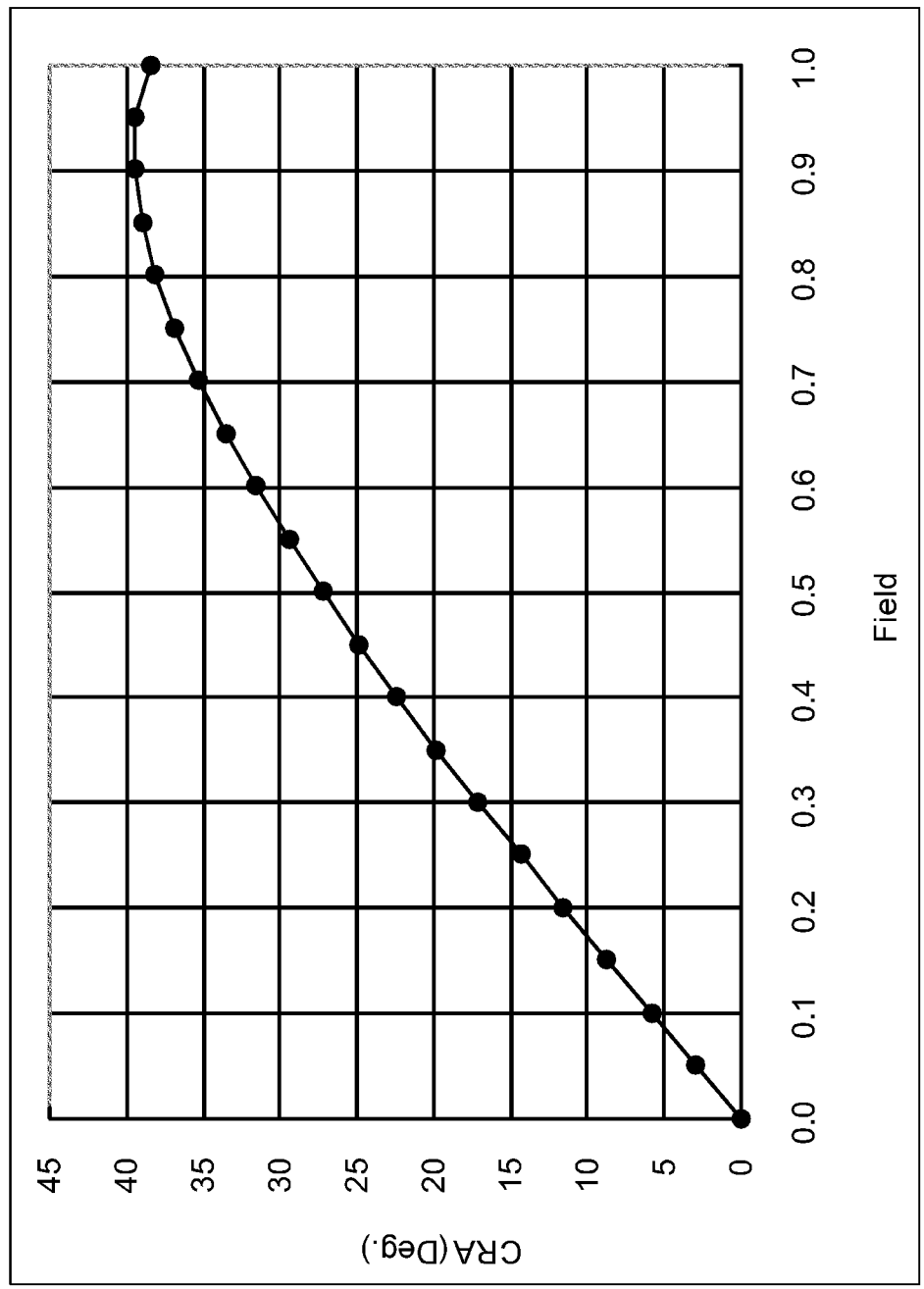
FIG. 8B shows the relation between CRA and field of view of the eighth embodiment of the present invention.
Figure 8C:
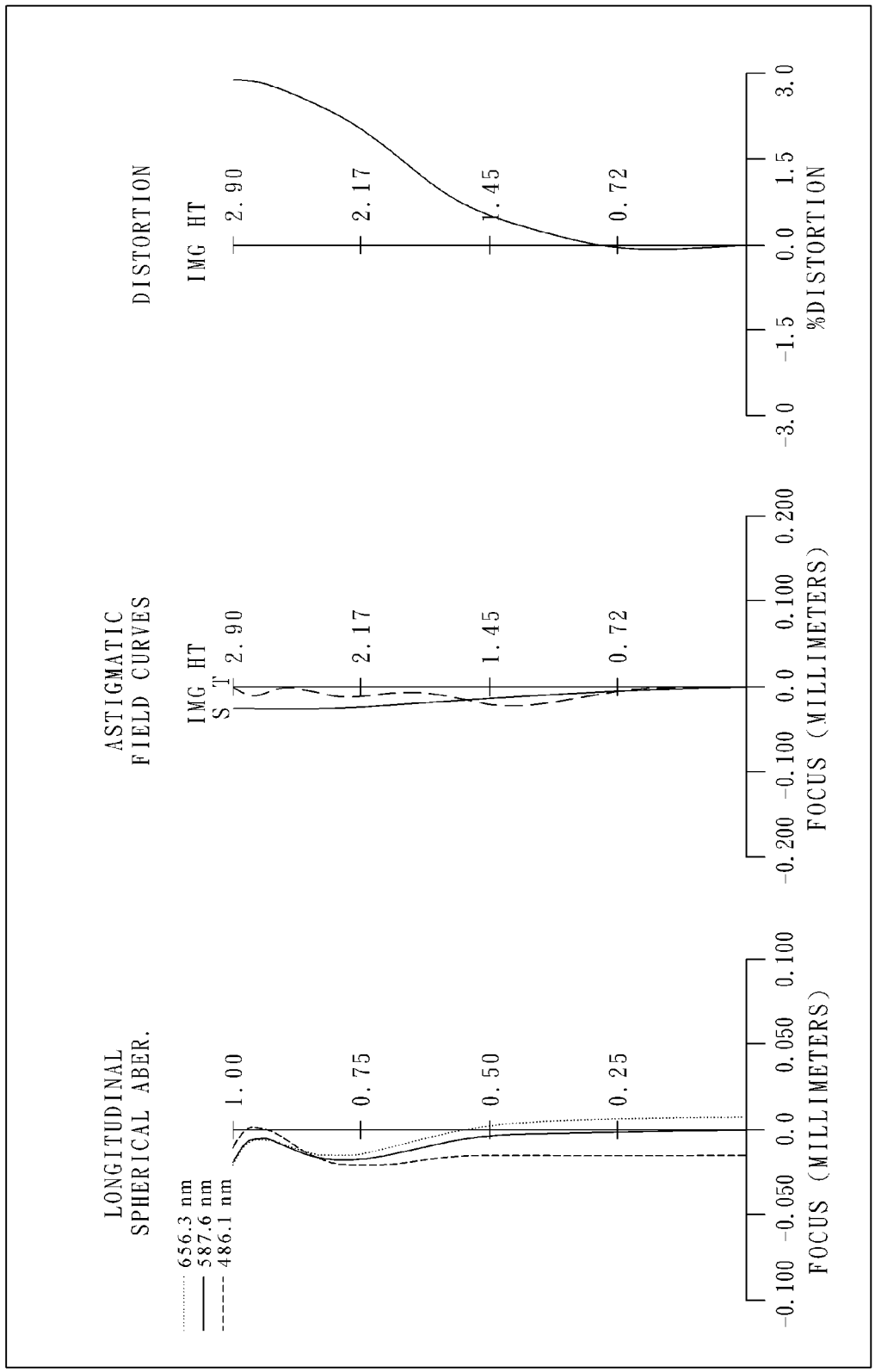
FIG. 8C shows the aberration curves of the eighth embodiment of the present invention.

FIG. 8A shows an Image capturing lens system in accordance with the eighth embodiment of the present invention, and FIG. 8C shows the aberration curves of the eighth embodiment of the present invention. The Image capturing lens system of the eighth embodiment of the present invention mainly comprises five non-cemented lens elements, in order from an object side to an image side:

a plastic first lens element 810 with positive refractive power having a convex object-side surface 811 and a convex image-side surface 812, the object-side and image-side surfaces 811 and 812 thereof being aspheric;

a plastic second lens element 820 with negative refractive power having a concave object-side surface 821 and a convex image-side surface 822, the object-side and image-side surfaces 821 and 822 thereof being aspheric;

a plastic third lens element 830 with negative refractive power having a concave object-side surface 831 and a convex image-side surface 832, the object-side and image-side surfaces 831 and 832 thereof being aspheric;

a plastic fourth lens element 840 with positive refractive power having a concave object-side surface 841 and a convex image-side surface 842, the object-side and image-side surfaces 841 and 842 thereof being aspheric; and a plastic fifth lens element 850 with negative refractive power having a convex object-side surface 851 and a concave image-side surface 852, the object-side and image-side surfaces 851 and 852 thereof being aspheric, and at least one inflection point is formed on both the object-side surface 851 and the image-side surface 852 thereof;

wherein an aperture stop 800 is disposed between an imaged object and the first lens element 810;

the Image capturing lens system further comprises an IR filter 860 disposed between the image-side surface 852 of the fifth lens element 850 and an image plane 880, and the IR filter 860 is made of glass and has no influence on the focal length of the Image capturing lens system; the Image capturing lens system further comprises an image sensor 870 provided on the image plane 880.

The detailed optical data of the eighth embodiment is shown in TABLE 28, and the aspheric surface data is shown in TABLE 29, wherein the units of the radius of curvature, the thickness and the focal length are expressed in mm, and HFOV is half of the maximal field of view.

TABLE 28

(Embodiment 8)
f = 3.74 mm, Fno = 2.65, HFOV = 37.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.120 | | | | |
| 2 | Lens 1 | 1.745110 | (ASP) | 0.611 | Plastic | 1.530 | 55.8 | 2.75 |
| 3 | | −7.773700 | (ASP) | 0.114 | | | | |
| 4 | Lens 2 | −3.075300 | (ASP) | 0.233 | Plastic | 1.640 | 23.3 | −6.77 |
| 5 | | −10.929000 | (ASP) | 0.280 | | | | |
| 6 | Lens 3 | −7.732600 | (ASP) | 0.241 | Plastic | 1.530 | 55.8 | −24.92 |
| 7 | | −18.856000 | (ASP) | 0.393 | | | | |
| 8 | Lens 4 | −2.962270 | (ASP) | 0.524 | Plastic | 1.530 | 55.8 | 4.61 |
| 9 | | −1.421340 | (ASP) | 0.162 | | | | |
| 10 | Lens 5 | 2.682100 | (ASP) | 0.836 | Plastic | 1.530 | 55.8 | −4.07 |
| 11 | | 1.066050 | (ASP) | 0.700 | | | | |
| 12 | IR-filter | Plano | | 0.210 | Glass | 1.517 | 64.2 | — |
| 13 | | Plano | | 0.337 | | | | |
| 14 | Image | Plano | | — | | | | |

* Reference wavelength is 587.6 nm (d-line)

TABLE 29

Aspheric Coefficients

| | Surface # | | | | |
|---|---|---|---|---|---|
| | 2 | 3 | 4 | 5 | 6 |
| k = | −1.36266E+00 | 1.00000E+00 | −2.16601E+01 | −9.00000E+01 | −1.59522E+00 |
| A4 = | 1.92062E−02 | −9.86153E−02 | −1.35780E−01 | 9.37126E−04 | −1.00356E−01 |
| A6 = | −7.50533E−02 | −2.45255E−01 | −2.84536E−02 | 4.29392E−02 | 1.77829E−02 |
| A8 = | 1.51423E−01 | 2.34786E−01 | 2.27791E−03 | −3.15188E−02 | 7.04923E−02 |
| A10 = | −2.98355E−01 | −2.40437E−01 | | | 2.34781E−03 |

| | Surface # | | | | |
|---|---|---|---|---|---|
| | 7 | 8 | 9 | 10 | 11 |
| k = | 7.14848E−01 | 1.00000E+00 | −1.70698E+00 | −1.84800E+01 | −4.81347E+00 |
| A4 = | −2.44070E−02 | 2.03090E−01 | 8.58505E−02 | −1.19138E−01 | −6.17602E−02 |
| A6 = | −1.90875E−02 | −1.89470E−02 | −2.06838E−03 | 6.03943E−02 | 2.31699E−02 |
| A8 = | 2.15901E−02 | 1.13542E−01 | 3.37376E−03 | −1.36419E−02 | −5.30315E−03 |
| A10 = | 4.50515E−02 | −5.36480E−02 | −1.12385E−02 | 1.63544E−03 | 6.66135E−04 |
| A12 = | | 1.13463E−02 | 7.85393E−03 | −1.01775E−04 | −3.69324E−05 |
| A14 = | | | −2.71094E−03 | 1.97813E−06 | 3.58619E−07 |
| A16 = | | | 3.05580E−04 | | |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 30; wherein the units of HFOV, CRA1.0Y and CRA0.8Y are expressed in degree (deg.).

TABLE 30

(Embodiment 8)

| | |
|---|---|
| f | 3.74 |
| Fno | 2.65 |
| HFOV | 37.1 |
| V1−V2 | 32.5 |
| CRA1.0Y | 38.4 |
| CRA1.0Y−CRA0.8Y | 0.3 |
| (T12 + T45)/(T23 + T34) | 0.41 |
| f1/f5 | −0.68 |
| TTL/ImgH | 1.58 |

Please refer to FIG. 8B and the following table 31, which show the CRA of the eighth embodiment of the present Image capturing lens system; wherein one full image height of the image plane 880 is 2.9 mm, thus CRA0.8Y=38.1 deg, CRA1.0Y=38.4 deg.

TABLE 31

| Field | Image Height (mm) | CRA (Deg.) |
|---|---|---|
| 0.00 | 0.000 | 0.0 |
| 0.05 | 0.145 | 2.9 |
| 0.10 | 0.290 | 5.9 |
| 0.15 | 0.435 | 8.7 |
| 0.20 | 0.580 | 11.6 |
| 0.25 | 0.725 | 14.4 |
| 0.30 | 0.870 | 17.1 |
| 0.35 | 1.015 | 19.8 |
| 0.40 | 1.160 | 22.4 |
| 0.45 | 1.305 | 24.9 |
| 0.50 | 1.450 | 27.2 |
| 0.55 | 1.595 | 29.5 |

TABLE 31-continued

| Field | Image Height (mm) | CRA (Deg.) |
|---|---|---|
| 0.60 | 1.740 | 31.6 |
| 0.65 | 1.885 | 33.5 |
| 0.70 | 2.030 | 35.3 |
| 0.75 | 2.175 | 36.9 |
| 0.80 | 2.320 | 38.1 |
| 0.85 | 2.465 | 39.0 |
| 0.90 | 2.610 | 39.5 |
| 0.95 | 2.755 | 39.5 |
| 1.00 | 2.900 | 38.4 |

Embodiment 9

Figure 9A:
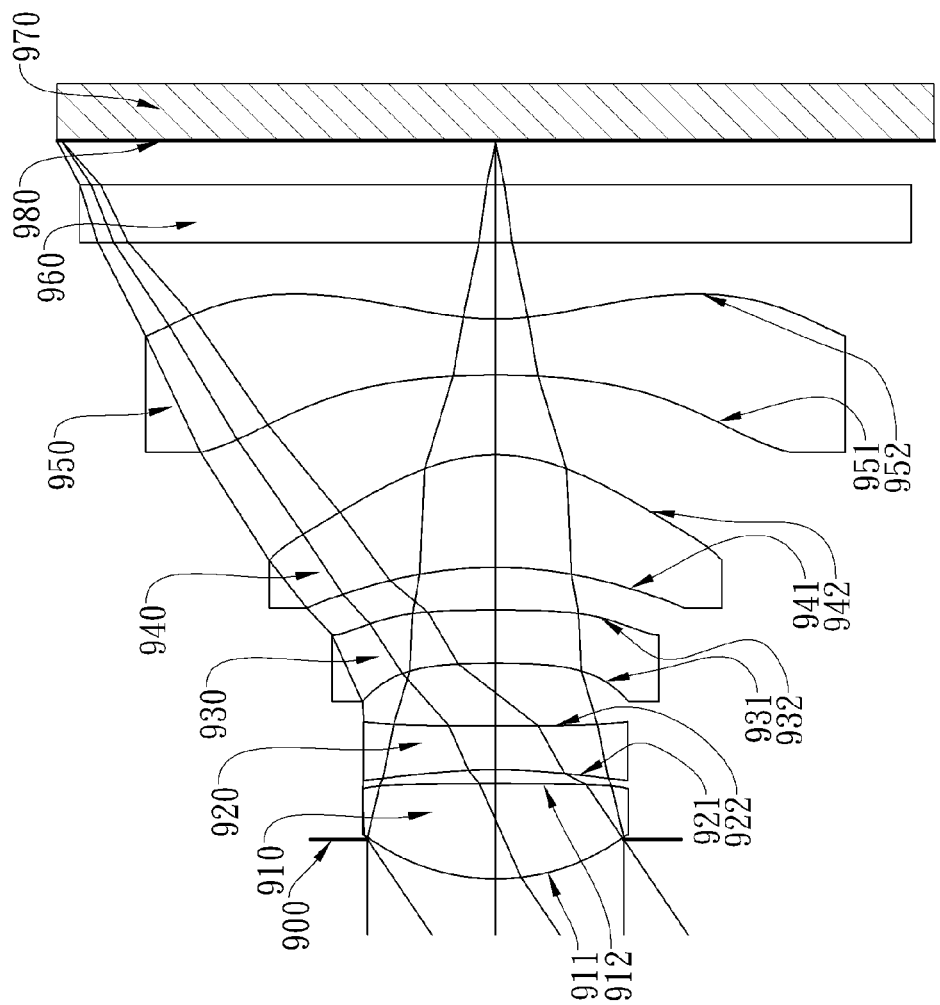
FIG. 9A shows an Image capturing lens system in accordance with a ninth embodiment of the present invention.
Figure 9B:
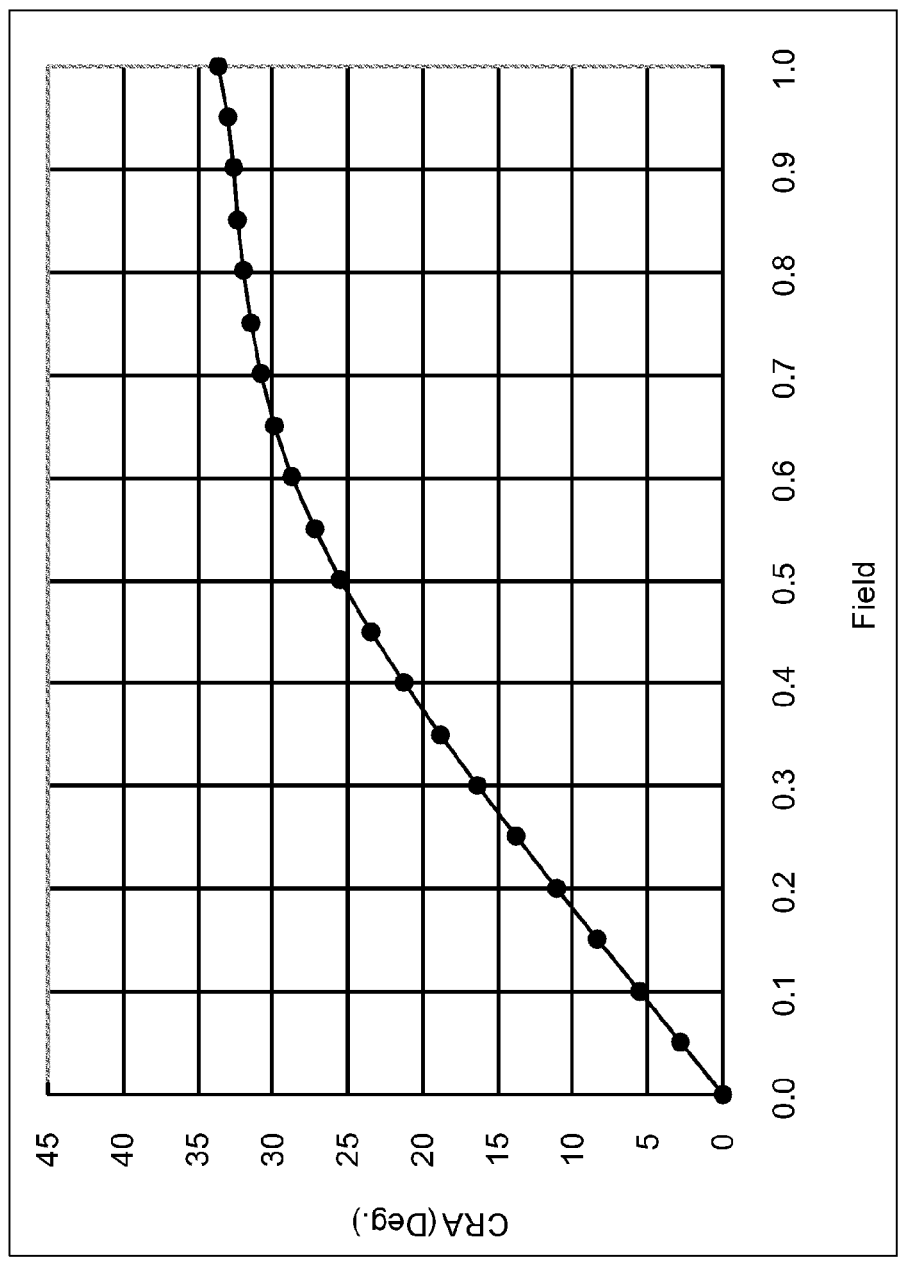
FIG. 9B shows the relation between CRA and field of view of the ninth embodiment of the present invention.
Figure 9C:
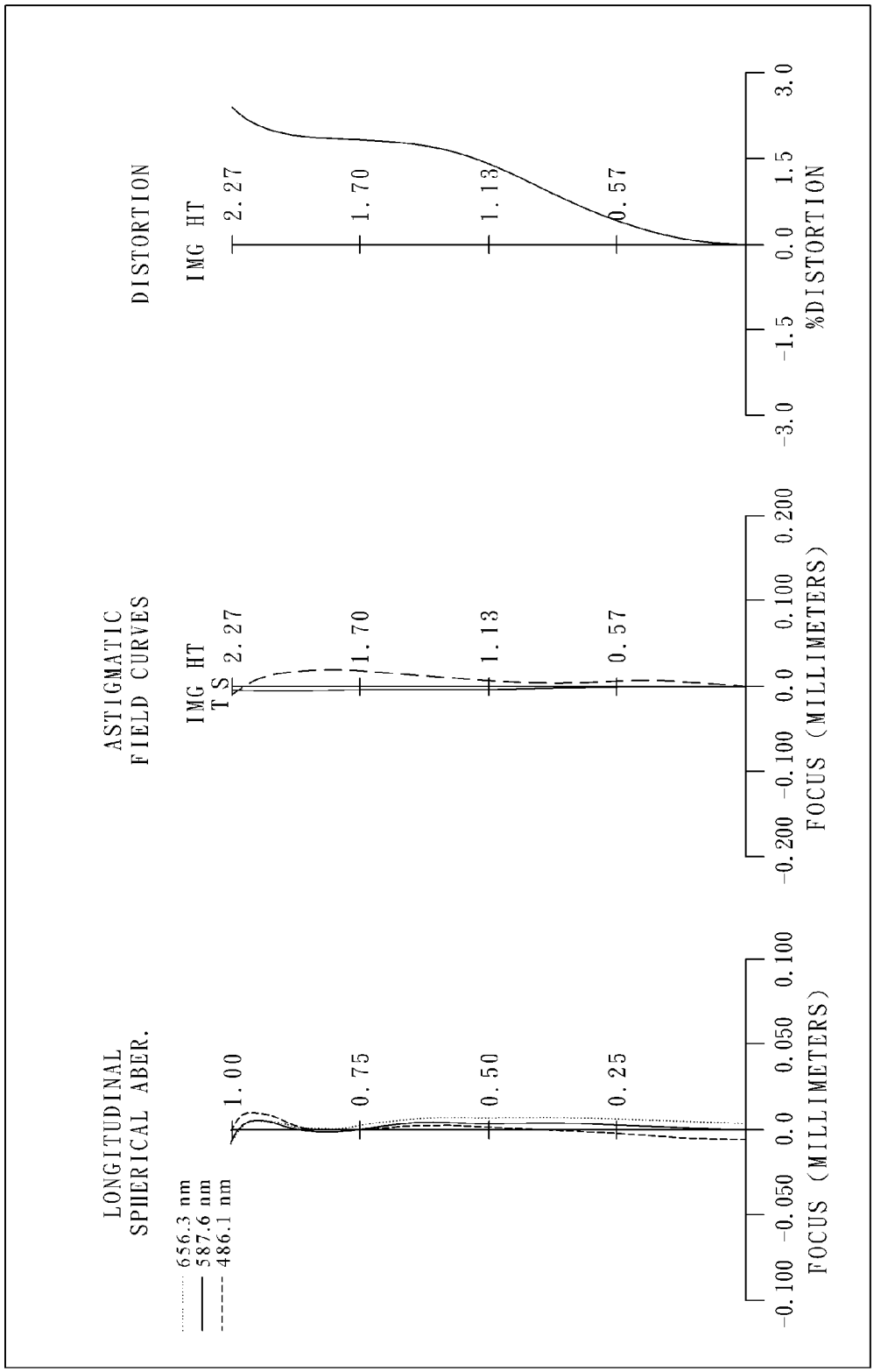
FIG. 9C shows the aberration curves of the ninth embodiment of the present invention.

FIG. 9A shows an Image capturing lens system in accordance with the ninth embodiment of the present invention, and FIG. 9C shows the aberration curves of the ninth embodiment of the present invention. The Image capturing lens system of the ninth embodiment of the present invention mainly comprises five non-cemented lens elements, in order from an object side to an image side:

a plastic first lens element 910 with positive refractive power having a convex object-side surface 911 and a convex image-side surface 912, the object-side and image-side surfaces 911 and 912 thereof being aspheric;

a plastic second lens element 920 with negative refractive power having a concave object-side surface 921 and a convex image-side surface 922, the object-side and image-side surfaces 921 and 922 thereof being aspheric;

a plastic third lens element 930 with negative refractive power having a concave object-side surface 931 and a convex image-side surface 932, the object-side and image-side surfaces 931 and 932 thereof being aspheric;

a plastic fourth lens element 940 with positive refractive power having a concave object-side surface 941 and a convex image-side surface 942, the object-side and image-side surfaces 941 and 942 thereof being aspheric; and a plastic fifth lens element 950 with negative refractive power having a concave object-side surface 951 and a concave image-side surface 952, the object-side and image-side surfaces 951 and 952 thereof being aspheric, and at least one inflection point is formed on both the object-side surface 951 and the image-side surface 952 thereof;

wherein an aperture stop 900 is disposed between an imaged object and the first lens element 910;

the Image capturing lens system further comprises an IR filter 960 disposed between the image-side surface 952 of the fifth lens element 950 and an image plane 980, and the IR filter 960 is made of glass and has no influence on the focal length of the Image capturing lens system; the Image capturing lens system further comprises an image sensor 970 provided on the image plane 980.

The detailed optical data of the ninth embodiment is shown in TABLE 32, and the aspheric surface data is shown in TABLE 33 wherein the units of the radius of curvature, the thickness and the focal length are expressed in mm, and HFOV is half of the maximal field of view.

TABLE 32

(Embodiment 9)
f = 3.28 mm, Fno = 2.45, HFOV = 34.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.205 | | | | |
| 2 | Lens 1 | 1.135690 | (ASP) | 0.497 | Plastic | 1.544 | 55.9 | 2.03 |
| 3 | | −34.383500 | (ASP) | 0.074 | | | | |
| 4 | Lens 2 | −2.854960 | (ASP) | 0.230 | Plastic | 1.640 | 23.3 | −4.65 |
| 5 | | −73.800700 | (ASP) | 0.327 | | | | |
| 6 | Lens 3 | −5.560200 | (ASP) | 0.278 | Plastic | 1.640 | 23.3 | −14.51 |
| 7 | | −14.137400 | (ASP) | 0.224 | | | | |
| 8 | Lens 4 | −2.129790 | (ASP) | 0.589 | Plastic | 1.544 | 55.9 | 2.39 |
| 9 | | −0.885090 | (ASP) | 0.417 | | | | |
| 10 | Lens 5 | −4.046800 | (ASP) | 0.294 | Plastic | 1.544 | 55.9 | −1.96 |
| 11 | | 1.486430 | (ASP) | 0.400 | | | | |
| 12 | IR-filter | Plano | | 0.300 | Glass | 1.517 | 64.2 | — |
| 13 | | Plano | | 0.232 | | | | |
| 14 | Image | Plano | | — | | | | |

* Reference wavelength is 587.6 nm (d-line)

TABLE 33

Aspheric Coefficients

| | Surface # | | | | |
|---|---|---|---|---|---|
| | 2 | 3 | 4 | 5 | 6 |
| k = | −5.71618E+00 | −1.00000E+00 | −2.93625E+01 | −1.00000E+00 | −1.00000E+00 |
| A4 = | 4.89303E−01 | −2.83195E−02 | −7.91882E−03 | 1.40019E−01 | −4.91558E−01 |
| A6 = | −5.75416E−01 | 1.68704E−01 | 2.39929E−01 | −1.58898E−01 | −4.39247E−01 |
| A8 = | 7.11509E−01 | −6.96165E−01 | 3.19513E−01 | 8.83560E−01 | 6.27747E−01 |
| A10 = | −1.07520E−01 | 1.27540E+00 | −4.18495E+00 | −2.95859E+00 | −1.21780E+00 |
| A12 = | −5.19252E−01 | −3.04364E+00 | 7.91997E+00 | 2.84703E+00 | 3.66405E−01 |
| A14 = | −3.31404E−01 | 2.22908E+00 | −4.23425E+00 | 5.61982E−01 | |

TABLE 33-continued

| Aspheric Coefficients | | | | |
|---|---|---|---|---|
| Surface # | | | | |
| 7 | 8 | 9 | 10 | 11 |
| k = −4.69415E+01 | 1.64064E+00 | −3.54633E+00 | −1.16602E+01 | −1.03648E+01 |
| A4 = −3.00205E−01 | 4.39347E−02 | −2.02776E−01 | −4.66138E−02 | −1.00410E−01 |
| A6 = −1.68870E−01 | 1.91442E−01 | 3.76216E−01 | −5.16789E−02 | 3.94261E−02 |
| A8 = 4.02245E−01 | −8.11899E−01 | −4.30665E−01 | 4.11455E−02 | −1.93793E−02 |
| A10 = −2.35460E−01 | 1.47733E+00 | 3.24432E−01 | −5.25894E−03 | 7.10674E−03 |
| A12 = 3.70499E−01 | −1.12877E+00 | −1.19466E−01 | −1.70488E−03 | −1.54403E−03 |
| A14 = | 2.90808E−01 | 8.89852E−03 | 4.03136E−04 | 1.51501E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 34; wherein the units of HFOV, CRA1.0Y and CRA0.8Y are expressed in degree (deg.).

TABLE 34

| (Embodiment 9) | |
|---|---|
| f | 3.28 |
| Fno | 2.45 |
| HFOV | 34.0 |
| V1−V2 | 32.6 |
| CRA1.0Y | 33.6 |
| CRA1.2Y−CRA0.8Y | 1.7 |
| (T12 + T45)/(T23 + T34) | 0.89 |
| f1/f5 | −1.04 |
| TTL/ImgH | 1.66 |

Please refer to FIG. 9B and the following table 35, which show the CRA of the ninth embodiment of the present Image capturing lens system; wherein one full image height of the image plane 980 is 2.268 mm, thus CRA0.8Y=32.0 deg, CRA1.0Y=33.6 deg.

TABLE 35

| Field | Image Height (mm) | CRA (Deg.) |
|---|---|---|
| 0.00 | 0.000 | 0.0 |
| 0.05 | 0.113 | 2.8 |
| 0.10 | 0.227 | 5.6 |
| 0.15 | 0.340 | 8.4 |
| 0.20 | 0.454 | 11.1 |
| 0.25 | 0.567 | 13.8 |
| 0.30 | 0.680 | 16.4 |
| 0.35 | 0.794 | 18.9 |
| 0.40 | 0.907 | 21.3 |
| 0.45 | 1.021 | 23.5 |
| 0.50 | 1.134 | 25.5 |
| 0.55 | 1.247 | 27.3 |
| 0.60 | 1.361 | 28.8 |
| 0.65 | 1.474 | 29.9 |
| 0.70 | 1.588 | 30.8 |
| 0.75 | 1.701 | 31.5 |
| 0.80 | 1.814 | 32.0 |
| 0.85 | 1.928 | 32.3 |
| 0.90 | 2.041 | 32.7 |
| 0.95 | 2.155 | 33.0 |
| 1.00 | 2.268 | 33.6 |

Embodiment 10

Figure 10A:
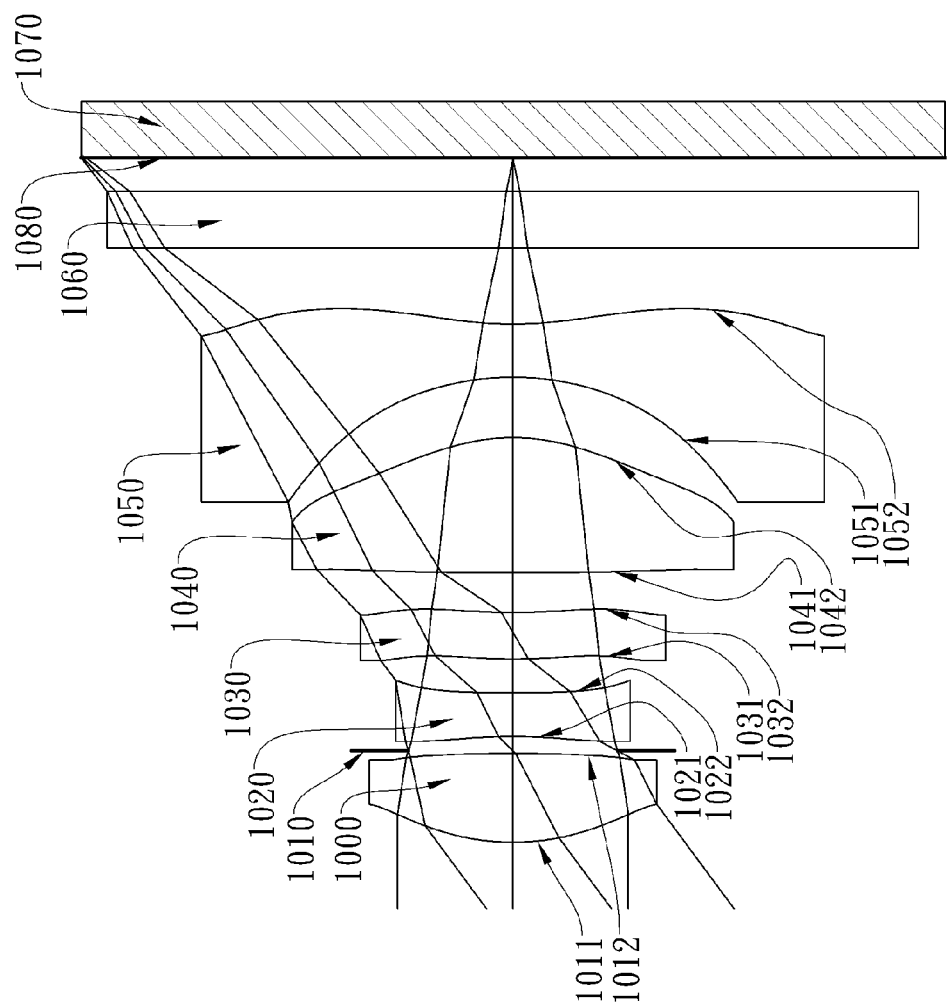
FIG. 10A shows an Image capturing lens system in accordance with a tenth embodiment of the present invention.
Figure 10B:
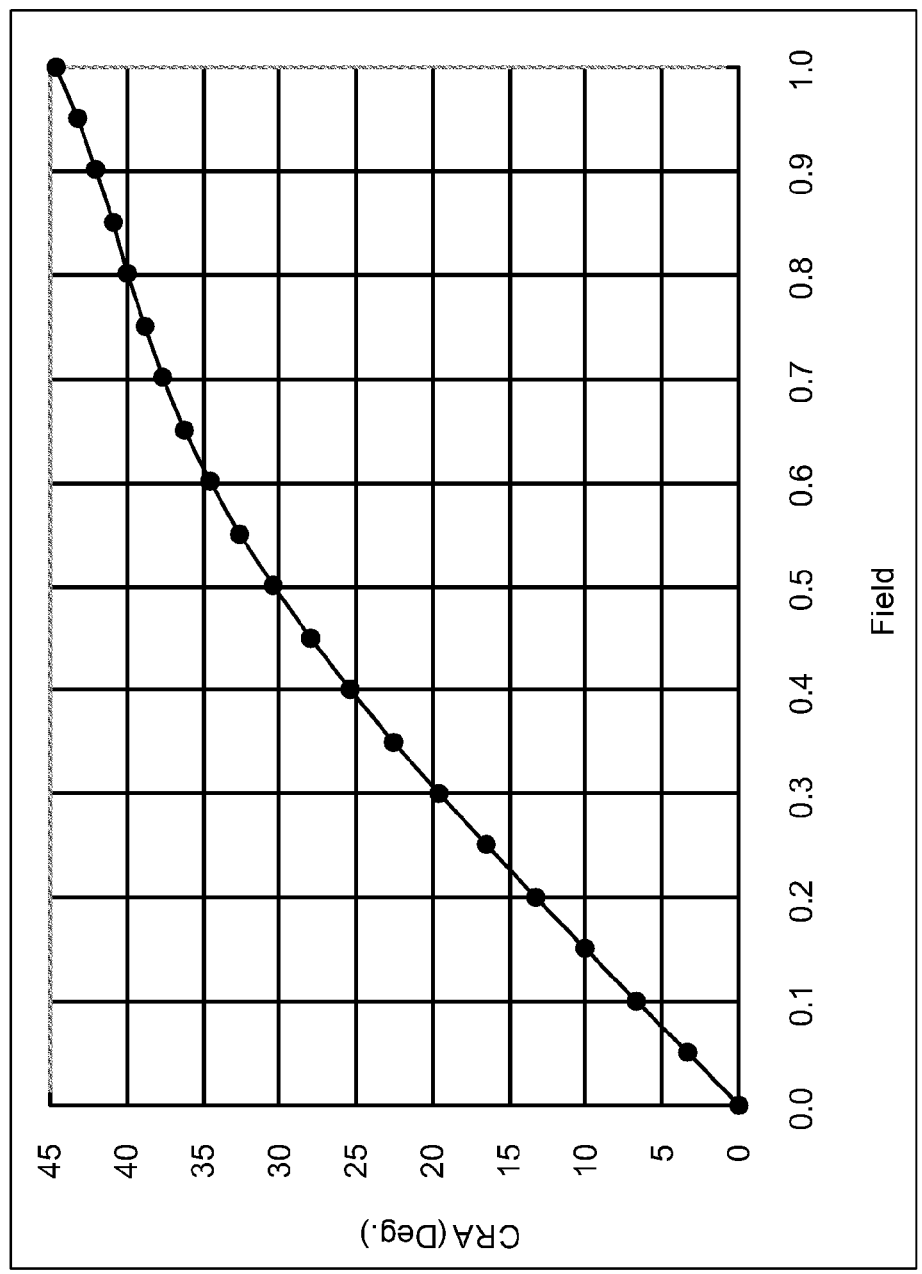
FIG. 10B shows the relation between CRA and field of view of the tenth embodiment of the present invention.
Figure 10C:
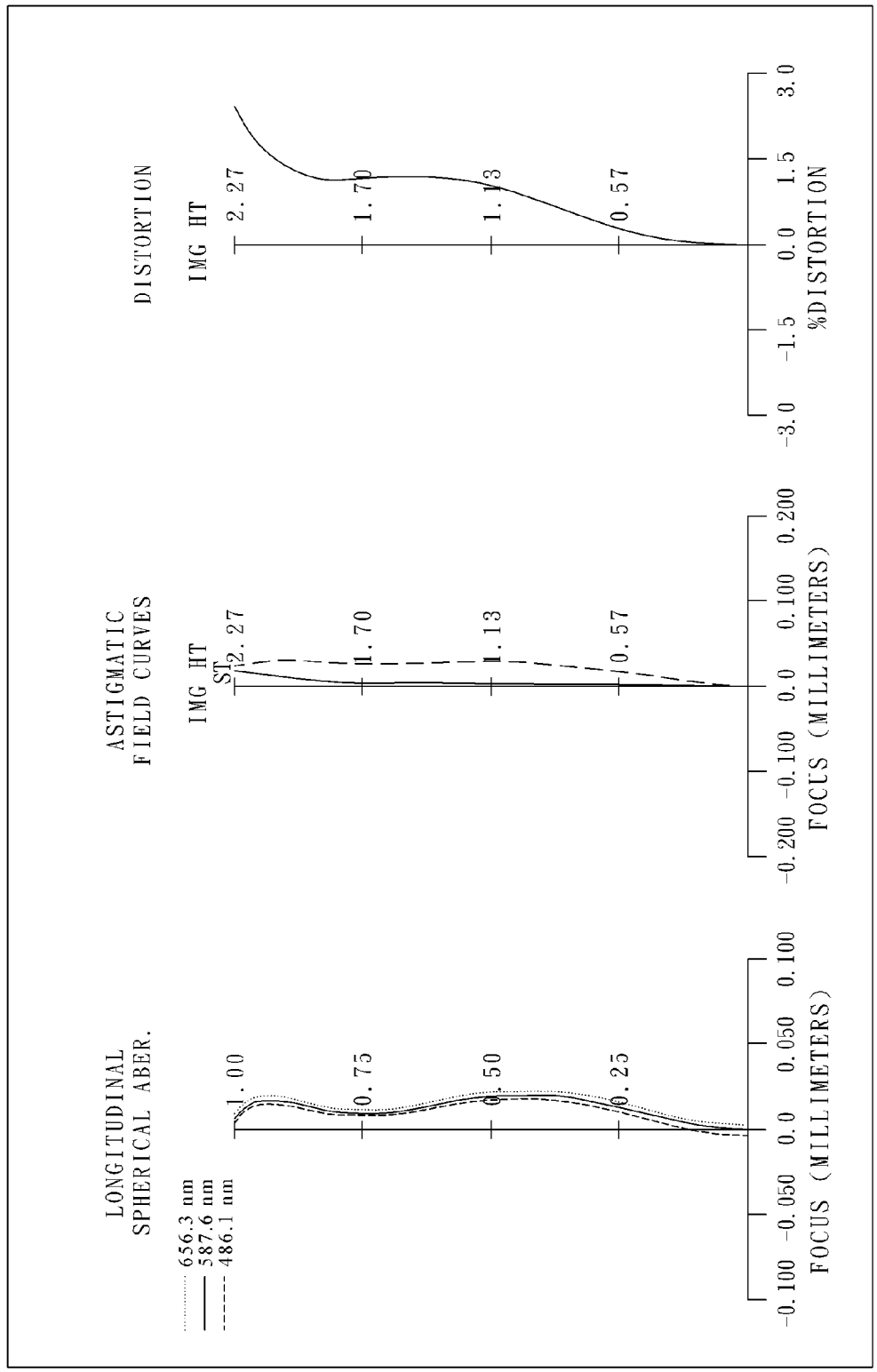
FIG. 10C shows the aberration curves of the tenth embodiment of the present invention.

FIG. 10A shows an Image capturing lens system in accordance with the tenth embodiment of the present invention, and FIG. 10C shows the aberration curves of the tenth embodiment of the present invention. The Image capturing lens system of the tenth embodiment of the present invention mainly comprises five non-cemented lens elements, in order from an object side to an image side:

a plastic first lens element 1010 with positive refractive power having a convex object-side surface 1011 and a convex image-side surface 1012, the object-side and image-side surfaces 1011 and 1012 thereof being aspheric;

a plastic second lens element 1020 with negative refractive power having a concave object-side surface 1021 and a concave image-side surface 1022, the object-side and image-side surfaces 1021 and 1022 thereof being aspheric;

a plastic third lens element 1030 with positive refractive power having a convex object-side surface 1031 and a concave image-side surface 1032, the object-side and image-side surfaces 1031 and 1032 thereof being aspheric;

a plastic fourth lens element 1040 with positive refractive power having a concave object-side surface 1041 and a concave image-side surface 1042, the object-side and image-side surfaces 1041 and 1042 thereof being aspheric; and a plastic fifth lens element 1050 with negative refractive power having a concave object-side surface 1051 and a concave image-side surface 1052, the object-side and image-side surfaces 1051 and 1052 thereof being aspheric, and at least one inflection point is formed on the image-side surface 1052 thereof;

wherein an aperture stop 1000 is disposed between the first lens element 1010 and the second lens element 1020;

the Image capturing lens system further comprises an IR filter 1060 disposed between the image-side surface 1052 of the fifth lens element 1050 and an image plane 1080, and the IR filter 1060 is made of glass and has no influence on the focal length of the Image capturing lens system; the Image capturing lens system further comprises an image sensor 1070 provided on the image plane 1080.

The detailed optical data of the tenth embodiment is shown in TABLE 36, and the aspheric surface data is shown in TABLE 37, wherein the units of the radius of curvature, the thickness and the focal length are expressed in mm, and HFOV is half of the maximal field of view.

TABLE 36

(Embodiment 10)
f = 2.98 mm, Fno = 2.45, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.231360 (ASP) | 0.468 | Plastic | 1.543 | 56.5 | 2.04 |
| 2 | | −9.742200 (ASP) | 0.014 | | | | |
| 3 | Ape. Stop | Plano | 0.076 | | | | |
| 4 | Lens 2 | −2.559240 (ASP) | 0.230 | Plastic | 1.640 | 23.3 | −3.12 |
| 5 | | 9.453400 (ASP) | 0.178 | | | | |
| 6 | Lens 3 | 2.524230 (ASP) | 0.245 | Plastic | 1.614 | 25.6 | 32.12 |
| 7 | | 2.787740 (ASP) | 0.211 | | | | |
| 8 | Lens 4 | 89.285700 (ASP) | 0.713 | Plastic | 1.544 | 55.9 | 1.84 |
| 9 | | −1.009580 (ASP) | 0.318 | | | | |
| 10 | Lens 5 | −1.447630 (ASP) | 0.280 | Plastic | 1.544 | 55.9 | −1.44 |
| 11 | | 1.836790 (ASP) | 0.400 | | | | |
| 12 | IR-filter | Plano | 0.300 | Glass | 1.517 | 64.2 | — |
| 13 | | Plano | 0.177 | | | | |
| 14 | Image | Plano | — | | | | |

\* Reference wavelength is 587.6 nm (d-line)

TABLE 37

Aspheric Coefficients

| Surface # | 1 | 2 | 4 | 5 | 6 |
|---|---|---|---|---|---|
| k = | −7.67605E+00 | −3.94233E+01 | −4.66803E+01 | −5.00000E+01 | −3.20915E+01 |
| A4 = | 4.34742E−01 | −1.88741E−02 | 8.27492E−02 | 2.40187E−01 | −4.01465E−01 |
| A6 = | −6.17910E−01 | −7.25105E−02 | 5.35710E−01 | 2.16984E−01 | −5.45704E−02 |
| A8 = | 2.57107E−01 | −3.94765E−01 | −4.87440E−01 | 3.98168E−01 | 1.42087E−02 |
| A10 = | 1.64841E−01 | 1.30743E+00 | −2.92923E+00 | −2.09080E+00 | 7.31722E−01 |
| A12 = | −5.19247E−01 | −3.04363E+00 | 7.91998E+00 | 2.84704E+00 | 3.66418E−01 |
| A14 = | −3.31397E−01 | 2.22909E+00 | −4.23424E+00 | 5.61992E−01 | |

| Surface # | 7 | 8 | 9 | 10 | 11 |
|---|---|---|---|---|---|
| k = | −2.99407E+01 | −5.00000E+01 | −4.73699E+00 | −4.58074E+00 | −1.72104E+01 |
| A4 = | −2.82143E−01 | 3.41736E−02 | −1.21789E−01 | −1.44216E−01 | −1.13158E−01 |
| A6 = | −2.05511E−01 | 1.64702E−01 | 3.63698E−01 | −6.00780E−02 | 4.86159E−02 |
| A8 = | 3.54853E−01 | −8.38759E−01 | −4.44820E−01 | 4.09543E−02 | −2.13113E−02 |
| A10 = | −7.51677E−02 | 1.45471E+00 | 3.16763E−01 | −4.25106E−03 | 6.89815E−03 |
| A12 = | 3.45534E−01 | −1.12455E+00 | −1.22883E−01 | −5.37366E−04 | −1.47422E−03 |
| A14 = | | 3.21212E−01 | 8.96277E−03 | 1.40382E−04 | 1.97952E−04 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 38; wherein the units of HFOV, CRA1.0Y and CRA0.8Y are expressed in degree (deg.).

TABLE 38

(Embodiment 10)

| | |
|---|---|
| f | 2.98 |
| Fno | 2.45 |
| HFOV | 36.5 |
| V1−V2 | 33.2 |
| CRA1.0Y | 44.6 |
| CRA1.0Y−CRA0.8Y | 4.7 |
| (T12 + T45)/(T23 + T34) | 1.05 |
| f1/f5 | −1.41 |
| TTL/ImgH | 1.55 |

Please refer to FIG. 10B and the following table 39, which show the CRA of the tenth embodiment of the present Image capturing lens system; wherein one full image height of the image plane 1080 is 2.268 mm, thus CRA0.8Y=39.9 deg, CRA1.0Y=44.6 deg.

TABLE 39

| Field | Image Height (mm) | CRA (Deg.) |
|---|---|---|
| 0.00 | 0.000 | 0.0 |
| 0.05 | 0.113 | 3.4 |
| 0.10 | 0.227 | 6.8 |
| 0.15 | 0.340 | 10.1 |
| 0.20 | 0.454 | 13.3 |
| 0.25 | 0.567 | 16.5 |
| 0.30 | 0.680 | 19.6 |
| 0.35 | 0.794 | 22.6 |
| 0.40 | 0.907 | 25.4 |
| 0.45 | 1.021 | 28.0 |
| 0.50 | 1.134 | 30.4 |
| 0.55 | 1.247 | 32.6 |
| 0.60 | 1.361 | 34.6 |
| 0.65 | 1.474 | 36.2 |
| 0.70 | 1.588 | 37.7 |

TABLE 39-continued

| Field | Image Height (mm) | CRA (Deg.) |
|---|---|---|
| 0.75 | 1.701 | 38.9 |
| 0.80 | 1.814 | 39.9 |
| 0.85 | 1.928 | 40.9 |
| 0.90 | 2.041 | 42.0 |
| 0.95 | 2.155 | 43.2 |
| 1.00 | 2.268 | 44.6 |

Embodiment 11

Figure 11A:
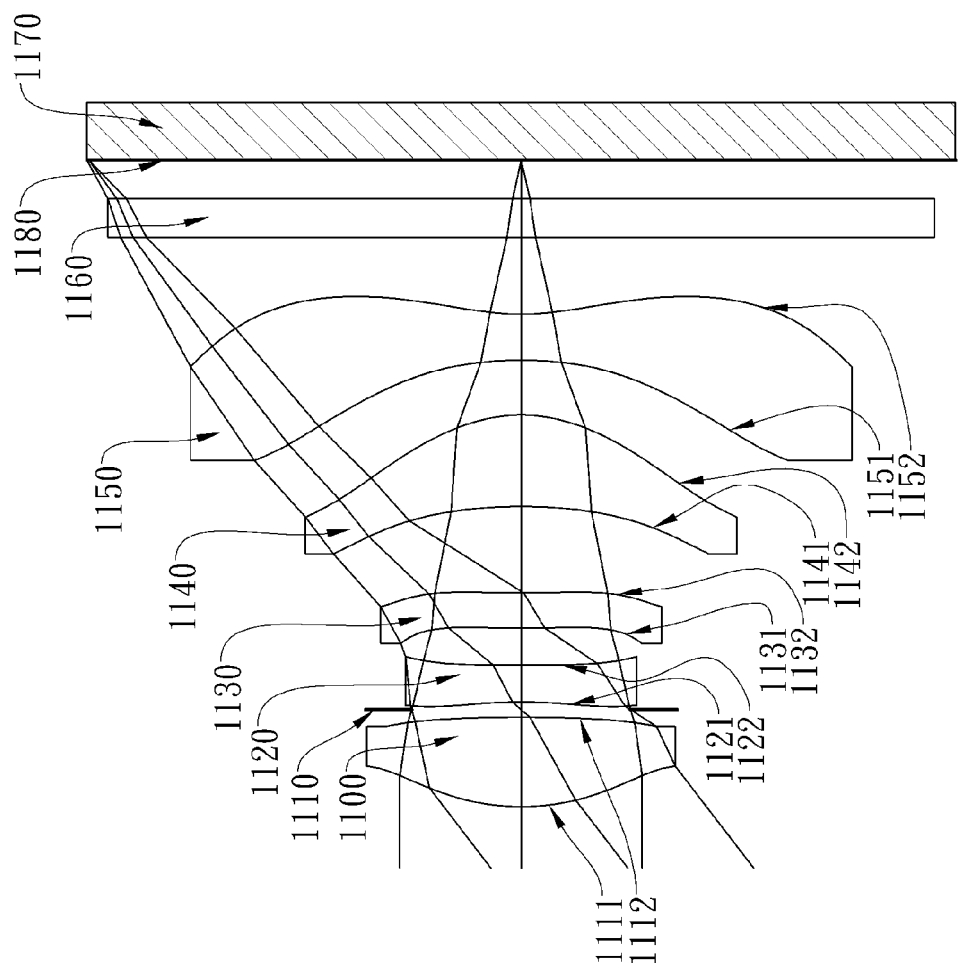
FIG. 11A shows an Image capturing lens system in accordance with an eleventh embodiment of the present invention.
Figure 11B:
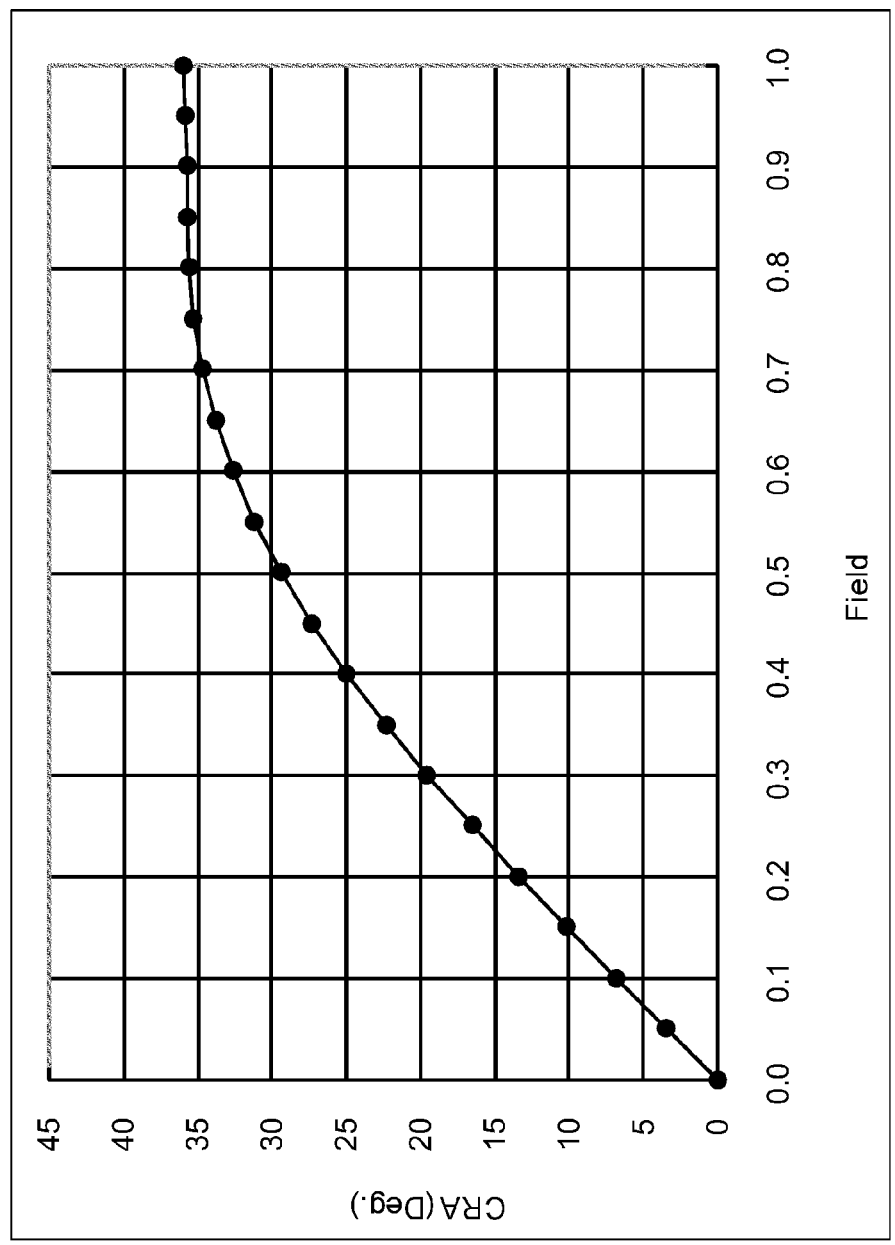
FIG. 11B shows the relation between CRA and field of view of the eleventh embodiment of the present invention.
Figure 11C:
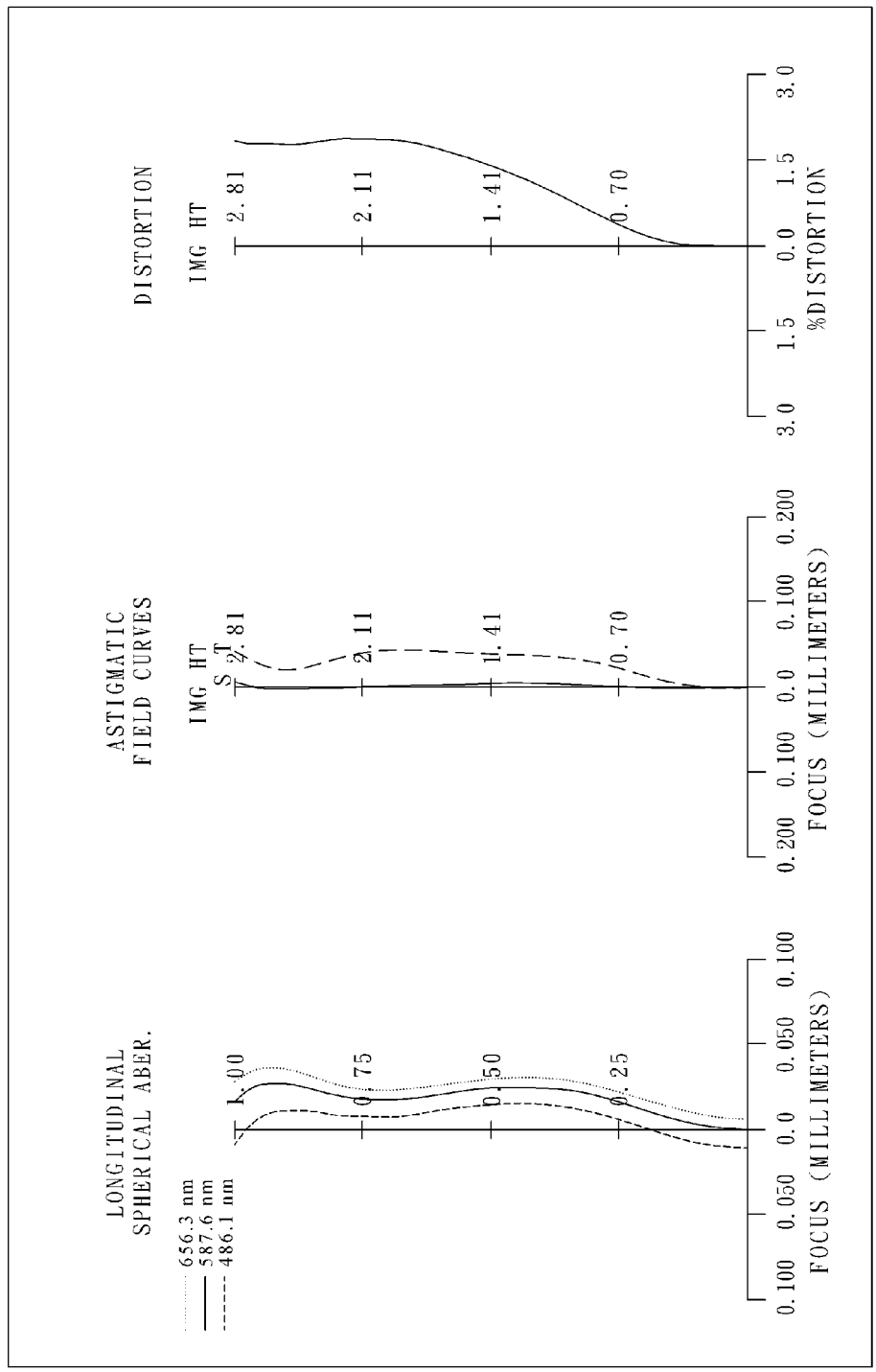
FIG. 11C shows the aberration curves of the eleventh embodiment of the present invention.

FIG. 11A shows an Image capturing lens system in accordance with the eleventh embodiment of the present invention, and FIG. 11C shows the aberration curves of the eleventh embodiment of the present invention. The Image capturing lens system of the eleventh embodiment of the present invention mainly comprises five non-cemented lens elements, in order from an object side to an image side:

a plastic first lens element 1110 with positive refractive power having a convex object-side surface 1111 and a convex image-side surface 1112, the object-side and image-side surfaces 1111 and 1112 thereof being aspheric;

a plastic second lens element 1120 with negative refractive power having a concave object-side surface 1121 and a convex image-side surface 1122, the object-side and image-side surfaces 1121 and 1122 thereof being aspheric;

a plastic third lens element 1130 with positive refractive power having a convex object-side surface 1131 and a concave image-side surface 1132, the object-side and image-side surfaces 1131 and 1132 thereof being aspheric;

a plastic fourth lens element 1140 with positive refractive power having a concave object-side surface 1141 and a convex image-side surface 1142, the object-side and image-side surfaces 1141 and 1142 thereof being aspheric; and a plastic fifth lens element 1150 with negative refractive power having a concave object-side surface 1151 and a concave image-side surface 1152, the object-side and image-side surfaces 1151 and 1152 thereof being aspheric, and at least one inflection point is formed on the image-side surface 1152 thereof;

wherein an aperture stop 1100 is disposed between the first lens element 1110 and the second lens element 1120;

the Image capturing lens system further comprises an IR filter 1160 disposed between the image-side surface 1152 of the fifth lens element 1150 and an image plane 1180, and the IR filter 1160 is made of glass and has no influence on the focal length of the Image capturing lens system; the Image capturing lens system further comprises an image sensor 1170 provided on the image plane 1180.

The detailed optical data of the eleventh embodiment is shown in TABLE 40, and the aspheric surface data is shown in TABLE 0.41, wherein the units of the radius of curvature, the thickness and the focal length are expressed in mm, and HFOV is half of the maximal field of view.

TABLE 40

(Embodiment 11)
f = 3.58 mm, Fno = 2.27, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.460140 | (ASP) | 0.582 | Plastic | 1.544 | 55.9 | 2.40 |
| 2 | | −10.618900 | (ASP) | 0.050 | | | | |
| 3 | Ape. Stop | Plano | | 0.050 | | | | |
| 4 | Lens 2 | −2.762060 | (ASP) | 0.240 | Plastic | 1.640 | 23.3 | −4.44 |
| 5 | | −100.000000 | (ASP) | 0.239 | | | | |
| 6 | Lens 3 | 5.671300 | (ASP) | 0.230 | Plastic | 1.640 | 23.3 | 38.70 |
| 7 | | 7.240100 | (ASP) | 0.563 | | | | |
| 8 | Lens 4 | −3.421000 | (ASP) | 0.597 | Plastic | 1.544 | 55.9 | 2.30 |
| 9 | | −0.973960 | (ASP) | 0.356 | | | | |
| 10 | Lens 5 | −2.566810 | (ASP) | 0.300 | Plastic | 1.544 | 55.9 | −1.76 |
| 11 | | 1.583620 | (ASP) | 0.500 | | | | |
| 12 | IR-filter | Plano | | 0.250 | Glass | 1.517 | 64.2 | — |
| 13 | | Plano | | 0.252 | | | | |
| 14 | Image | Plano | | — | | | | |

* Reference wavelength is 587.6 nm (d-line)

TABLE 41

Aspheric Coefficients

| | Surface # | | | | |
|---|---|---|---|---|---|
| | 1 | 2 | 4 | 5 | 6 |
| k = | −7.13382E+00 | 4.74432E+01 | −2.80562E+01 | −9.00000E+01 | 2.77851E+01 |
| A4 = | 2.43795E−01 | −5.31192E−03 | 1.48586E−01 | 2.32583E−01 | −3.68376E−01 |
| A6 = | −2.71304E−01 | −2.24249E−02 | 2.28618E−02 | −1.26820E−01 | 2.35547E−01 |
| A8 = | 1.71366E−01 | −1.06664E−01 | 2.49573E−02 | 1.36938E−01 | −1.20067E+00 |
| A10 = | −8.48216E−02 | 2.74202E−01 | −1.49674E−01 | −1.30887E−01 | 1.93917E+00 |

TABLE 41-continued

| Aspheric Coefficients | | | | |
|---|---|---|---|---|
| A12 = −1.29887E−01 | −3.23107E−01 | 4.78646E−01 | 3.91225E−02 | −1.44147E+00 |
| A14 = 1.02524E−01 | 1.54970E−01 | −2.75410E−01 | −6.98336E−02 | 3.31330E−12 |

| | Surface # | | | |
|---|---|---|---|---|
| 7 | 8 | 9 | 10 | 11 |
| k = 1.95015E+01 | −6.73108E+01 | −4.01015E+00 | −1.31095E+00 | −1.43048E+01 |
| A4 = −2.63373E−01 | −2.45404E−01 | −2.01932E−01 | −1.10407E−01 | −9.92020E−02 |
| A6 = 1.54157E−01 | 3.03534E−01 | 1.73447E−01 | 6.81395E−02 | 4.77363E−02 |
| A8 = −6.09801E−01 | −3.18673E−01 | −1.06638E−01 | −1.07045E−02 | −1.80163E−02 |
| A10 = 1.11132E+00 | 1.78087E−01 | 6.27711E−02 | −5.63625E−03 | 4.15122E−03 |
| A12 = −1.00385E+00 | −3.29838E−02 | −1.95292E−02 | 2.92710E−03 | −5.65664E−04 |
| A14 = 3.71133E−01 | −2.23275E−03 | 1.97795E−03 | −3.78457E−04 | 3.46995E−05 |
| A16 = 1.02776E−01 | −2.88277E−05 | −2.08232E−05 | | |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 42; wherein the units of HFOV, CRA1.0Y and CRA0.8Y are expressed in degree (deg.).

TABLE 42

| (Embodiment 11) | |
|---|---|
| f | 3.58 |
| Fno | 2.27 |
| HFOV | 37.5 |
| V1-V2 | 32.6 |
| CRA1.0Y | 36.0 |
| CRA1.0Y-CRA0.8Y | 0.4 |
| (T12 + T45)/(T23 + T34) | 0.57 |
| f1/f5 | −1.37 |
| TTL/ImgH | 1.47 |

Please refer to FIG. 11B and the following table 43, which show the CRA of the eleventh embodiment of the present Image capturing lens system; wherein one full image height of the image plane 1180 is 2.8125 mm, thus CRA0.8Y=35.6 deg, CRA1.0Y=36.0 deg.

TABLE 43

| Field | Image Height (mm) | CRA (Deg.) |
|---|---|---|
| 0.00 | 0.000 | 0.0 |
| 0.05 | 0.141 | 3.4 |
| 0.10 | 0.281 | 6.8 |
| 0.15 | 0.422 | 10.2 |
| 0.20 | 0.563 | 13.4 |
| 0.25 | 0.703 | 16.6 |
| 0.30 | 0.844 | 19.6 |
| 0.35 | 0.984 | 22.4 |
| 0.40 | 1.125 | 25.0 |
| 0.45 | 1.266 | 27.3 |
| 0.50 | 1.406 | 29.4 |
| 0.55 | 1.547 | 31.2 |
| 0.60 | 1.688 | 32.7 |
| 0.65 | 1.828 | 33.9 |
| 0.70 | 1.969 | 34.7 |
| 0.75 | 2.109 | 35.3 |
| 0.80 | 2.250 | 35.6 |
| 0.85 | 2.391 | 35.7 |
| 0.90 | 2.531 | 35.8 |
| 0.95 | 2.672 | 35.8 |
| 1.00 | 2.813 | 36.0 |

Embodiment 12

Figure 12A:
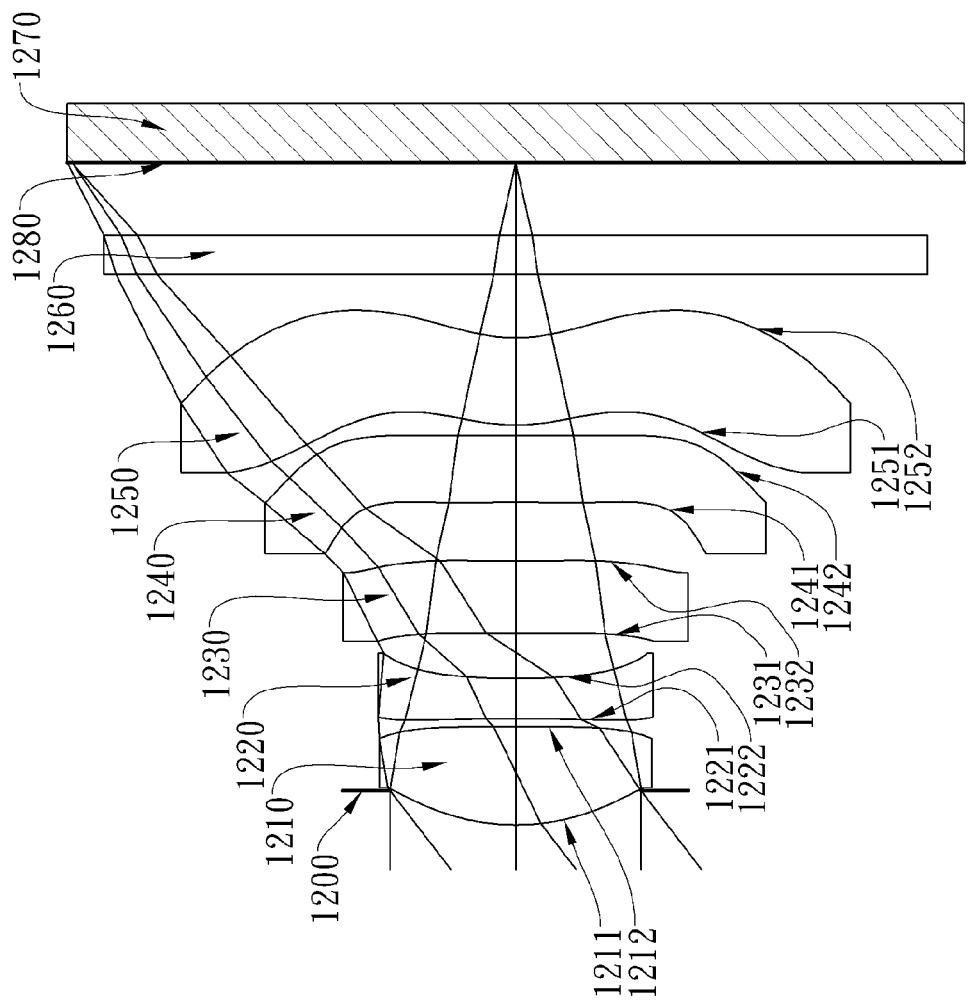
FIG. 12A shows an Image capturing lens system in accordance with a twelfth embodiment of the present invention.
Figure 12B:
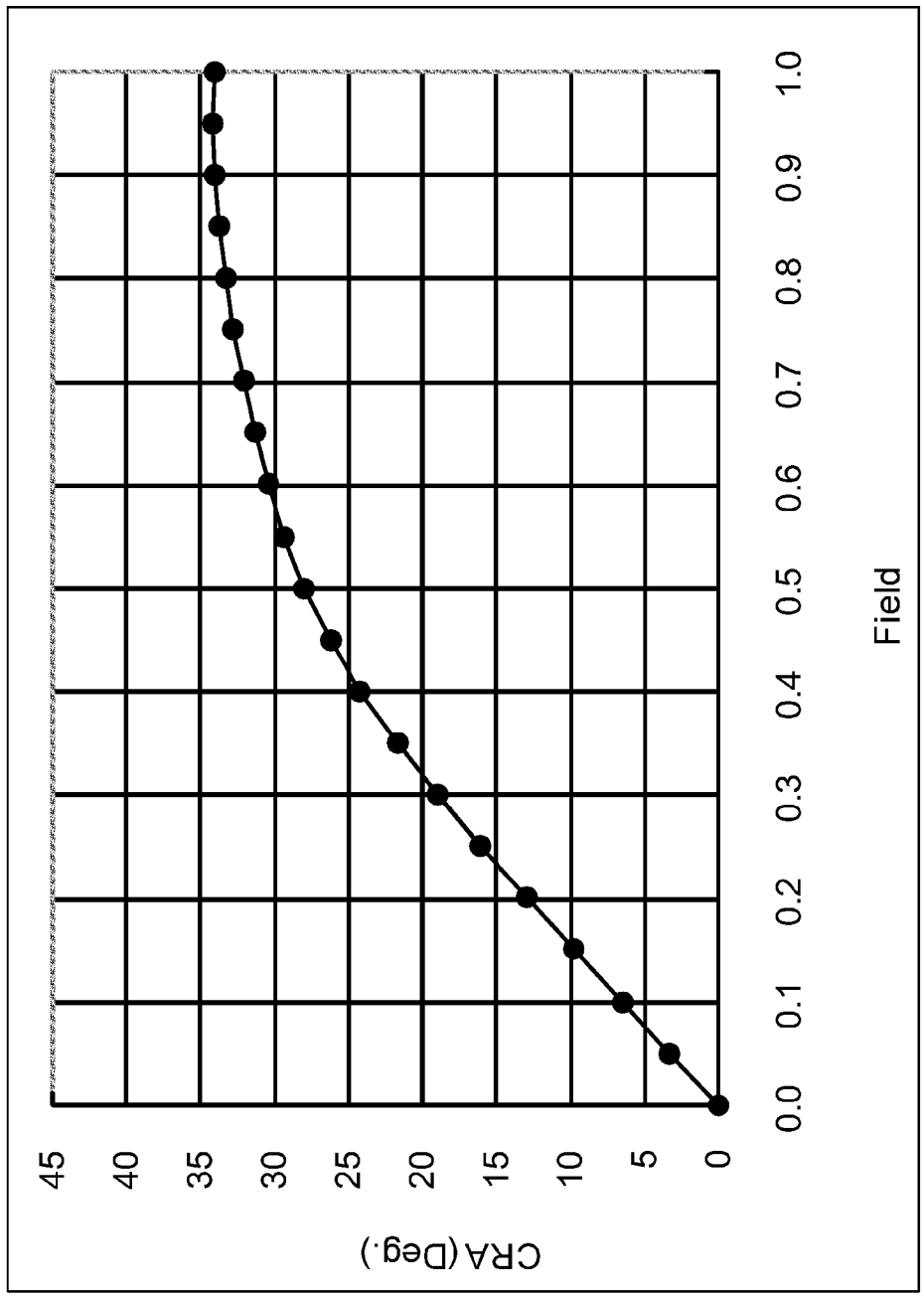
FIG. 12B shows the relation between CRA and field of view of the twelfth embodiment of the present invention.
Figure 12C:
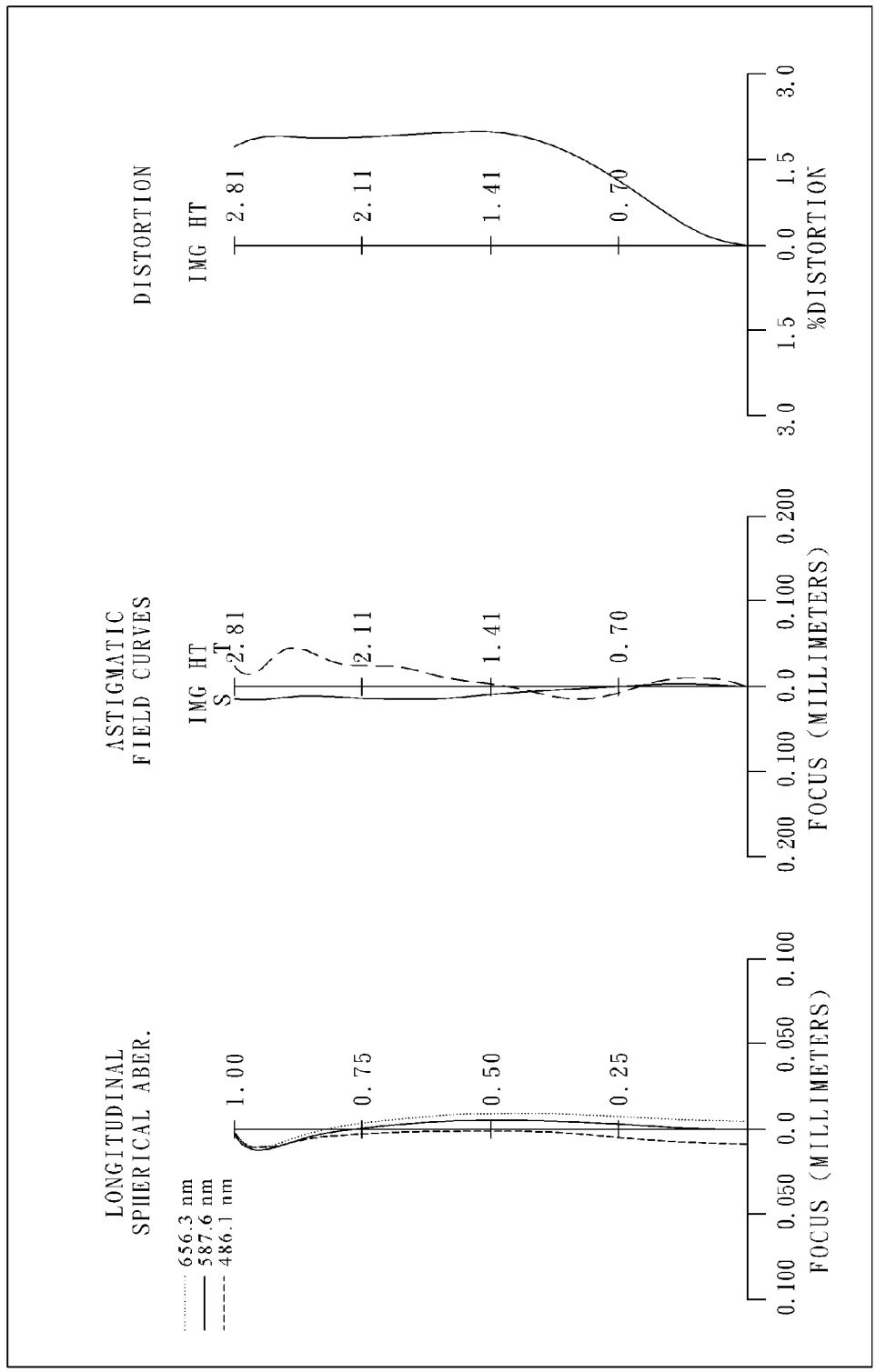
FIG. 12C shows the aberration curves of the twelfth embodiment of the present invention.

FIG. 12A shows an Image capturing lens system in accordance with the twelfth embodiment of the present invention, and FIG. 12C shows the aberration curves of the twelfth embodiment of the present invention. The Image capturing lens system of the twelfth embodiment of the present invention mainly comprises five non-cemented lens elements, in order from an object side to an image side:

a plastic first lens element 1210 with positive refractive power having a convex object-side surface 1211 and a concave image-side surface 1212, the object-side and image-side surfaces 1211 and 1212 thereof being aspheric;

a plastic second lens element 1220 with negative refractive power having a concave object-side surface 1221 and a concave image-side surface 1222, the object-side and image-side surfaces 1221 and 1222 thereof being aspheric;

a plastic third lens element 1230 with positive refractive power having a convex object-side surface 1231 and a concave image-side surface 1232, the object-side and image-side surfaces 1231 and 1232 thereof being aspheric;

a plastic fourth lens element 1240 with negative refractive power having a concave object-side surface 1241 and a convex image-side surface 1242, the object-side and image-side surfaces 1241 and 1242 thereof being aspheric; and a plastic fifth lens element 1250 with positive refractive power having a convex object-side surface 1251 and a concave image-side surface 1252, the object-side and image-side surfaces 1251 and 1252 thereof being aspheric, and at least one inflection point is formed on both the object-side surface 1251 and the image-side surface 1252 thereof;

wherein an aperture stop 1200 is disposed between an imaged object and the first lens element 1210;

the Image capturing lens system further comprises an IR filter 1260 disposed between the image-side surface 1252 of the fifth lens element 1250 and an image plane 1280, and the IR filter 1260 is made of glass and has no influence on the focal length of the Image capturing lens system; the Image capturing lens system further comprises an image sensor 1270 provided on the image plane 1280.

The detailed optical data of the twelfth embodiment is shown in TABLE 44, and the aspheric surface data is shown in TABLE 0.45, wherein the units of the radius of curvature, the thickness and the focal length are expressed in mm, and HFOV is half of the maximal field of view.

TABLE 44

(Embodiment 12)
f = 3.60 mm, Fno = 2.27, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.216 | | | | |
| 2 | Lens 1 | 1.381640 | (ASP) | 0.622 | Plastic | 1.544 | 55.9 | 2.60 |
| 3 | | 48.321000 | (ASP) | 0.050 | | | | |
| 4 | Lens 2 | −29.625900 | (ASP) | 0.256 | Plastic | 1.640 | 23.3 | −5.92 |
| 5 | | 4.358600 | (ASP) | 0.287 | | | | |
| 6 | Lens 3 | 15.149200 | (ASP) | 0.460 | Plastic | 1.544 | 55.9 | 69.23 |
| 7 | | 25.068379 | (ASP) | 0.372 | | | | |
| 8 | Lens 4 | −6.413913 | (ASP) | 0.423 | Plastic | 1.640 | 23.3 | −11.00 |
| 9 | | −74.174358 | (ASP) | 0.067 | | | | |
| 10 | Lens 5 | 1.130970 | (ASP) | 0.554 | Plastic | 1.544 | 55.9 | 26.57 |
| 11 | | 1.015170 | (ASP) | 0.400 | | | | |
| 12 | IR-filter | Plano | | 0.250 | Glass | 1.517 | 64.2 | — |
| 13 | | Plano | | 0.461 | | | | |
| 14 | Image | Plano | | — | | | | |

* Reference wavelength is 587.6 nm (d-line)

TABLE 45

Aspheric Coefficients

| | Surface # | | | | |
|---|---|---|---|---|---|
| | 2 | 3 | 4 | 5 | 6 |
| k = | −4.57191E−02 | 1.43813E+01 | −9.00000E+01 | −9.00000E+01 | −9.00000E+01 |
| A4 = | −2.73270E−02 | −1.71801E−01 | −9.81409E−02 | 1.51742E−01 | −1.05247E−01 |
| A6 = | 6.13140E−02 | 3.66961E−01 | 4.91272E−01 | 1.36636E−01 | −2.68237E−01 |
| A8 = | −2.27988E−01 | −7.80921E−01 | −6.85393E−01 | −4.23011E−01 | 9.43777E−01 |
| A10 = | 1.83510E−01 | 9.71179E−02 | −3.97424E−01 | 1.18673E+00 | −1.14921E+00 |
| A12 = | −5.72448E−02 | 9.51082E−01 | 1.79177E+00 | −1.64010E+00 | −2.95778E−01 |
| A14 = | −1.19416E−01 | −6.50402E−01 | −1.01680E+00 | 1.02522E+00 | 1.91278E+00 |
| | | | | | −1.26653E+00 |

| | Surface # | | | | |
|---|---|---|---|---|---|
| | 7 | 8 | 9 | 10 | 11 |
| k = | −1.00000E+00 | −9.00000E+01 | −9.00000E+01 | −7.20482E+00 | −4.43760E+00 |
| A4 = | 5.21903E−03 | 4.78064E−01 | 3.09993E−02 | −3.47473E−01 | −2.29779E−01 |
| A6 = | −4.72844E−01 | −1.29575E+00 | 7.15430E−02 | 1.25152E−01 | 1.28520E−01 |
| A8 = | 9.15058E−01 | 2.16446E+00 | −2.98438E−01 | −1.71724E−03 | −5.67958E−02 |
| A10 = | −1.00865E+00 | −2.83695E+00 | 3.10013E−01 | −9.45138E−03 | 1.64591E−02 |
| A12 = | 6.25198E−01 | 2.44299E+00 | −1.66026E−01 | 2.74136E−03 | −2.64114E−03 |
| A14 = | −1.52262E−01 | −1.22102E+00 | 4.53898E−02 | −3.42708E−04 | 1.73636E−04 |
| A16 = | | 2.59071E−01 | −4.91693E−03 | 1.69097E−05 | |

The equation of the aspheric surface profiles of the twelfth embodiment has the same form as that of the first embodiment. Moreover, the description of the factors in the relations is as those set forth in the first embodiment, but the values of the relations of the twelfth embodiment are listed in the following TABLE 46; wherein the units of HFOV, CRA1.0Y and CRA0.8Y are expressed in degree (deg.).

TABLE 46

(Embodiment 12)

| | |
|---|---|
| f | 3.60 |
| Fno | 2.27 |
| HFOV | 37.5 |
| V1−V2 | 32.6 |
| CRA1.0Y | 34.1 |
| CRA1.0Y−CRA0.8Y | 0.8 |
| (T12 + T45)/(T23 + T34) | 0.18 |
| f1/f5 | 0.10 |
| TTL/ImgH | 1.46 |

Please refer to FIG. 12B and the following table 47, which show the CRA of the twelfth embodiment of the present Image capturing lens system; wherein one full image height of the image plane 1280 is 2.8125 mm, thus CRA0.8Y=33.3 deg, CRA1.0Y=34.1 deg.

TABLE 47

| Field | Image Height (mm) | CRA (Deg.) |
|---|---|---|
| 0.00 | 0.000 | 0.0 |
| 0.05 | 0.141 | 3.3 |
| 0.10 | 0.281 | 6.6 |
| 0.15 | 0.422 | 9.8 |
| 0.20 | 0.563 | 13.0 |
| 0.25 | 0.703 | 16.1 |
| 0.30 | 0.844 | 19.0 |
| 0.35 | 0.984 | 21.7 |
| 0.40 | 1.125 | 24.2 |
| 0.45 | 1.266 | 26.3 |
| 0.50 | 1.406 | 28.0 |

TABLE 47-continued

| Field | Image Height (mm) | CRA (Deg.) |
|---|---|---|
| 0.55 | 1.547 | 29.4 |
| 0.60 | 1.688 | 30.5 |
| 0.65 | 1.828 | 31.4 |
| 0.70 | 1.969 | 32.1 |
| 0.75 | 2.109 | 32.8 |
| 0.80 | 2.250 | 33.3 |
| 0.85 | 2.391 | 33.7 |
| 0.90 | 2.531 | 34.0 |
| 0.95 | 2.672 | 34.1 |
| 1.00 | 2.813 | 34.1 |

It is to be noted that TABLES 1-47 show different data of the different embodiments, however, the data of the different embodiments are obtained from experiments. Therefore, any Image capturing lens system of the same structure is considered to be within the scope of the present invention even if it uses different data. The embodiments depicted above and the appended drawings are exemplary and are not intended to limit the scope of the present invention.

What is claimed is:

1. An image capturing lens system, in order from an object side to an image side comprising five lens elements with refractive power:
    a first lens element with positive refractive power having a convex object-side surface;
    a second lens element with negative refractive power;
    a third lens element with both the object-side and image-side surfaces thereof being aspheric;
    a plastic fourth lens element with both the object-side and image-side surfaces thereof being aspheric; and
    a plastic fifth lens element having a concave image-side surface, both the object-side and image-side surfaces thereof being aspheric, and at least one inflection point is formed on at least one of the object-side and image-side surfaces thereof;
    wherein a chief ray angle at one full length of an image height on an image plane from an optical axis is CRA1.0Y, a focal length of the first lens element is f1, a focal length of the fifth lens element is f5, and they satisfy the following relations:

$35 \deg < CRA1.0Y < 48 \deg$; and $-3.5 < f1/f5 < 1.5$.

2. The Image capturing lens system according to claim 1, wherein the fourth lens element has a concave object-side surface and a convex image-side surface.

3. The Image capturing lens system according to claim 2, wherein the chief ray angle at one full length of the image height from the optical axis on the image plane is CRA1.0Y, a chief ray angle at 80% length of the image height on the image plane from the optical axis is CRA0.8Y, and they satisfy the following relation:

$-1 \deg < CRA1.0Y - CRA0.8Y < 5 \deg$.

4. The Image capturing lens system according to claim 3, wherein all the five lens elements are non-cemented lens elements, and half of the maximal field of view of the system is HFOV, and it satisfies the following relation:

$36 \deg < HFOV < 45 \deg$.

5. The Image capturing lens system according to claim 2, wherein the fourth lens element has positive refractive power, and the fifth lens element has negative refractive power.

6. The Image capturing lens system according to claim 5, wherein the second lens element has a concave object-side surface and a convex image-side surface.

7. The Image capturing lens system according to claim 2, wherein the fifth lens element has a convex object-side surface.

8. The Image capturing lens system according to claim 7, wherein the second lens element has a concave image-side surface and the fourth lens element has negative refractive power.

9. The Image capturing lens system according to claim 8, wherein the third lens element has a convex object-side surface and a convex image-side surface.

10. The Image capturing lens system according to claim 1, wherein an Abbe number of the first lens element is V1, an Abbe number of the second lens element is V2, and they satisfy the following relation:

$20 < V1 - V2 < 40$.

11. The Image capturing lens system according to claim 10, wherein the chief ray angle at one full length of the image height from the optical axis on the image plane is CRA1.0Y, and it satisfies the following relation:

$37 \deg < CRA1.0Y < 43 \deg$.

12. The Image capturing lens system according to claim 10, wherein the chief ray angle at one full length of the image height from the optical axis on the image plane is CRA1.0Y, the chief ray angle at 80% length of the image height on the image plane from the optical axis is CRA0.8Y, and they satisfy the following relation:

$-1 \deg < CRA1.0Y - CRA0.8Y < 5 \deg$.

13. The Image capturing lens system according to claim 12, wherein an axial distance between the first lens element and the second lens element is T12, an axial distance between the fourth lens element and the fifth lens element is T45, an axial distance between the second lens element and the third lens element is T23, an axial distance between the third lens element and the fourth lens element is T34, and they satisfy the following relation:

$0.1 < (T12 + T45)/(T23 + T34) < 1.0$.

14. An image capturing lens system comprising, in order from an object side to an image side comprising five lens elements with refractive power:
    a first lens element with positive refractive power having a convex object-side surface;
    a second lens element with negative refractive power having a concave image-side surface;
    a third lens element with both the object-side and image-side surfaces thereof being aspheric;
    a plastic fourth lens element with negative refractive power having both the object-side and image-side surfaces thereof being aspheric; and
    a plastic fifth lens element having a concave image-side surface, both the object-side and image-side surfaces thereof being aspheric, and at least one inflection point is formed on at least one of the object-side and image-side surfaces thereof;
    wherein a chief ray angle at one full length of an image height from an optical axis on an image plane is CRA1.0Y, a focal length of the first lens element is f1, a focal length of the fifth lens element is f5, and they satisfy the following relations:

$33 \deg < CRA1.0Y < 50 \deg$; and $-3.5 < f1/f5 < 1.5$.

15. The Image capturing lens system according to claim 14, wherein the fourth lens element has a concave object-side surface and a convex image-side surface.

16. The Image capturing lens system according to claim 15, wherein the chief ray angle at one full length of the image height from the optical axis on the image plane is CRA1.0Y, a chief ray angle at 80% length of the image height on the image plane from the optical axis is CRA0.8Y, and they satisfy the following relation:

$-1 \deg < CRA1.0Y - CRA0.8Y < 5 \deg.$

17. The Image capturing lens system according to claim 16, wherein an axial distance between the object-side surface of the first lens element and the image plane is TTL, the maximum image height on the image plane of the system is ImgH, and they satisfy the following relation:

$TTL/ImgH < 1.7.$

18. The Image capturing lens system according to claim 15, wherein all the five lens elements are non-cemented lens elements, and half of the maximal field of view of the system is HFOV, and it satisfies the following relation:

$36 \deg < HFOV < 45 \deg.$

19. The Image capturing lens system according to claim 18, wherein the third lens element has a convex object-side surface and a convex image-side surface.

20. An image capturing lens system comprising, in order from an object side to an image side comprising five lens elements with refractive power:
 a first lens element with positive refractive power having a convex object-side surface;
 a second lens element having a concave object-side surface and a convex image-side surface;
 a third lens element with both the object-side and image-side surfaces thereof being aspheric;
 a plastic fourth lens element having a concave object-side surface and a convex image-side surface, both the object-side and image-side surfaces thereof being aspheric; and
 a plastic fifth lens element with negative refractive power having a concave image-side surface, both the object-side and image-side surfaces thereof being aspheric, and at least one inflection point is formed on at least one of the object-side and image-side surfaces thereof;
 wherein a chief ray angle at one full length of an image height from an optical axis on an image plane is CRA1.0Y, a focal length of the first lens element is f1, a focal length of the fifth lens element is f5, and they satisfy the following relations:

$33 \deg < CRA1.0Y < 50 \deg;$ and $-3.5 < f1/f5 < 1.5.$

21. The Image capturing lens system according to claim 20, wherein the second lens element has negative refractive power, and the fourth lens element has positive refractive power.

22. The Image capturing lens system according to claim 21 wherein all the five lens elements are non-cemented lens elements, and half of the maximal field of view of the system is HFOV, and it satisfies the following relation:

$36 \deg < HFOV < 45 \deg.$

23. The Image capturing lens system according to claim 21, wherein the chief ray angle at one full length of the image height from the optical axis on the image plane is CRA1.0Y, and it satisfies the following relation:

$35 \deg < CRA1.0Y < 48 \deg.$

24. The Image capturing lens system according to claim 21, wherein the chief ray angle at one full length of the image height from the optical axis on the image plane is CRA1.0Y, a chief ray angle at 80% length of the image height on the image plane from the optical axis is CRA0.8Y, and they satisfy the following relation:

$-0.5 \deg < CRA1.0Y - CRA0.8Y < 2 \deg.$

25. The Image capturing lens system according to claim 21, wherein an axial distance between the object-side surface of the first lens element and the image plane is TTL, the maximum image height on the image plane of the system is ImgH, and they satisfy the following relation:

$TTL/ImgH < 1.7.$

* * * * *